US012720105B2

(12) United States Patent
Jeong et al.

(10) Patent No.: US 12,720,105 B2
(45) Date of Patent: Aug. 25, 2026

(54) METHODS AND APPARATUSES FOR ENCODING AND DECODING MOTION VECTOR DIFFERENCE USING SEQUENCE MMVD INFORMATION

(71) Applicant: SAMSUNG ELECTRONICS CO., LTD., Suwon-si (KR)

(72) Inventors: Seungsoo Jeong, Suwon-si (KR); Minwoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/920,222

(22) Filed: Oct. 18, 2024

(65) Prior Publication Data

US 2025/0047900 A1 Feb. 6, 2025

Related U.S. Application Data

(63) Continuation of application No. 18/528,154, filed on Dec. 4, 2023, now Pat. No. 12,184,888, which is a (Continued)

(51) Int. Cl.
*H04N 19/523* (2014.01)
*H04N 19/103* (2014.01)
(Continued)

(52) U.S. Cl.
CPC ......... *H04N 19/523* (2014.11); *H04N 19/103* (2014.11); *H04N 19/176* (2014.11); *H04N 19/513* (2014.11)

(58) Field of Classification Search
CPC .. H04N 19/103; H04N 19/176; H04N 19/513; H04N 19/52; H04N 19/523; H04N 19/70
See application file for complete search history.

(56) References Cited

U.S. PATENT DOCUMENTS 10,819,978 B2 10/2020 Tamse et al.
2008/0162432 A1 7/2008 Wang
(Continued)

FOREIGN PATENT DOCUMENTS

CN 107113440 A 8/2017
CN 108476319 A 8/2018
(Continued)

OTHER PUBLICATIONS

Communication dated Jan. 13, 2023 issued by the Intellectual Property India Patent Office in application No. 202147031196.
(Continued)

*Primary Examiner* — Jessica M Prince
(74) *Attorney, Agent, or Firm* — Sughrue Mion, PLLC

(57) ABSTRACT

Provided is a video decoding method including: obtaining, from a sequence parameter set, sequence merge mode with motion vector difference (sequence MMVD) information indicating whether an MMVD mode is applicable in a current sequence; when the MMVD mode is applicable according to the sequence MMVD information, obtaining, from a bitstream, first MMVD information indicating whether the MMVD mode is applied in a first inter prediction mode for a current block included in the current sequence; when the MMVD mode is applicable in the first inter prediction mode according to the first MMVD information, reconstructing a motion vector of the current block which is to be used in the first inter prediction mode, by using a distance of a motion vector difference and a direction of a motion vector difference obtained from the bitstream; and reconstructing the current block by using the motion vector of the current block.

4 Claims, 37 Drawing Sheets

Related U.S. Application Data continuation of application No. 18/185,982, filed on Mar. 17, 2023, now Pat. No. 11,871,030, which is a continuation of application No. 17/419,127, filed as application No. PCT/KR2019/018738 on Dec. 30, 2019, now Pat. No. 11,627,335.

(60) Provisional application No. 62/792,266, filed on Jan. 14, 2019, provisional application No. 62/785,742, filed on Dec. 28, 2018.

(51) Int. Cl.
*H04N 19/176* (2014.01)
*H04N 19/513* (2014.01)

(56) References Cited

U.S. PATENT DOCUMENTS

| | | | | |
|---|---|---|---|---|
| 2014/0376638 | A1 | 12/2014 | Nakamura et al. | |
| 2017/0339425 | A1 | 11/2017 | Jeong et al. | |
| 2018/0098089 | A1 | 4/2018 | Chen et al. | |
| 2018/0192076 | A1* | 7/2018 | Ikai | H04N 19/176 |
| 2020/0021845 | A1 | 1/2020 | Lin et al. | |
| 2020/0077106 | A1 | 3/2020 | Jhu et al. | |
| 2020/0107043 | A1* | 4/2020 | Hung | H04N 19/52 |
| 2020/0252617 | A1 | 8/2020 | Jeong | |
| 2020/0296357 | A1 | 9/2020 | Kondo | |
| 2020/0404256 | A1 | 12/2020 | Zhang et al. | |
| 2021/0037239 | A1 | 2/2021 | Kim et al. | |
| 2021/0274162 | A1* | 9/2021 | Ahn | H04N 19/52 |
| 2021/0360255 | A1 | 11/2021 | Chiang et al. | |
| 2021/0392356 | A1* | 12/2021 | Chujoh | H04N 19/176 |
| 2023/0043548 | A1 | 2/2023 | Jeong et al. | |
| 2023/0232038 | A1 | 7/2023 | Jeong et al. | |

FOREIGN PATENT DOCUMENTS

| | | | |
|---|---|---|---|
| EP | 2779649 | A1 | 9/2014 |
| EP | 3291557 | A1 | 3/2018 |
| EP | 3 905 675 | A1 | 11/2021 |
| GB | 2560720 | A | 9/2018 |
| JP | 2018-14744 | A | 1/2018 |
| KR | 10-2015-0070848 | A | 6/2015 |
| KR | 10-2015-0099486 | A | 8/2015 |
| WO | 2019/054736 | A1 | 3/2019 |
| WO | 2020/139059 | A1 | 7/2020 |

OTHER PUBLICATIONS

Jeong et al., “CE4 Ultimate motion vector expression (Test 4.5.4),” JVET-L0054, Joint Video Experts Team (JVET) of ITU-T SG 16 WP 3 and ISO/IEC JTC 1/SC 29/WG 11, 12th Meeting: Macao, CN. Oct. 11, 2018 (total 8 pages).
Communication dated Apr. 13, 2020, issued by the International Searching Authority in counterpart International Application No. PCT/KR2019/018738 (PCT/ISA/220, 210, 237).
Communication dated Sep. 26, 2022, issued by the European Patent Office in EP Patent Application No. 19903040.4.
Communication dated Jun. 18, 2021, issued by the Korean Patent Office in counterpart Korean Patent Application No. 10-2021-7012767.
Chen J et al: Algorithm description for Versatile Video Coding and Test Model 3 (VTM 3) JVET Meeting; Oct. 3, 2018-Oct. 12, 2018; Macao; (The Joint Video Exploration Team of ISO/IEC JTC1/SC29/WG11 and ITU-T SG.16) No. JVET-L100224 Dec. 2018 (Dec. 24, 2018), XP030251962.
Bross et al., “Versatile Video Coding (Draft 3),” JVET-L1001-v7, Joint Video Experts Team (JVET) of ITU-T SG 16 WP 3 and ISO/IEC JTC 1/SC 29/WG 11,12th Meeting: Macao, CN. Dec. 20, 2018 (total 225 pages).
Office Action dated Nov. 29, 2023, issued by Chinese Patent Office in Chinese Patent Application No. 201980092641.5.
U.S. Appl. No. 18/528,154, filed Dec. 4, 2023.
U.S. Appl. No. 18/185,982, filed Mar. 17, 2023.
U.S. Appl. No. 17/419,127, filed Jun. 28, 2021.
Application No. PCT/KR2019/018738, Filed, Dec. 30, 2019.
U.S. Appl. No. 62/792,266, filed Jan. 14, 2019.
U.S. Appl. No. 62/785,742, filed Dec. 28, 2018.

* cited by examiner

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 14

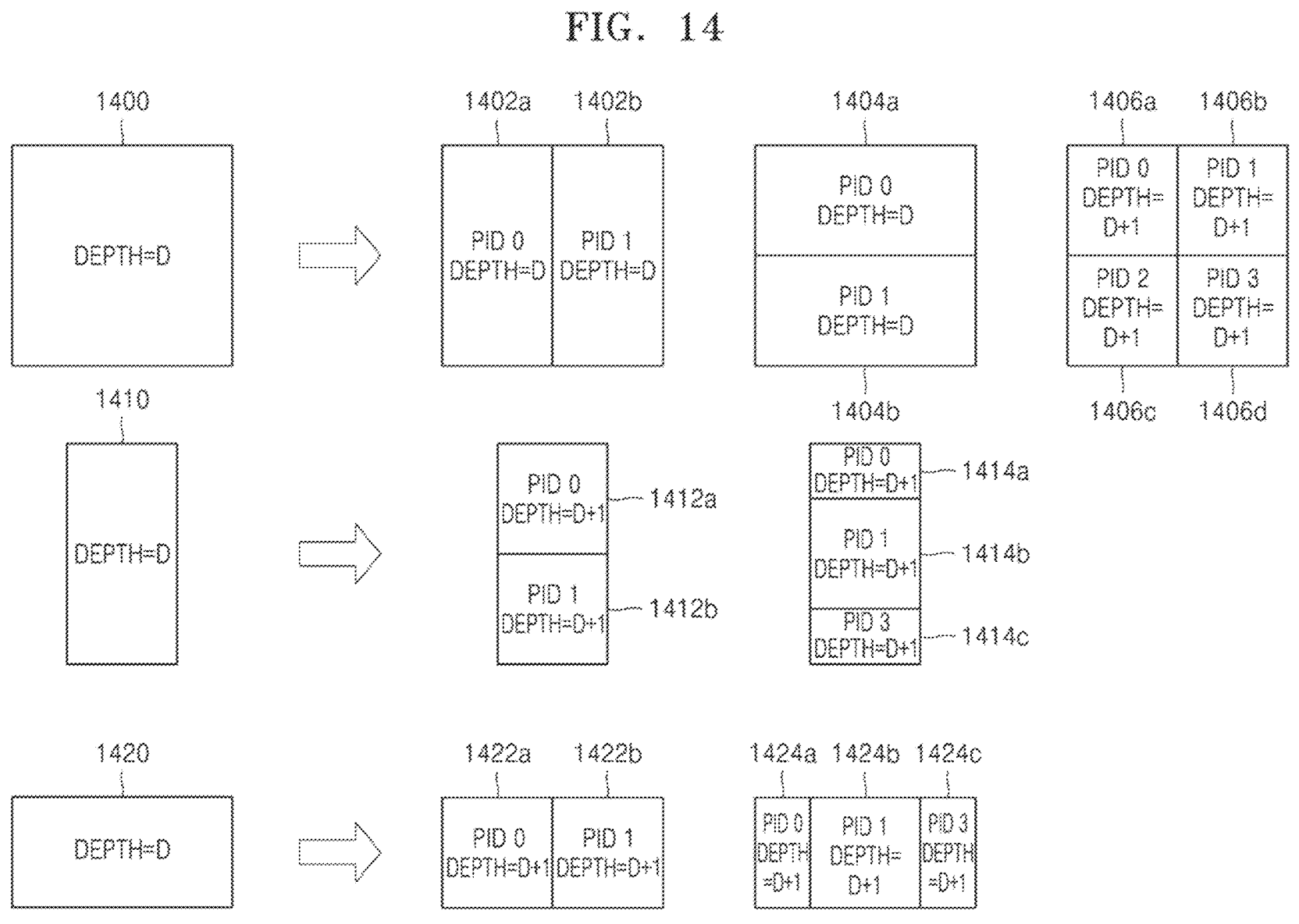

1400
DEPTH=D
1402a
PID 0 DEPTH=D
1402b
PID 1 DEPTH=D
1404a
PID 0 DEPTH=D
1404b
PID 1 DEPTH=D
1406a
PID 0 DEPTH=D+1
1406b
PID 1 DEPTH=D+1
1406c
PID 2 DEPTH=D+1
1406d
PID 3 DEPTH=D+1

1410
DEPTH=D
1412a
PID 0 DEPTH=D+1
1412b
PID 1 DEPTH=D+1
1414a
PID 0 DEPTH=D+1
1414b
PID 1 DEPTH=D+1
1414c
PID 3 DEPTH=D+1

1420
DEPTH=D
1422a
PID 0 DEPTH=D+1
1422b
PID 1 DEPTH=D+1
1424a
PID 0 DEPTH=D+1
1424b
PID 1 DEPTH=D+1
1424c
PID 3 DEPTH=D+1

1600
1610
1620
T + Q
1625
ENTROPY ENCODER
1630
$Q^{-1} + T^{-1}$
FITLER INFORMATION
1615
PREDICTION ENCODER
1640
LOOP FILTER
1635
DEBLOCKING FILTER
FITLER INFORMATION
1650
1670
LOOP FILTER
1665
DEBLOCKING FILTER
1660
$Q^{-1} + T^{-1}$
1655
ENTROPY DECODER
1675
PREDICTION DECODER

| MERGE CANDIDATE INFORMATION | 0 | 1 | 2 | 3 |
|---|---|---|---|---|
| N th MV CANDIDATE | 1st MV CANDIDATE | 2nd MV CANDIDATE | 3rd MV CANDIDATE | 4th MV CANDIDATE |

2610

| MERGE MVD DISTANCE INDEX | BIN STRING | DISTANCE FROM BASE MOTION VECTOR |
|---|---|---|
| 0 | 0 | 1 |
| 1 | 10 | 2 |
| 2 | 110 | 4 |
| 3 | 1110 | 8 |
| 4 | 11110 | 16 |
| 5 | 111110 | 32 |
| 6 | 1111110 | 64 |
| 7 | 1111111 | 128 |

2620

| MERGE MVD DIRECTION INDEX | BIN STRING | X-AXIS SIGN | Y-AXIS SIGN |
|---|---|---|---|
| 0 | 00 | +1 | 0 |
| 1 | 01 | -1 | 0 |
| 2 | 10 | 0 | +1 |
| 3 | 11 | 0 | -1 |

FIG. 24 mvLX[ 0 ][ 0 ][ 0 ] = mvLXN[ 0 ] + refineMvLX[0]

mvLX[ 0 ][ 0 ][ 1 ] = mvLXN[ 1 ] + refineMvLX[1]

FIG. 25

MVP[0] = ((MVP[0] + 32) / 64) * 64

MVP[1] = ((MVP[1] + 32) / 64) * 64

FIG. 26

MVP[0] = ((MVP[0] + 8) / 16) * 16

MVP[1] = ((MVP[1] + 8) / 16) * 16

FIG. 27

| SYNTAX ELEMENT | BINARIZATION | |
|---|---|---|
| | SCHEME | INPUT PARAMETER |
| regular_merge_flag[ ][ ] | FL | cMax = 1 |
| mmvd_merge_flag[ ][ ] | FL | cMax = 1 |
| mmvd_cand_flag[ ][ ] | FL | cMax = 1 |
| mmvd_distance_idx[ ][ ] | TR | cMax = 7, cRiceParam = 0 |
| mmvd_direction_idx[ ][ ] | FL | cMax = 3 |

FIG. 28

| MVD DISTANCE INDEX | BINARIZATION 1 | BINARIZATION 2 |
|---|---|---|
| 0 | 0 | 00 |
| 1 | 10 | 01 |
| 2 | 110 | 10 |
| 3 | 1110 | 110 |
| 4 | 11110 | 1110 |
| 5 | 111110 | 11110 |
| 6 | 1111110 | 111110 |
| 7 | 1111111 | 111111 |

FIG. 30

| MVD DISTANCE INDEX | BINARIZATION 1 | BINARIZATION 2 |
|---|---|---|
| 0 | 0 | 00 |
| 1 | 10 | 01 |
| 2 | 110 | 10 |
| 3 | 1110 | 110 |
| 4 | 11110 | 1110 |
| 5 | 11111 | 1111 |

FIG. 31

| MVD DISTANCE INDEX | BINARIZATION 1 | BINARIZATION 2 | | BINARIZATION 3 | |
|---|---|---|---|---|---|
| 0 | 0 | 0 | FLC (1bit) | 0 | FLC (2bit) |
| 1 | 10 | 0 | FLC (1bit) | 0 | FLC (2bit) |
| 2 | 110 | 1 | T-unary coding | 0 | FLC (2bit) |
| 3 | 1110 | 1 | T-unary coding | 0 | FLC (2bit) |
| 4 | 11110 | 1 | T-unary coding | 1 | T-unary coding |
| 5 | 111110 | 1 | T-unary coding | 1 | T-unary coding |
| 6 | 1111110 | 1 | T-unary coding | 1 | T-unary coding |
| ⋮ | ⋮ | ⋮ | ⋮ | | ⋮ |
| N | | | | | |

FIG. 32

| MVD DISTANCE INDEX | DISTANCE OFFSET (ACTUAL MV PRECISION) | CODEWORD | |
|---|---|---|---|
| | | PRECISION FLAG (0: SUB-PIXEL UNIT, 1: INTEGER PIXEL UNIT) | INDEX IN PRECISION |
| 0 | 1/4 | 0 | 0 |
| 1 | 1/2 | 0 | 1 |
| 2 | 1 | 1 | 0 |
| 3 | 2 | 1 | 10 |
| 4 | 4 | 1 | 110 |
| 5 | 8 | 1 | 1110 |
| 6 | 16 | 1 | 11110 |
| 7 | 32 | 1 | 11111 |

FIG. 33

| MVD DISTANCE INDEX | DISTANCE OFFSET (ACTUAL MV PRECISION) | CODEWORD | |
|---|---|---|---|
| | | PRECISION FLAG (0: SUB-PIXEL UNIT, 1: INTEGER PIXEL UNIT) | INDEX IN PRECISION |
| 0 | 1/4 | 0 | 0 |
| 1 | 1/2 | 0 | 1 |
| 2 | 1 | 1 | 0 |
| 3 | 2 | 1 | 10 |
| 4 | 4 | 1 | 110 |
| 5 | 8 | 1 | 111 |

METHODS AND APPARATUSES FOR ENCODING AND DECODING MOTION VECTOR DIFFERENCE USING SEQUENCE MMVD INFORMATION

CROSS-REFERENCE TO RELATED APPLICATIONS

This is a Continuation of application of U.S. application Ser. No. 18/528,154 filed Dec. 4, 2023, which is a Continuation application of U.S. application Ser. No. 18/185,982 filed Mar. 17, 2023, which is a Continuation Application of U.S. application Ser. No. 17/419,127 filed Jun. 28, 2021, which is a National Stage of International Application No. PCT/KR2019/018738 filed Dec. 30, 2019, which claims benefit of U.S. Provisional No. 62/792,266 filed on Jan. 14, 2019 in the United States Patent and Trademark Office and which claims benefit of 62/785,742 filed on Dec. 28, 2018 in the United States Patent and Trademark Office. The disclosures of which are incorporated herein by reference in their entireties.

TECHNICAL FIELD

The disclosure relates to the fields of image encoding and decoding. In particular, the disclosure relates to a method and apparatus for encoding a motion vector used to encode and decode an image and a method and apparatus for decoding the motion vector.

BACKGROUND ART

In methods of encoding and decoding an image, one picture may be split into blocks to encode the image and each block may be prediction encoded via inter prediction or intra prediction.

A representative example of inter prediction is motion estimation encoding using a method of compressing an image by removing temporal redundancy between pictures. In motion estimation encoding, blocks of a current picture are predicted by using at least one reference picture. A reference block most similar to a current block may be searched for in a predetermined search range by using a predetermined evaluation function. The current block is predicted based on the reference block, and a residual block is generated by subtracting a prediction block generated as a result of the prediction from the current block and then encoded. In this regard, to further accurately perform the prediction, interpolation is performed on a search range of reference pictures so as to generate pixels of sub pel units smaller than integer pel units and inter prediction may be performed based on the generated pixels of sub pel units.

In the standard such as H.264 advanced video coding (AVC) and high efficiency video coding (HEVC), a motion vector of pre-encoded blocks adjacent to a current block or blocks included in a pre-encoded picture is used as a prediction motion vector of the current block so as to predict a motion vector of the current block. A differential motion vector that is a difference between the motion vector of the current block and the prediction motion vector is signaled to a decoder via a predetermined method.

DESCRIPTION OF EMBODIMENTS

Technical Problem

An encoding method and encoding apparatus with respect to a motion vector difference and a decoding method and decoding apparatus with respect to the motion vector difference, according to an embodiment, efficiently encode and decode the motion vector difference used in various tools applied to an inter mode.

Solution to Problem

A video decoding method according to an embodiment of the disclosure may include: obtaining, from a sequence parameter set, sequence merge mode with motion vector difference (sequence MMVD) information indicating whether an MMVD mode is applicable in a current sequence; when the MMVD mode is applicable according to the sequence MMVD information, obtaining, from a bitstream, first MMVD information indicating whether the MMVD mode is applied in a first inter prediction mode for a current block included in the current sequence; when the MMVD mode is applicable in the first inter prediction mode according to the first MMVD information, reconstructing a motion vector of the current block which is to be used in the first inter prediction mode, by using a distance of a motion vector difference and a direction of the motion vector difference obtained from the bitstream; and reconstructing the current block by using the motion vector of the current block.

Advantageous Effects of Disclosure

According to an embodiment, provided are an encoding method and encoding apparatus with respect to a motion vector difference and a decoding method and decoding apparatus with respect to a motion information difference, which determine whether to use a motion vector difference in high-level syntax at a level of every sequence, picture, or block unit so as to efficiently encode the motion vector difference used in various tools applied to an inter mode.

However, effects achievable by methods of encoding and decoding motion information and apparatuses for encoding and decoding motion information, according to an embodiment, are not limited to those mentioned above, and other unstated effects will be clearly understood by one of ordinary skill in the art in view of descriptions below.

BRIEF DESCRIPTION OF DRAWINGS

A brief description of each drawing is provided for better understanding of the drawings cited herein.

FIG. 3 illustrates a process, performed by an image decoding apparatus, of determining at least one coding unit by splitting a current coding unit, according to an embodiment.

FIG. 10 illustrates that a shape into which a second coding unit is splittable is restricted when the second coding unit of a non-square shape, which is determined when an image decoding apparatus splits a first coding unit, satisfies a predetermined condition, according to an embodiment.

FIG. 11 illustrates a process, performed by an image decoding apparatus, of splitting a square coding unit when split shape mode information is unable to indicate that the square coding unit is split into four square coding units, according to an embodiment.

FIG. 13 illustrates a process of determining a depth of a coding unit when a shape and size of the coding unit change, when the coding unit is recursively split such that a plurality of coding units are determined, according to an embodiment.

FIG. 14 illustrates depths that are determinable based on shapes and sizes of coding units, and part indices (PIDs) that are for distinguishing between the coding units, according to an embodiment.

FIG. 23 illustrates values and meanings of a merge index, distance indices of a merge difference, and direction indices of the merge difference, according to an embodiment.

FIG. 24 illustrates equations for obtaining a motion vector by using a base motion vector and a merge motion vector difference, according to an embodiment.

FIG. 25 illustrates equations for adjusting precision of a motion vector predictor or a base motion vector when precision of a distance index of a merge difference is 64 according to an embodiment.

FIG. 26 illustrates equations for adjusting precision of a motion vector predictor or a base motion vector when precision of a distance index of a merge difference is 16 according to an embodiment.

FIG. 27 illustrates reference table for determining binarization of a plurality of pieces of merge-related information according to an embodiment.

FIG. 28 illustrates comparison table of bin strings of 8 distance indices of a merge difference according to various binarizations.

FIG. 30 illustrates comparison table of a bin string of 6 distance indices of a merge difference according to various binarizations.

FIG. 31 illustrates bin strings that are generated by varying binarization according to groups of distance indices of a merge difference according to an embodiment.

FIG. 32 illustrates codewords of cases of 8 distance indices of a merge difference indices according to an embodiment.

FIG. 33 illustrates codewords of cases of 6 distance indices of a merge difference according to an embodiment.

BEST MODE

Figure 1:
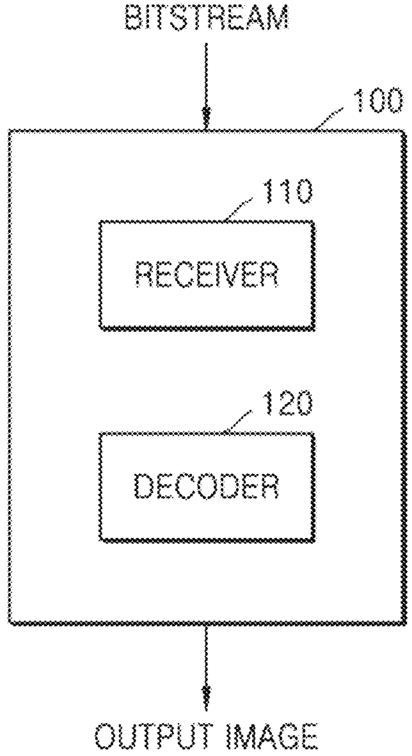
FIG. 1 is a schematic block diagram of an image decoding apparatus according to an embodiment.

A video decoding method according to an embodiment of the disclosure may include: obtaining, from a sequence parameter set, sequence merge mode with motion vector difference (sequence MMVD) information indicating whether an MMVD mode is applicable in a current sequence; when the MMVD mode is applicable according to the sequence MMVD information, obtaining, from a bitstream, first MMVD information indicating whether the MMVD mode is applied in a first inter prediction mode for a current block included in the current sequence; when the MMVD mode is applicable in the first inter prediction mode according to the first MMVD information, reconstructing a motion vector of the current block which is to be used in the first inter prediction mode, by using a distance of a motion vector difference and a direction of the motion vector difference obtained from the bitstream; and reconstructing the current block by using the motion vector of the current block.

According to an embodiment, the obtaining of, from the bitstream, the first MMVD information may include: when the MMVD mode is applicable according to the sequence MMVD information, obtaining sub-pixel MMVD information indicating whether a motion vector difference in an integer pixel unit is used or a motion vector difference in a sub-pixel unit is used in the current sequence; and when the MMVD mode is applicable according to the sequence MMVD information, obtaining MMVD information indicating whether the MMVD mode is used for the current block included in the current sequence, and the reconstructing of the motion vector of the current block may include: when the MMVD mode is used for the current block according to the MMVD information, reconstructing, according to the sub-pixel MMVD information, a distance of a motion vector difference in an integer pixel unit or a sub-pixel unit from a distance index of the motion vector difference of the current block obtained from the bitstream; and determining the motion vector of the current block by using the distance of the motion vector difference.

According to an embodiment, the reconstructing of the distance of the motion vector difference in the integer pixel unit or the sub-pixel unit from the distance index of the motion vector difference of the current block may include: when the MMVD mode is used for the current block according to the MMVD information and the motion vector difference in the integer pixel unit is used according to the sub-pixel MMVD information, reconstructing the distance of the motion vector difference in the integer pixel unit from the distance index of the motion vector difference of the current block obtained from the bitstream; and when the MMVD mode is used for the current block according to the MMVD information and the motion vector difference in the sub-pixel unit is used according to the sub-pixel MMVD information, reconstructing the distance of the motion vector difference in the sub-pixel unit from the distance index of the motion vector difference of the current block obtained from the bitstream.

According to an embodiment, the reconstructing of the motion vector of the current block may include: obtaining, from the bitstream, information indicating a base motion vector of the current block and a direction index of a motion vector difference of the current block; determining a motion vector difference of the current block by using a distance index of the motion vector difference of the current block and the direction index of the motion vector difference; determining the base motion vector of the current block by using the information indicating the base motion vector of the current block; and determining the motion vector of the current block by using the base motion vector and the motion vector difference of the current block.

According to an embodiment, when the MMVD mode is not applicable in the current sequence according to the sequence MMVD information, both the motion vector difference in the integer pixel unit and the motion vector difference in the sub-pixel unit may not be usable in the current sequence and the current block.

According to an embodiment, the determining of the motion vector of the current block may include: when the reconstructed distance of the motion vector difference is in the integer pixel unit, rounding an x component value and a y component value of the base motion vector of the current block to the integer pixel unit, and reconstructing the motion vector in the integer pixel unit by using the x component value and the y component value of the base motion vector which are rounded to the integer pixel unit; and when the reconstructed distance of the motion vector difference is in the sub-pixel unit, reconstructing a motion vector in the sub-pixel unit by using the distance of the motion vector difference in the sub-pixel unit, and an x component value and a y component value of the base motion vector which are rounded to the sub-pixel unit.

According to an embodiment of the disclosure, a video decoding apparatus may include: a syntax element obtainer configured to obtain, from a sequence parameter set, sequence merge mode with motion vector difference (sequence MMVD) information indicating whether an MMVD mode is applicable in a current sequence, and when the MMVD mode is applicable according to the sequence MMVD information, obtain, from a bitstream, first MMVD information indicating whether the MMVD mode is applied in a first inter prediction mode for a current block included in the current sequence; and a decoder configured to, when the MMVD mode is applicable in the first inter prediction mode according to the first MMVD information, reconstruct a motion vector of the current block which is to be used in the first inter prediction mode, by using a distance of a motion vector difference and a direction of the motion vector difference obtained from the bitstream, and reconstruct the current block by using the motion vector of the current block.

According to an embodiment, the syntax element obtainer may be configured to, when the MMVD mode is applicable according to the sequence MMVD information, obtain sub-pixel MMVD information indicating whether a motion vector difference in an integer pixel unit is used or a motion vector difference in a sub-pixel unit is used in the current sequence, and when the MMVD mode is applicable according to the sequence MMVD information, obtain MMVD information indicating whether the MMVD mode is used for the current block included in the current sequence, and the decoder may be configured to, when the MMVD mode is used for the current block according to the MMVD information, reconstruct, according to the sub-pixel MMVD information, a distance of a motion vector difference in an integer pixel unit or a sub-pixel unit from a distance index of the motion vector difference of the current block obtained from the bitstream, and determine the motion vector of the current block by using the distance of the motion vector difference.

According to an embodiment of the disclosure, a video encoding method may include: encoding sequence merge mode with motion vector difference (sequence MMVD) information indicating whether an MMVD mode is applicable in a current sequence; when the MMVD mode is applicable in the current sequence, encoding first MMVD information indicating whether the MMVD mode is used for a current block included in the current sequence in a first inter prediction mode; and when the MMVD mode is applied in the first inter prediction mode, encoding a distance index of a motion vector difference and a direction index of the motion vector difference of the current block.

According to an embodiment, the video encoding method may further include: when the MMVD mode is applicable in the current sequence, encoding sub-pixel MMVD information indicating whether a motion vector difference in an integer pixel unit is used or a motion vector difference in a sub-pixel unit is used in the current sequence; and when the MMVD mode is applicable, encoding MMVD information indicating whether the MMVD mode is used for the current block included in the current sequence, and the encoding of the distance index of the motion vector difference and the direction index of the motion vector difference of the current block may include, when the MMVD mode is used for the current block, encoding the distance index of the motion vector difference of the current block which is determined according to a distance of a motion vector difference in an integer pixel unit or a sub-pixel unit.

According to an embodiment, the encoding of the distance index of the motion vector difference of the current block may include: when the MMVD mode is used for the current block and the motion vector difference in the integer pixel unit is used, determining the distance index of the motion vector difference of the current block based on the motion vector difference in the integer pixel unit; and when the MMVD mode is used for the current block and the motion vector difference in the sub-pixel unit is used, determining the distance index of the motion vector difference of the current block based on the motion vector difference in the sub-pixel unit.

The encoding of the distance index of the motion vector difference of the current block may include: when the distance of the motion vector difference is encoded in an integer pixel unit, rounding an x component value and a y component value of a base motion vector of the current block to the integer pixel unit, determining the distance of the motion vector difference in the integer pixel unit by using the x component value and the y component value of the base motion vector which are rounded to the integer pixel unit, and encoding a distance index corresponding to the distance of the motion vector difference in the integer pixel unit; and when the motion vector differential distance is encoded in a sub-pixel unit, rounding an x component value and a y component value of the base motion vector of the current block to the sub-pixel unit, determining the distance of the motion vector difference in the sub-pixel unit by using the x component value and the y component value of the base motion vector which are rounded to the sub-pixel unit, and encoding a distance index corresponding to the distance of the motion vector difference in the sub-pixel unit.

According to an embodiment of the disclosure, a video decoding method may include: obtaining, from a bitstream, sequence merge mode with motion vector difference (sequence MMVD) information indicating whether a triangular partition prediction mode is enabled for a current block; obtaining, from the bitstream, second information indicating whether an intra/inter combination prediction mode is enabled for the current block; when the triangular partition prediction mode is enabled for the current block according to the sequence MMVD information, determining whether to apply the triangular partition prediction mode to the current block, based on a size and a width of the current block; and when the triangular partition prediction mode is enabled for the current block according to the sequence MMVD information and the intra/inter combination prediction mode is enabled for the current block according to the second information, determining whether to apply the intra/inter combination prediction mode to the current block, based on the size and the width of the current block.

According to an embodiment, the determining of whether to apply the triangular partition prediction mode to the current block, based on the size and the width of the current block, may include, when multiplication of the size and the width of the current block is smaller than 64, the size of the current block is greater than a maximum size of a coding unit, or the width of the current block is greater than the maximum size of the coding unit, determining that it is unavailable to apply the triangular partition prediction mode to the current block.

According to an embodiment, the determining of whether to apply the intra/inter combination prediction mode to the current block, based on the size and the width of the current block may include, when multiplication of the size and the width of the current block is smaller than 64, the size of the current block is greater than a maximum size of a coding unit, or the width of the current block is greater than the maximum size of the coding unit, determining that it is unavailable to apply the intra/inter combination prediction mode to the current block.

According to an embodiment of the disclosure, provided is a computer-readable recording medium having recorded thereon a program for implementing the video decoding method on a computer.

According to an embodiment of the disclosure, provided is a computer-readable recording medium having recorded thereon a program for implementing the video encoding method on a computer.

MODE OF DISCLOSURE

As the disclosure allows for various changes and numerous embodiments, particular embodiments will be illustrated in the drawings and described in detail in the written descriptions. However, this is not intended to limit the disclosure to particular modes of practice, and it will be understood that all changes, equivalents, and substitutes that do not depart from the spirit and technical scope of various embodiments are encompassed in the disclosure.

In the description of embodiments, detailed explanations of related art are omitted when it is deemed that they may unnecessarily obscure the essence of the disclosure. Also, numbers (for example, a first, a second, and the like) used in the descriptions of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, coding unit, prediction unit, or transform unit of a current image to be encoded or decoded.

In the present specification, a motion vector in a direction of a list 0 may denote a motion vector used to indicate a block in a reference picture included in the list 0, and a motion vector in a direction of a list 1 may denote a motion vector used to indicate a block in a reference picture included in the list 1. Also, a motion vector in a unidirection may denote a motion vector used to indicate a block in a reference picture included in the list 0 or list 1, and a motion vector in a bidirection may denote that the motion vector includes a motion vector in a direction of the list 0 and a motion vector in a direction of the list 1.

Hereinafter, an image encoding apparatus and an image decoding apparatus, and an image encoding method and an image decoding method according to embodiments will be described with reference to FIGS. 1 to 16. A method of determining a data unit of an image, according to an embodiment, will be described with reference to FIGS. 3 to 16, and a video encoding/decoding method using a merge mode with motion vector difference (MMVD) will be described with reference to FIGS. 17 to 37.

Hereinafter, with reference to FIGS. 1 and 2, a method and apparatus for adaptive selection based on coding units of various shapes according to an embodiment of the disclosure will be described.

FIG. 1 is a schematic block diagram of an image decoding apparatus according to an embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 to be described below. Also, the bitstream may be transmitted from the image encoding apparatus 2200. The image encoding apparatus 2200 and the image decoding apparatus 100 may be connected by wire or wirelessly, and the receiver 110 may receive the bitstream by wire or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
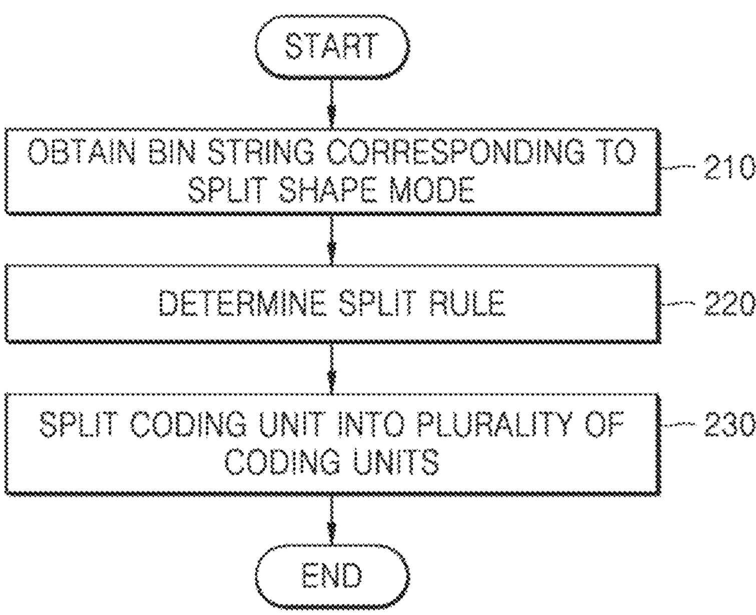
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into MxN coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
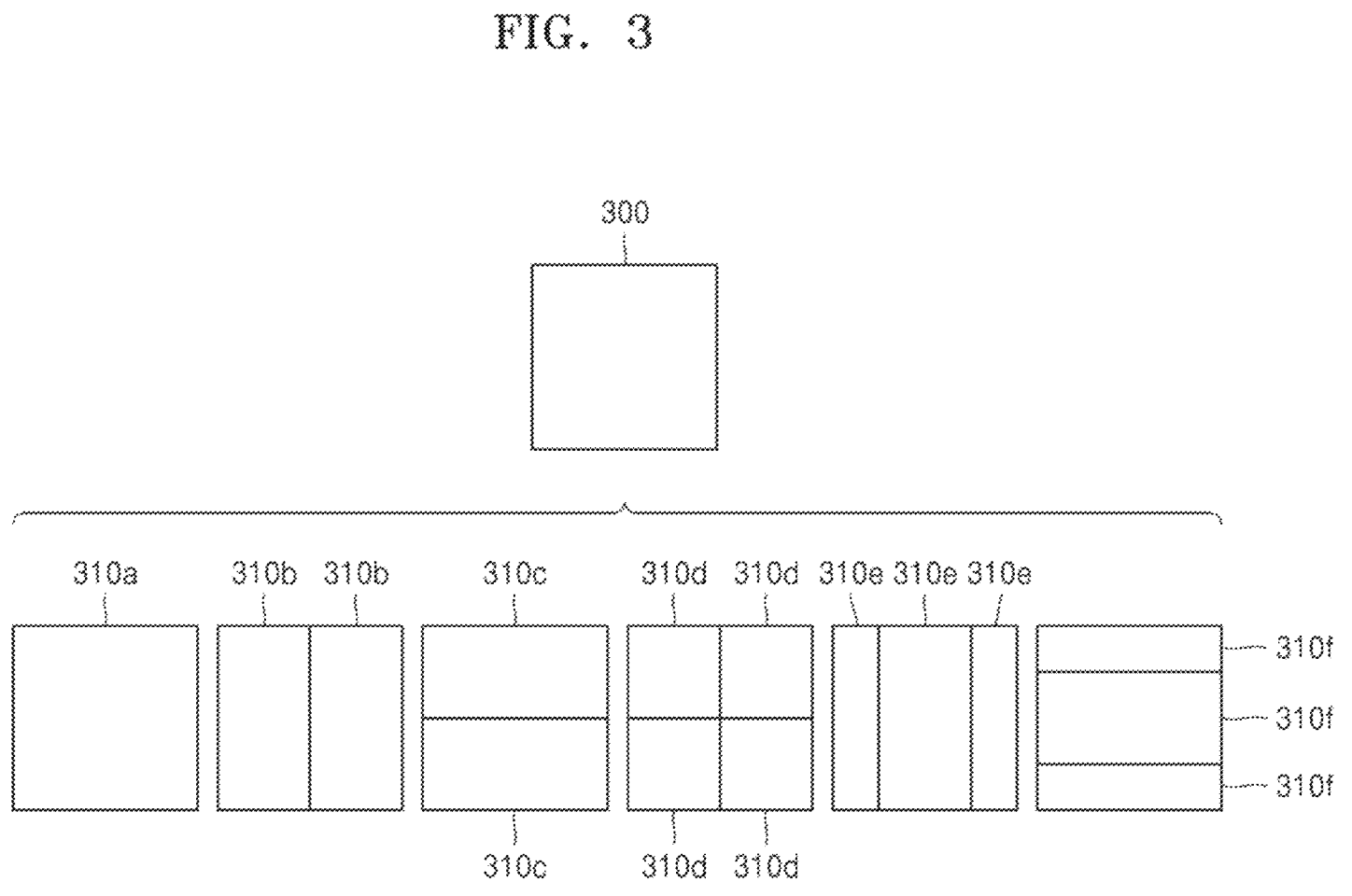

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310*a* having the same size as the current coding unit 300, based on the split shape mode information indicating not to perform splitting, or may determine coding units 310*b*, 310*c*, 310*d*, 310*e*, or 310*f* split based on the split shape mode information indicating a predetermined splitting method.

Referring to FIG. 3, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment, the image decoding apparatus 100 may determine three coding units 310*e* obtained by splitting the current coding unit 300 in a vertical direction, based on the split shape mode information indicating to perform ternary splitting in a vertical direction. The image decoding apparatus 100 may determine three coding units 310*f* obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

Figure 4:
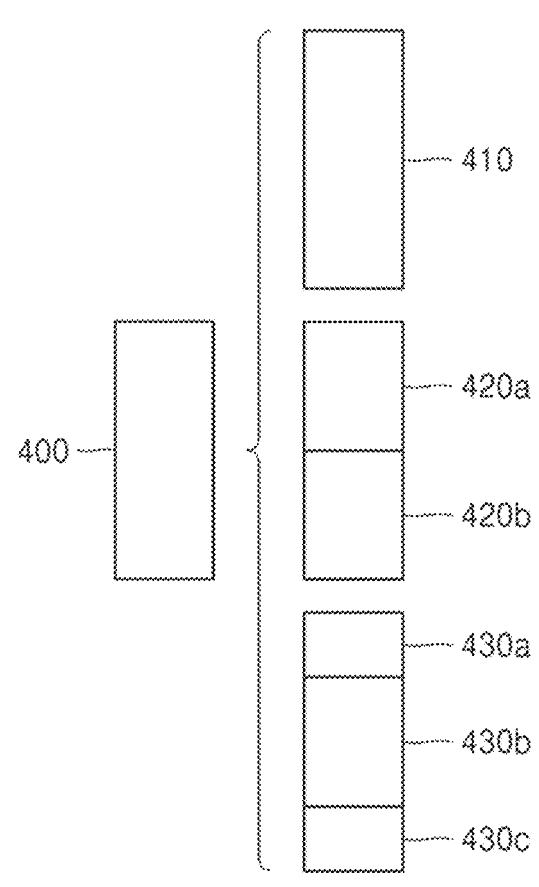
FIG. 4 illustrates a process, performed by an image decoding apparatus, of determining at least one coding unit by splitting a non-square coding unit, according to an embodiment.
Figure 4:
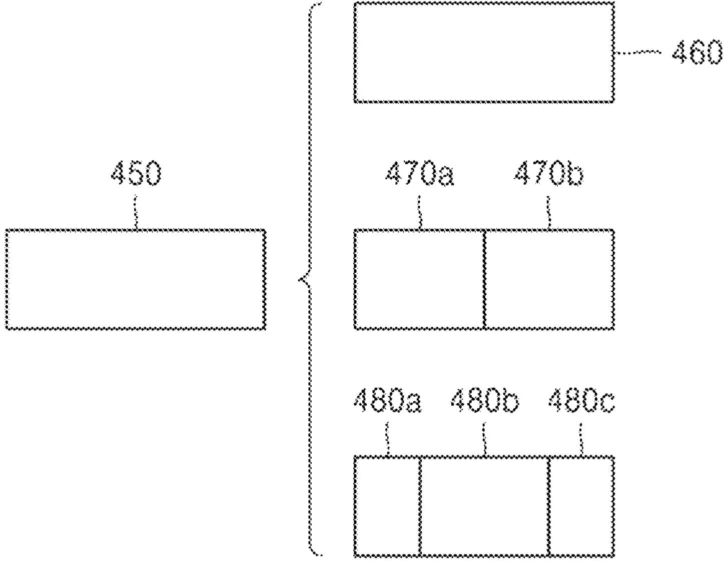

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420*a* and 420*b*, 430*a* to 430*c*, 470*a* and 470*b*, or 480*a* to 480*c* split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a*, 430*b*, and 430*c* by splitting the current coding unit 400 in the horizontal direction. Also, when the current coding unit 450 is in the horizontal direction, the image decoding apparatus 100 may determine the coding units 480*a*, 480*b*, and 480*c* by splitting the current coding unit 450 in the vertical direction.

According to an embodiment, the image decoding apparatus 100 may determine an odd number of coding units included in the current coding unit 400 or 450, and not all the determined coding units may have the same size. For example, a predetermined coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a predetermined restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c*, or 480*a*, 480*b*, and 480*c* generated as the current coding unit 400 or 450 is split to be different from that of the other coding units 430*a* and 430*c*, or 480*a* and 480*c*. For example, the image decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 5:
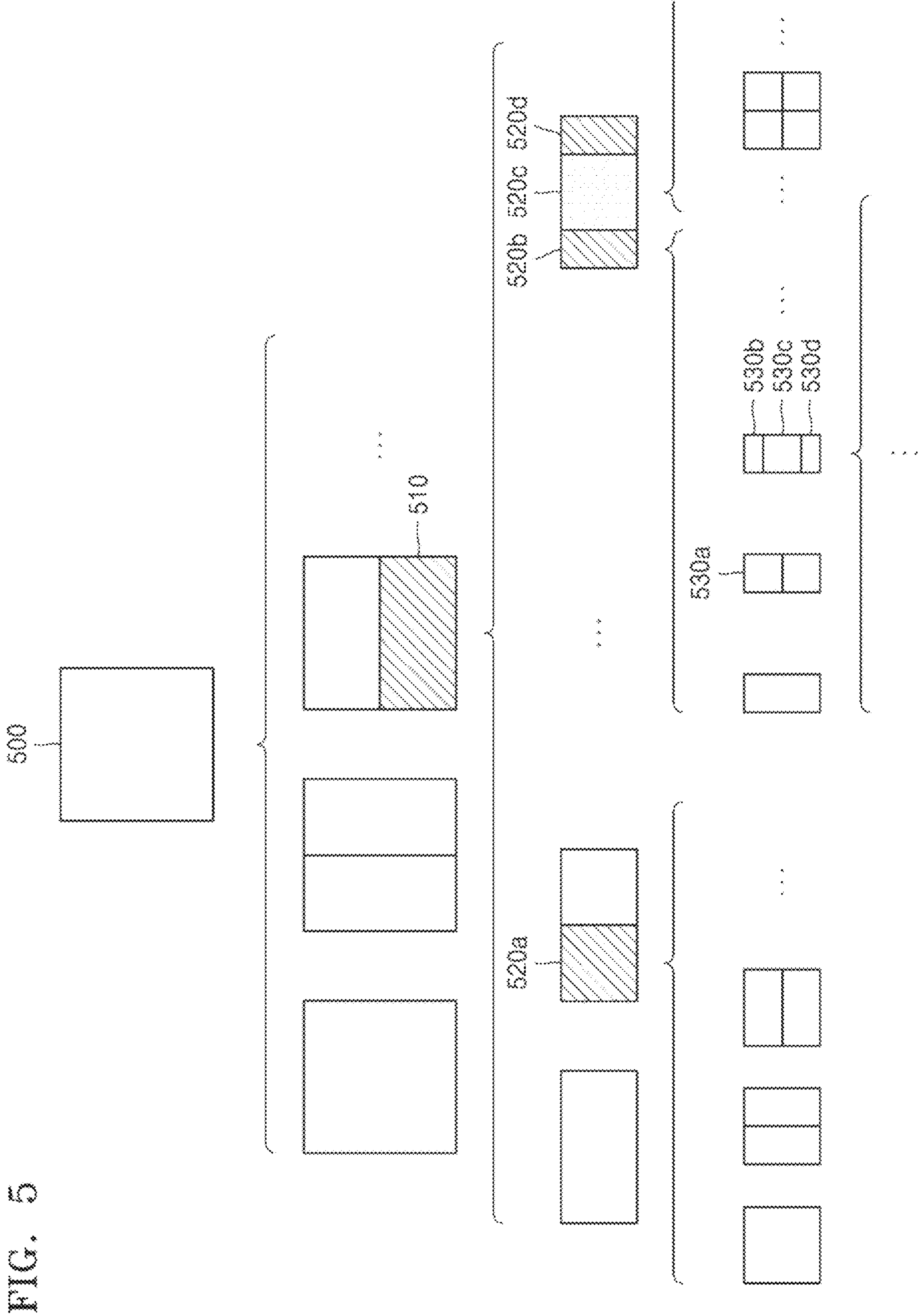
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or to not split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or to not split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, 520*b*, 520*c*, and 520*d* based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520*a*, or 520*b*, 520*c*, and 520*d*) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit located at a center location, or a square coding unit) from among an odd number of third coding units 520*b*, 520*c*, and 520*d* determined by splitting the non-square second coding unit 510 may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be re-split into a plurality of coding units. For example, the non-square fourth coding unit 530*b* or 530*d* may be re-split into an odd number of coding units. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine to not split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a predetermined restriction on a predetermined third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520_b_, 520_c_, and 520_d_ included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520_c_ at the center location are not limited to the above-described examples, and may include various restrictions for decoding the third coding unit 520_c_ at the center location differently from the other third coding units 520_b_ and 520_d_.

According to an embodiment, the image decoding apparatus 100 may obtain the split shape mode information, which is used to split a current coding unit, from a predetermined location in the current coding unit.

Figure 6:
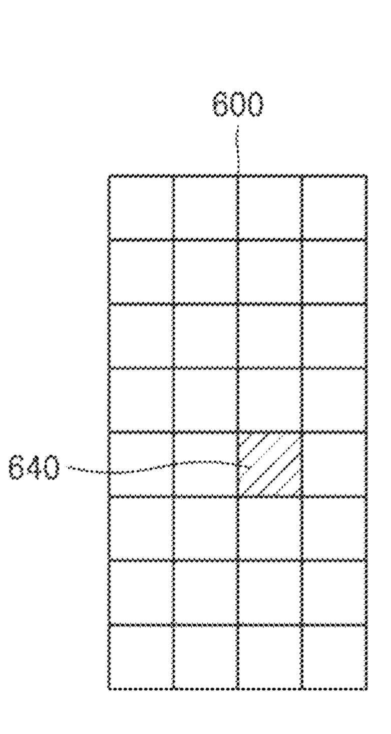
FIG. 6 illustrates a method, performed by an image decoding apparatus, of determining a predetermined coding unit from among an odd number of coding units, according to an embodiment.
Figure 6:
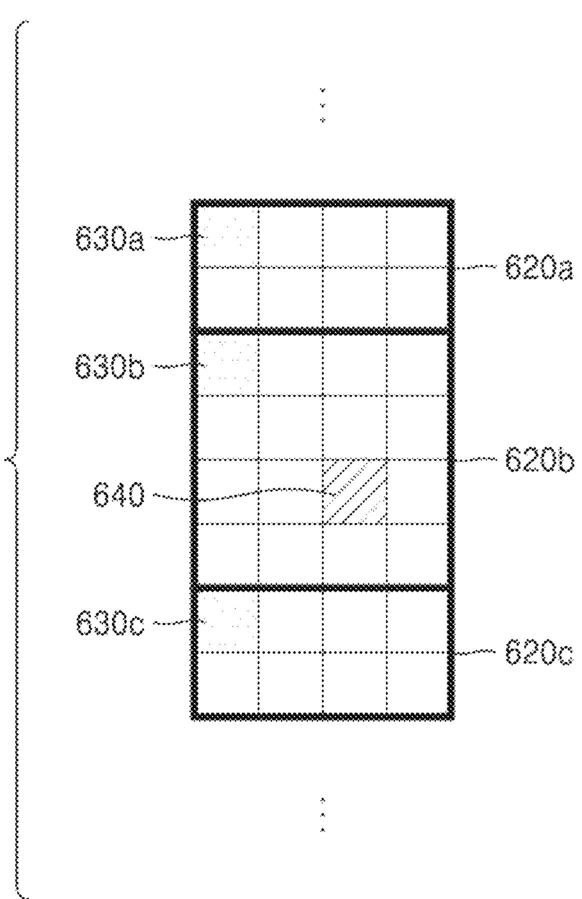
Figure 6:
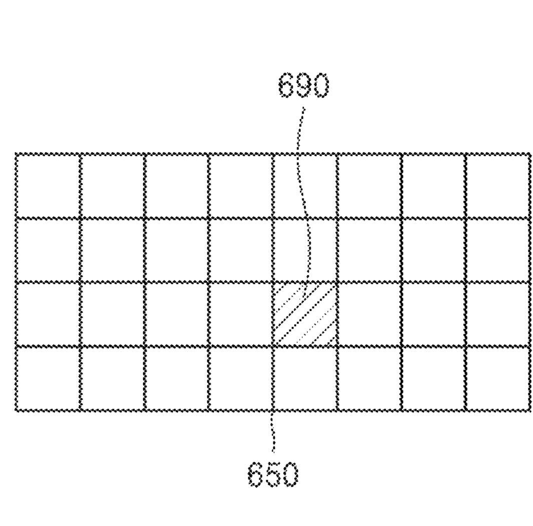
Figure 6:
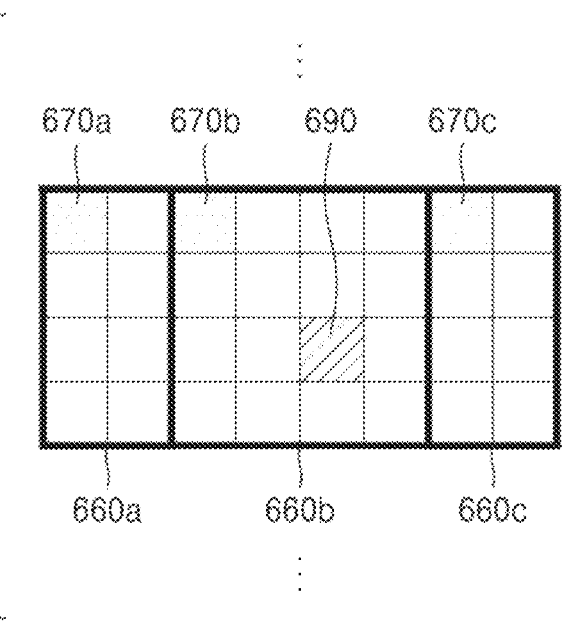

FIG. 6 illustrates a method, performed by an image decoding apparatus, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the predetermined location and may determine to split or to not split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620_a_, 620_b_, and 620_c_ or the odd number of coding units 660_a_, 660_b_, and 660_c_ by splitting the current coding unit 600 or the current coding unit 650. The image decoding apparatus 100 may determine the middle coding unit 620_b_ or the middle coding unit 660_b_ by using information about the locations of the odd number of coding units 620_a_, 620_b_, and 620_c_ or the odd number of coding units 660_a_, 660_b_, and 660_c_. For example, the image decoding apparatus 100 may determine the coding unit 620_b_ of the center location by determining the locations of the coding units 620_a_, 620_b_, and 620_c_ based on information indicating locations of predetermined samples included in the coding units 620_a_, 620_b_, and 620_c_. In detail, the image decoding apparatus 100 may determine the coding unit 620_b_ at the center location by determining the locations of the coding units 620_a_, 620_b_, and 620_c_ based on information indicating locations of upper-left samples 630_a_, 630_b_, and 630_c_ of the coding units 620_a_, 620_b_, and 620_c_.

According to an embodiment, the information indicating the locations of the upper-left samples 630_a_, 630_b_, and 630_c_, which are included in the coding units 620_a_, 620_b_, and 620_c_, respectively, may include information about locations or coordinates of the coding units 620_a_, 620_b_, and 620_c_ in a picture. According to an embodiment, the information indicating the locations of the upper-left samples 630_a_, 630_b_, and 630_c_, which are included in the coding units 620_a_, 620_b_, and 620_c_, respectively, may include information indicating widths or heights of the coding units 620_a_, 620_b_, and 620_c_ included in the current coding unit 600, and the widths or heights may correspond to information indicating differences between the coordinates of the coding units 620_a_, 620_b_, and 620_c_ in the picture. That is, the image decoding apparatus 100 may determine the coding unit 620_b_ at the center location by directly using the information about the locations or coordinates of the coding units 620_a_, 620_b_, and 620_c_ in the picture, or by using the information about the widths or heights of the coding units, which correspond to the difference values between the coordinates.

According to an embodiment, information indicating the location of the upper-left sample 630_a_ of the upper coding unit 620_a_ may include coordinates (xa, ya), information indicating the location of the upper-left sample 630_b_ of the center coding unit 620_b_ may include coordinates (xb, yb), and information indicating the location of the upper-left sample 630_c_ of the lower coding unit 620_c_ may include coordinates (xc, yc). The image decoding apparatus 100 may determine the middle coding unit 620_b_ by using the coordinates of the upper-left samples 630_a_, 630_b_, and 630_c_ which are included in the coding units 620_a_, 620_b_, and 620_c_, respectively. For example, when the coordinates of the upper-left samples 630_a_, 630_b_, and 630_c_ are sorted in an ascending or descending order, the coding unit 620_b_ including the coordinates (xb, yb) of the sample 630_b_ at a center location may be determined as a coding unit at a center location from among the coding units 620_a_, 620_b_, and 620_c_ determined by splitting the current coding unit 600. However, the coordinates indicating the locations of the upper-left samples 630_a_, 630_b_, and 630_c_ may include coordinates indicating absolute locations in the picture, or may use coordinates (dxb, dyb) indicating a relative location of the upper-left sample 630_b_ of the middle coding unit 620_b_ and coordinates (dxc, dyc) indicating a relative location of the upper-left sample 630_c_ of the lower coding unit 620_c_ with reference to the location of the upper-left sample 630_a_ of the upper coding unit 620_a_. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620_a_, 620_b_, and 620_c_, and may select one of the coding units 620_a_, 620_b_, and 620_c_ based on a predetermined criterion. For example, the image decoding apparatus 100 may select the coding unit 620_b_, which has a size different from that of the others, from among the coding units 620_a_, 620_b_, and 620_c_.

According to an embodiment, the image decoding apparatus 100 may determine the width or height of each of the coding units 620_a_, 620_b_, and 620_c_ by using the coordinates (xa, ya) that is the information indicating the location of the upper-left sample 630_a_ of the upper coding unit 620_a_, the coordinates (xb, yb) that is the information indicating the location of the upper-left sample 630*b* of the middle coding unit 620*b*, and the coordinates (xc, yc) that are the information indicating the location of the upper-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a*, 620*b*, and 620*c*. Referring to FIG. 6, the image decoding apparatus 100 may determine the middle coding unit 620*b*, which has a size different from the size of the upper and lower coding units 620*a* and 620*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660*a*, 660*b*, and 660*c* by using the coordinates (xd, yd) that are information indicating the location of an upper-left sample 670*a* of the left coding unit 660*a*, the coordinates (xe, ye) that are information indicating the location of an upper-left sample 670*b* of the middle coding unit 660*b*, and the coordinates (xf, yf) that are information indicating a location of the upper-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from the sizes of the left and right coding units 660*a* and 660*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620*b* including a sample, from which predetermined information (e.g., the split shape mode information) can be obtained, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620*b* including the sample 640, in a decoding operation. However, the location of the sample from which the predetermined information can be obtained is not limited to the above-described location, and may include arbitrary locations of samples included in the coding unit 620*b* to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information can be obtained, by using at least one of information about the width of the current coding unit and information about the height of the current coding unit. As another example, when the block shape information of the current coding unit indicates a non-square shape, the image decoding apparatus 100 may determine one of samples including a boundary for splitting a long side of the current coding unit in half, as the sample from which the predetermined information can be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
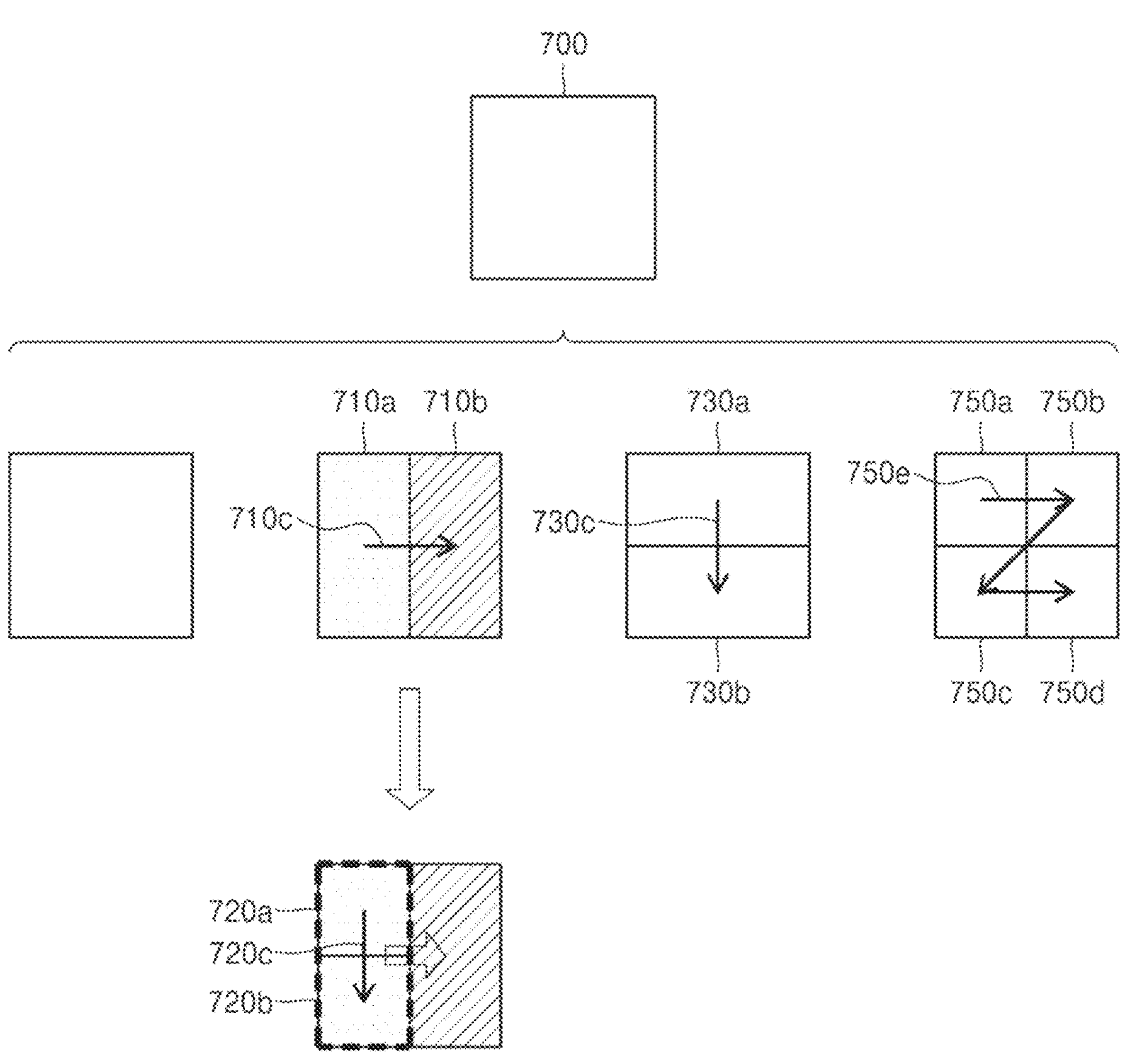
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a*, 750*b*, 750*c*, and 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine the second coding units 750*a*, 750*b*, 750*c*, and 750*d*, which are determined by splitting the first coding unit 700 in vertical and horizontal directions, according to a predetermined order (e.g., a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a*, 750*b*, 750*c*, and 750*d* by splitting the first coding unit 700, and may recursively split each of the determined plurality of coding units 710*a*, 710*b*, 730*a*, 730*b*, 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. Accordingly, each of the plurality of coding units 710*a* and 710*b*, 730*a* and 730*b*, or 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or to not split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Also, because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a predetermined order.

Figure 8:
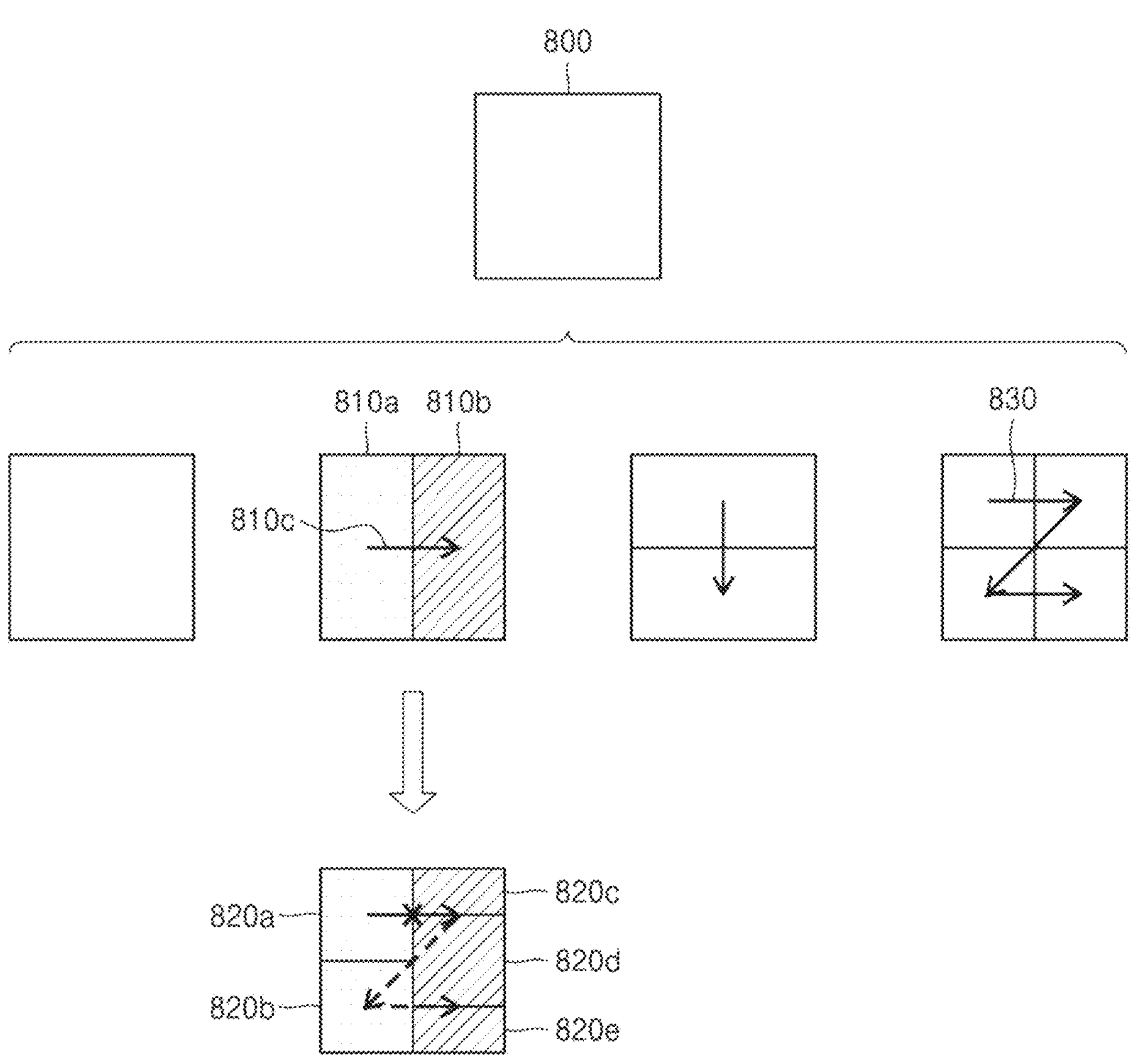
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by an image decoding apparatus, of determining that a current coding unit is to be split into an odd number of coding units, when the coding units are not processable in a predetermined order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c*, 820*d*, and 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c*, 820*d*, and 820*e*.

According to an embodiment, the video decoding apparatus 100 may determine whether any coding unit is split into an odd number of coding units, by determining whether the third coding units 820*a* and 820*b*, and 820*c*, 820*d*, and 820*e* are processable in a predetermined order. Referring to FIG. 8, the image decoding apparatus 100 may determine the third coding units 820*a* and 820*b*, and 820*c*, 820*d*, and 820*e* by recursively splitting the first coding unit 800. The image decoding apparatus 100 may determine whether any of the first coding unit 800, the second coding units 810*a* and 810*b*, or the third coding units 820*a* and 820*b*, and 820*c*, 820*d*, and 820*e* are split into an odd number of coding units, based on at least one of the block shape information and the split shape mode information. For example, a coding unit located in the right from among the second coding units 810*a* and 810*b* may be split into an odd number of third coding units 820*c*, 820*d*, and 820*e*. A processing order of a plurality of coding units included in the first coding unit 800 may be a predetermined order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the predetermined order.

According to an embodiment, the image decoding apparatus 100 may determine whether the third coding units 820*a* and 820*b*, and 820*c*, 820*d*, and 820*e* included in the first coding unit 800 satisfy the condition for processing in the predetermined order, and the condition relates to whether at least one of a width and height of the second coding units 810*a* and 810*b* is to be split in half along a boundary of the third coding units 820*a* and 820*b*, and 820*c*, 820*d*, and 820*e*. For example, the third coding units 820*a* and 820*b* determined when the height of the left second coding unit 810*a* of the non-square shape is split in half may satisfy the condition. It may be determined that the third coding units 820*c*, 820*d*, and 820*e* do not satisfy the condition because the boundaries of the third coding units 820*c*, 820*d*, and 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
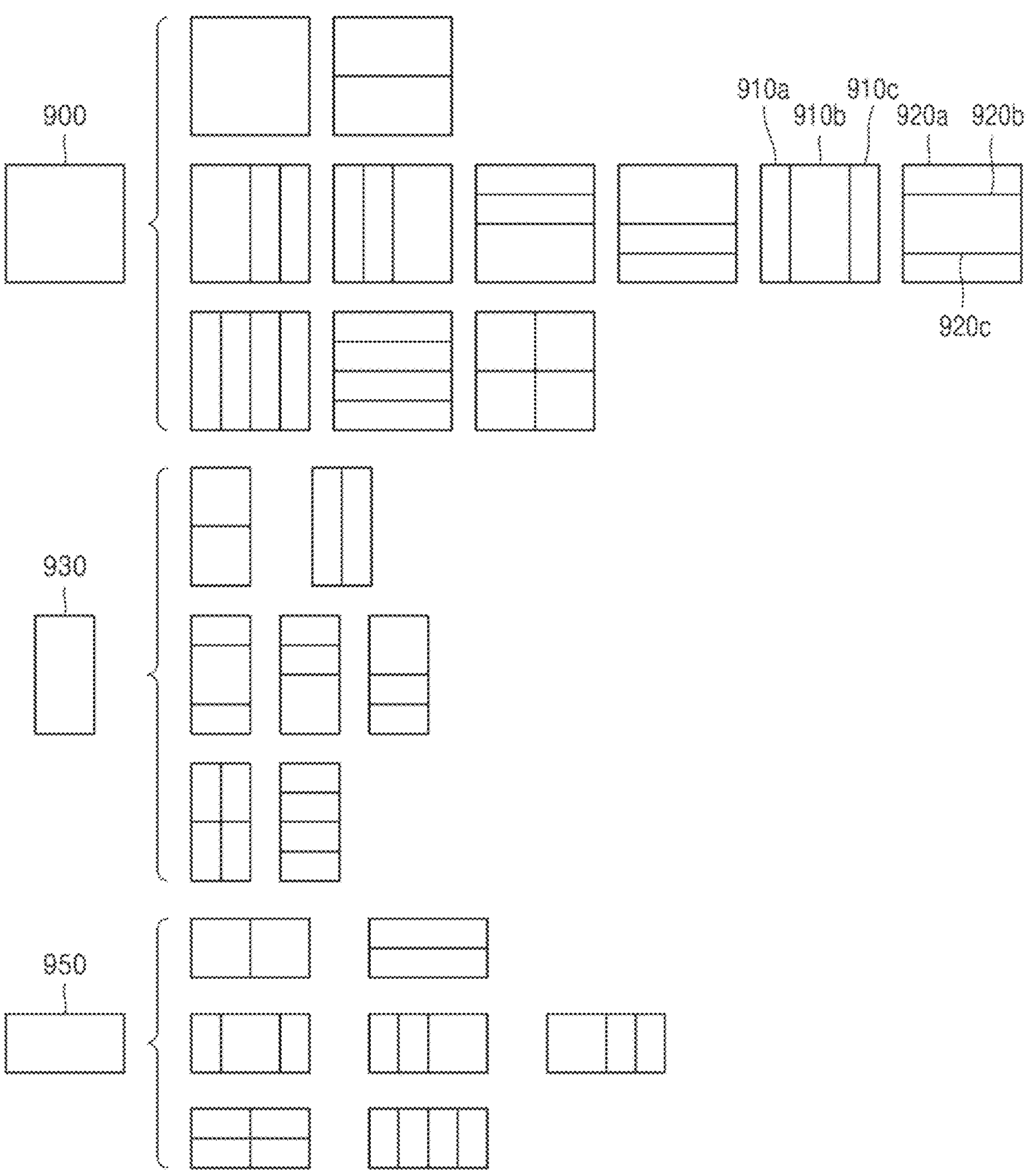
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split a first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a predetermined order, and the condition relates to whether at least one of a width and height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the predetermined order. Also, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
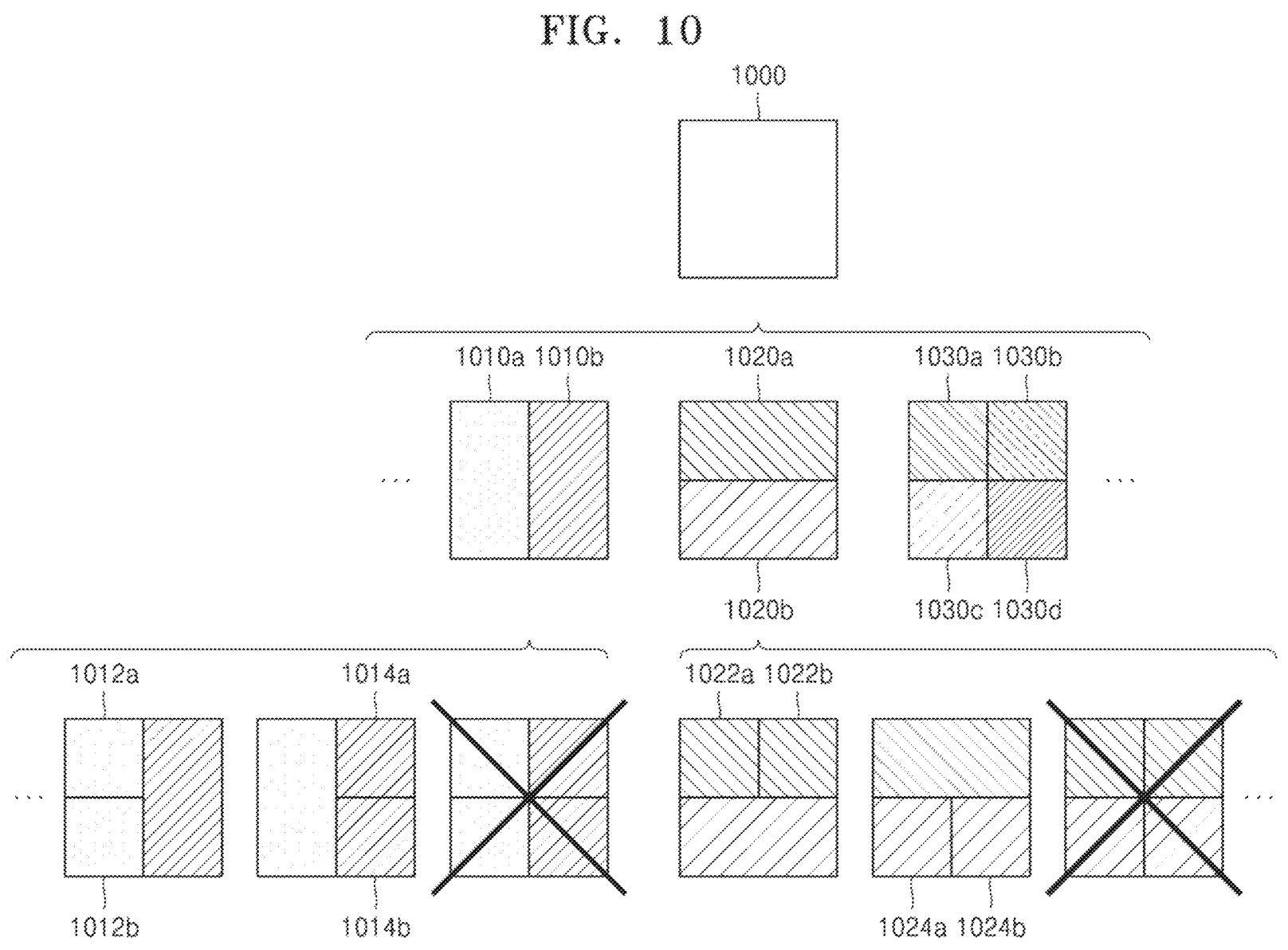

FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

According to an embodiment, the image decoding apparatus 100 may determine to split a square first coding unit 1000 into non-square second coding units 1010*a*, and 1010*b* or 1020*a* and 1020*b*, based on split shape mode information, which is obtained by the receiver 110. The second coding units 1010*a* and 1010*b*, or 1020*a* and 1020*b* may be independently split. As such, the image decoding apparatus 100 may determine to split or to not split each of the second coding units 1010*a* and 1010*b*, or 1020*a* and 1020*b* into a plurality of coding units, based on the split shape mode information of each of the second coding units 1010*a* and 1010*b*, or 1020*a* and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* to not be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b*, or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an embodiment, the image decoding apparatus 100 may determine third coding units 1022*a* and 1022*b*, or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) to not be split in a vertical direction in which the upper second coding unit 1020*a* is split.

Figure 11:
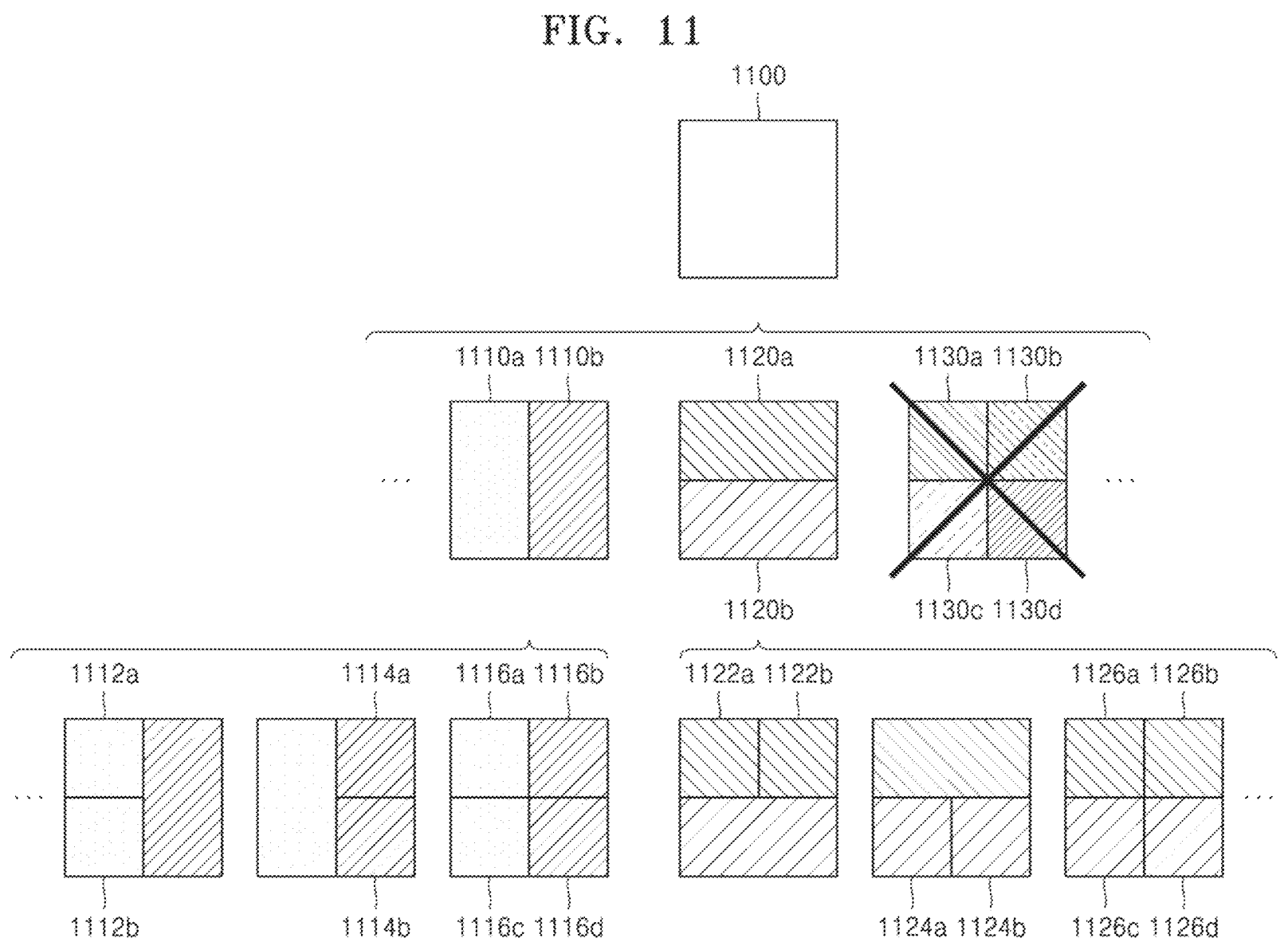

FIG. 11 illustrates a process, performed by an image decoding apparatus, of splitting a square coding unit when split shape mode information indicates that the square coding unit is to not be split into four square coding units, according to an embodiment.

According to an embodiment, the image decoding apparatus 100 may determine second coding units 1110*a* and 1110*b*, or 1120*a* and 1120*b*, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b*, or 1120*a* and 1120*b*, etc., based on the split shape mode information.

According to an embodiment, the image decoding apparatus 100 may independently split the non-square second coding units 1110*a* and 1110*b*, or 1120*a* and 1120*b*, etc. Each of the second coding units 1110*a* and 1110*b*, or 1120*a* and 1120*b*, etc. may be recursively split in a predetermined order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both of the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units

1126*a*, 1126*b*, 1126*c*, and 1126*d* by splitting both the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
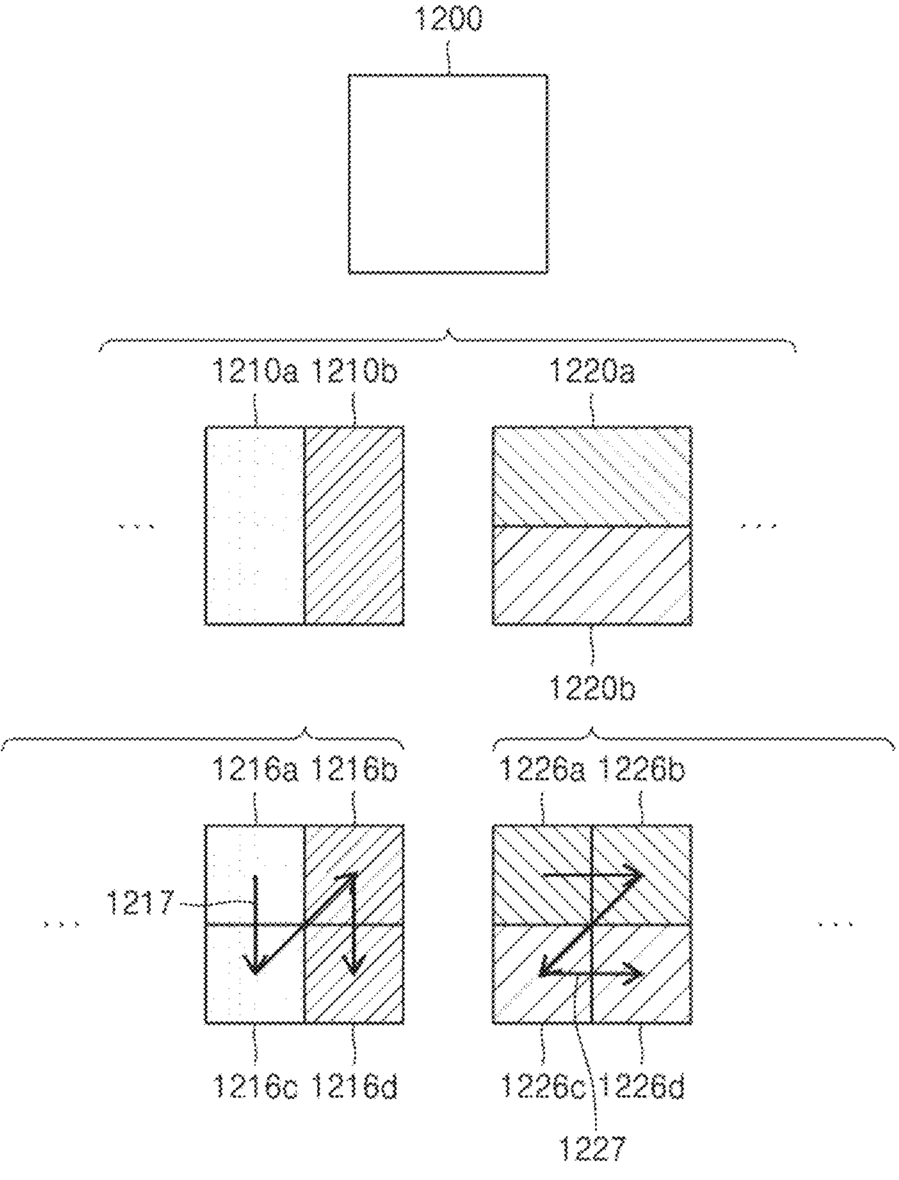
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210*a* and 1210*b*, or 1220*a* and 1220*b*, etc. by splitting the first coding unit 1200. Referring to FIG. 12, the non-square second coding units 1210*a* and 1210*b*, or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b*, or 1220*a* and 1220*b* has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a split shape by which the first coding unit 1200 is split.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

FIG. 14 illustrates depths that are determinable based on shapes and sizes of coding units, and part indices (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of vertical and horizontal directions based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a predetermined location of each coding unit (e.g., an upper-left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
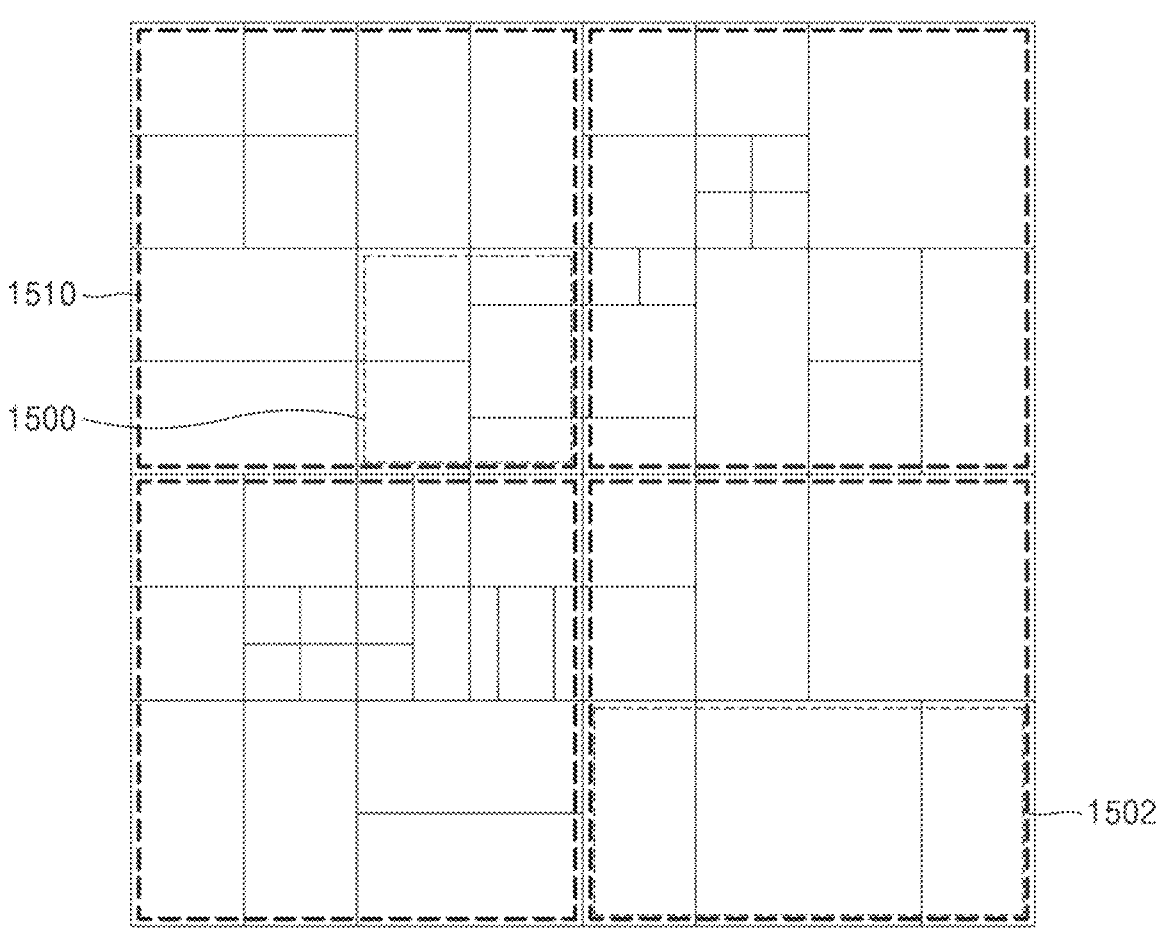
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit.

The operation of splitting the reference data unit may correspond to a splitting operation using a quadtree structure.

According to an embodiment, the image decoding apparatus 100 may predetermine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units predetermined based on a predetermined condition. That is, the receiver 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 100 may determine at least one of the size and shape of reference coding units included in a data unit serving as a unit for obtaining the PID, by selecting the predetermined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image decoding apparatus 100 may predetermine to determine the split rule based on the block shape of the coding unit. However, the embodiment is not limited thereto. The image decoding apparatus 100 may determine the split rule based on the information obtained from the received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Figure 16:
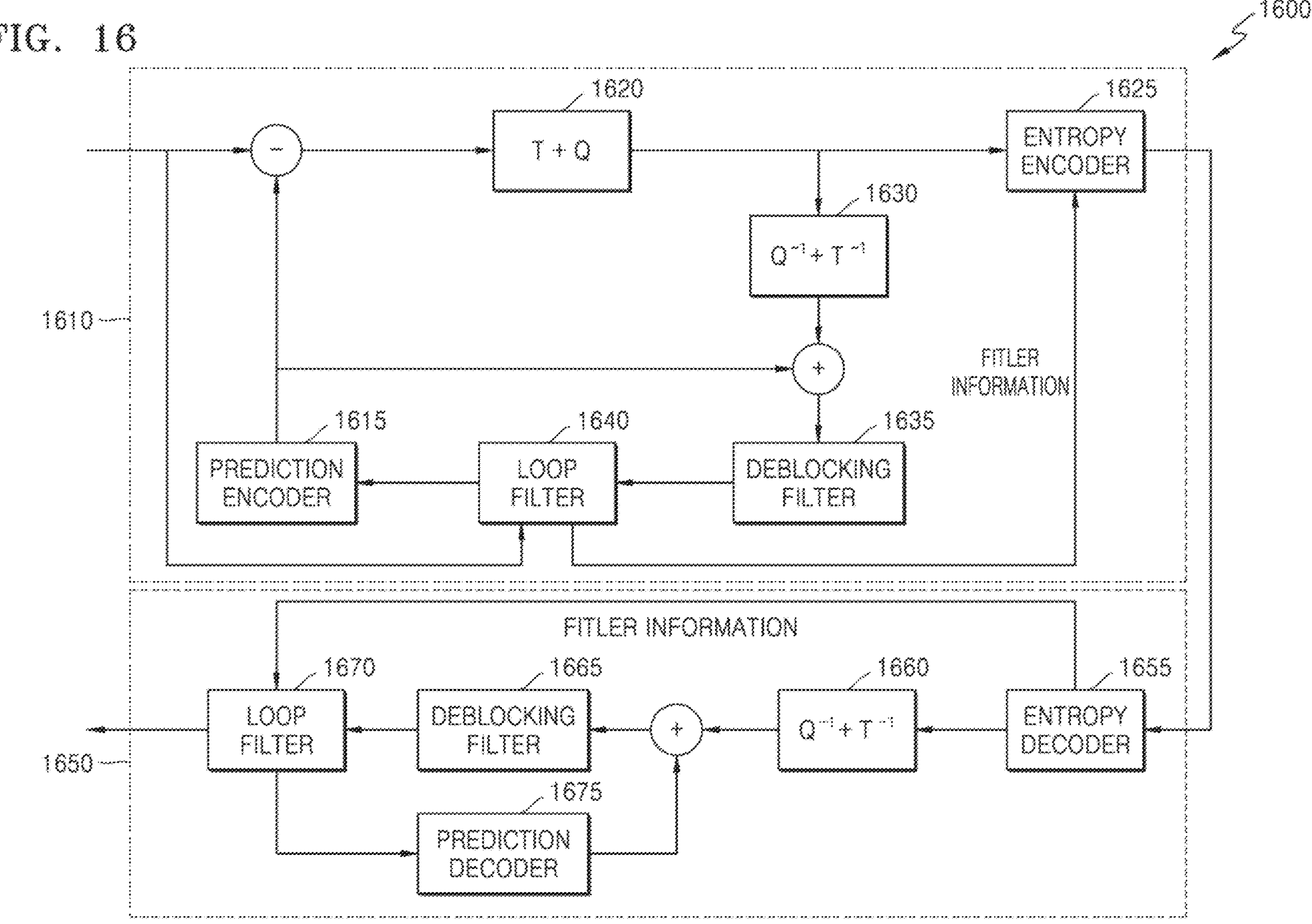
FIG. 16 is a block diagram of an image encoding and decoding system.

FIG. 16 is a block diagram of an image encoding and decoding system.

An encoding end 1610 of an image encoding and decoding system 1600 transmits an encoded bitstream of an image and a decoding end 1650 outputs a reconstructed image by receiving and decoding the bitstream. Here, the decoding end 1550 may have a similar configuration as the image decoding apparatus 100.

At the encoding end 1610, a prediction encoder 1615 outputs a reference image via inter-prediction and intra-prediction, and a transformer and quantizer 1620 quantizes residual data between the reference picture and a current input image to a quantized transform coefficient and outputs the quantized transform coefficient. An entropy encoder 1625 transforms the quantized transform coefficient by encoding the quantized transform coefficient, and outputs the transformed quantized transform coefficient as a bitstream. The quantized transform coefficient is reconstructed as data of a spatial domain via an inverse quantizer and inverse transformer 1630, and the data of the spatial domain is output as a reconstructed image via a deblocking filter 1635 and a loop filter 1640. The reconstructed image may be used as a reference image of a next input image via the prediction encoder 1615.

Encoded image data among the bitstream received by the decoding end 1650 is reconstructed as residual data of a spatial domain via an entropy decoder 1655 and an inverse quantizer and inverse transformer 1660. Image data of a spatial domain is configured when a reference image and residual data output from a prediction decoder 1675 are combined, and a deblocking filter 1665 and a loop filter 1670 may output a reconstructed image regarding a current original image by performing filtering on the image data of the spatial domain. The reconstructed image may be used by the prediction decoder 1675 as a reference image for a next original image.

The loop filter 1640 of the encoding end 1610 performs loop filtering by using filter information input according to a user input or system setting. The filter information used by the loop filter 1640 is output to the entropy encoder 1625 and transmitted to the decoding end 1650 together with the encoded image data. The loop filter 1670 of the decoding end 1650 may perform loop filtering based on the filter information input from the decoding end 1650.

Hereinafter, with reference to FIGS. 17 to 20, a method and apparatus for encoding or decoding a video by expanding a merge mode with motion vector difference, according to an embodiment disclosed in the present specification will now be described.

Figure 17:
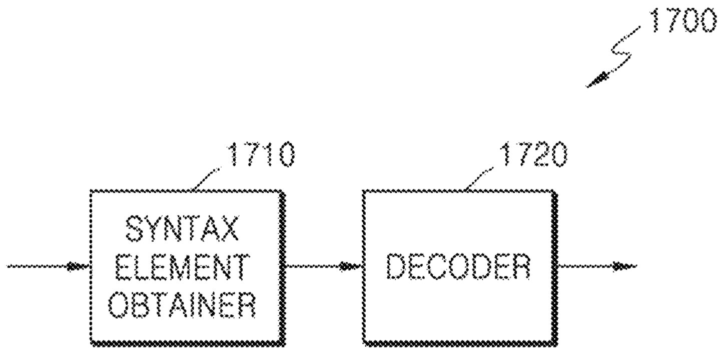
FIG. 17 is a detailed block diagram of a video decoding apparatus according to an embodiment.

FIG. 17 is a block diagram of a video decoding apparatus according to an embodiment.

Referring to FIG. 17, a video decoding apparatus 1700 according to an embodiment may include a syntax element obtainer 1710 and a decoder 1720.

The video decoding apparatus 1700 may obtain a bitstream generated as a result of encoding an image, and may decode motion information for inter-prediction based on information included in the bitstream.

The video decoding apparatus 1700 according to an embodiment may include a central processor (not shown) for controlling the syntax element obtainer 1710 and the decoder 1720. Alternatively, the syntax element obtainer 1710 and the decoder 1720 may operate by their own processors (not shown), and the processors may systematically operate with each other to operate the video decoding apparatus 1700. Alternatively, the syntax element obtainer 1710 and the decoder 1720 may be controlled according to control by an external processor (not shown) of the video decoding apparatus 1700.

The video decoding apparatus 1700 may include one or more data storages (not shown) storing input/output data of the syntax element obtainer 1710 and the decoder 1720. The video decoding apparatus 1700 may include a memory controller (not shown) for controlling data input and output to and from the data storage.

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 according to an embodiment may perform a basic image decoding operation in a manner that not only a separate processor but also an image decoding processing module included in a central processing apparatus or a graphic processing apparatus perform the basic image decoding operation.

The video decoding apparatus 1700 may be included in the image decoding apparatus 100 described above. For example, the syntax element obtainer 1710 may be included in the receiver 110 of the image decoding apparatus 100 of FIG. 1, and the syntax element obtainer 1710 and the decoder 1720 may be included in the decoder 120 of the image decoding apparatus 100.

The syntax element obtainer 1710 receives a bitstream generated as a result of encoding an image. The bitstream may include information for determining a motion vector used for inter prediction of a current block. The current block is a block generated when an image is split according to a tree structure, and for example, may correspond to a largest coding unit, a coding unit, or a transform unit.

The syntax element obtainer 1710 may determine the current block based on block shape information and/or information about a split shape mode, which are included in at least one of a sequence parameter set, a picture parameter set, a video parameter set, a slice header, and a slice segment header. Furthermore, the syntax element obtainer 1710 may obtain, from the bitstream, a syntax element corresponding to the block shape information or the information about the split shape mode according to each largest coding unit, each reference coding unit, or each processing block, and may use the obtained syntax element to determine the current block.

The bitstream may include information indicating a prediction mode of the current block, and the prediction mode of the current block may include an intra mode and an inter mode. When the prediction mode of the current block is the inter mode, an encoding/decoding scheme of a motion vector may include at least one of a merge mode, a skip mode, and an MMVD mode. In the merge mode or the skip mode, a merge candidate list including motion vector candidates is used, and one motion vector candidate indicated by a merge index from among the motion vector candidates may be determined to be a merge motion vector candidate. The MMVD mode represents a merge mode with motion vector difference, and may be a mode in which a prediction motion vector of the current block is determined by applying a motion vector difference distinguished according to a distance of a difference and a direction of the distance, to one base motion vector determined from among the motion vector candidates.

According to an embodiment, information related to the MMVD mode may be obtained from the bitstream. The information related to the MMVD mode according to an embodiment may include at least one of information indicating whether the MMVD mode is used for the current block (hereinafter, MMVD information), information indicating the base motion vector of the current block (hereinafter, merge index), information indicating the distance of the difference from the base motion vector to motion vector candidates (hereinafter, a distance index of a difference), and information indicating the difference direction from the base motion vector to the motion vector candidates (hereinafter, a direction index of the difference).

The syntax element obtainer 1710 may obtain the information related to the MMVD mode in the form of a syntax element from a syntax corresponding to at least one unit from among a coding unit, a transform unit, a largest coding unit, a slice unit, and a picture unit.

The video decoding apparatus 1700 may receive the syntax in the form of a bitstream, may obtain the syntax element from the syntax by performing entropy decoding, and may interpret various pieces of information indicated by each syntax element. Therefore, it may be understood that the syntax element obtainer 1710 obtains various pieces of information (syntax elements) from the bitstream (syntax).

The decoder 1720 may verify whether the MMVD mode is used for the current block, based on the MMVD information obtained from the bitstream. The information indicating whether the MMVD mode is applied may include a flag or an index.

According to an embodiment, the MMVD mode may be applied to various tools that are available in an inter prediction mode. Accordingly, the video decoding apparatus 1700 needs to determine whether the MMVD mode is applied to each tool of the inter prediction mode.

For example, in a first scheme, whether the MMVD mode is applied to each tool may be determined only.

As another example, in a second scheme, after whether the MMVD mode is applied to all tools is first determined, if applicable, whether the MMVD mode is applied to each tool is determined. When the MMVD mode is not applied to all tools, it is not necessary to determine whether the MMVD mode is applied to each tool.

To determine whether to apply the MMVD mode, the video decoding apparatus 1700 according to an embodiment may obtain, from a bitstream, a syntax element including information such as a flag. Therefore, in the first scheme, even when the MMVD mode is not applied to various tools, the video decoding apparatus 1700 has to obtain, from a bitstream, a flag for determining that the MMVD mode is not applied to each of various tools.

However, according to the second scheme, the video decoding apparatus 1700 may first obtain, from the bitstream, a flag indicating whether the MMVD mode is enabled for various tools. When the MMVD mode is applicable, based on the flag, the video decoding apparatus 1700 may obtain a flag for each tool so as to determine whether the MMVD mode is applied. When the MMVD mode is not applicable, based on the flag indicating whether the MMVD mode is enabled for various tools, the video decoding apparatus 1700 does not need to additionally obtain a flag indicating whether the MMVD mode is applied to each tool, such that decoding efficiency may be increased.

Hereinafter, an embodiment will now be described, in which, for each sequence and according to the second scheme, the video decoding apparatus 1700 first determines whether the MMVD mode is applicable, and if applicable, determines whether the MMVD mode is applied to a particular tool.

The syntax element obtainer 1710 according to an embodiment may obtain, from a sequence parameter set, sequence MMVD information indicating whether the MMVD mode is applicable in a current sequence. The MMVD mode in a sequence collectively refers to prediction modes of adjusting a motion vector by using a distance index and a direction index of the motion vector which are signaled separately from the motion vector, in various inter prediction modes performed at a data level equal to or less than a sequence. When the MMVD mode is applicable according to the sequence MMVD information, the syntax element obtainer 1710 according to an embodiment may additionally obtain first MMVD information indicating whether the MMVD mode is applied in a first inter prediction mode and second MMVD information indicating whether the MMVD mode is applied in a second inter prediction mode for a current block included in the current sequence. When the MMVD mode is applied in the first inter prediction mode according to the first MMVD information, the decoder 1720 may reconstruct a motion vector according to the MMVD mode in the first inter prediction mode, and when the MMVD mode is applied in the second inter prediction mode according to the second MMVD information, the decoder 1720 may reconstruct the motion vector according to the MMVD mode in the second inter prediction mode. However, when the MMVD mode is not applicable according to the sequence MMVD information, the syntax element obtainer 1710 according to an embodiment does not need to obtain, from the bitstream, the first MMVD information and the second MMVD information.

In a particular example, the syntax element obtainer 1710 may obtain, from the sequence parameter set, the sequence MMVD information indicating whether the MMVD mode is applicable in the current sequence. When the MMVD mode is applicable according to the sequence MMVD information, the syntax element obtainer 1710 according to an embodiment may obtain sequence sub-pixel MMVD information indicating whether a motion vector difference in an integer pixel unit is used or a motion vector difference in a sub-pixel unit is used in the current sequence. When the MMVD mode is applicable according to the sequence MMVD information, the syntax element obtainer 1710 according to an embodiment may obtain MMVD information indicating whether the MMVD mode is used for the current block included in the current sequence.

When the MMVD mode is used for the current block according to the MMVD information, the decoder 1720 may reconstruct, according to the MMVD information, a distance of a motion vector difference in an integer pixel unit or a sub-pixel unit from a distance index of the motion vector difference of the current block obtained from the bitstream. The syntax element obtainer 1710 according to an embodiment may determine a motion vector of the current block by using the distance of the motion vector difference, and may reconstruct the current block by using the motion vector of the current block.

Also, when a skip mode or a merge mode is used for the current block, the syntax element obtainer 1710 may extract, from the bitstream, the MMVD information indicating whether the MMVD mode is applied.

When the MMVD mode is used for the current block, the motion vector candidates may be set according to variable distance of the difference and variable direction of the difference from the base motion vector.

The distance of the difference is a value determined based on a base pixel unit (for example, a ¼ pixel unit) and may indicate a difference by base pixel units. For example, when the distance of the difference between the base motion vector and the motion vector is 1, the motion vector and the base motion vector are different by a pixel distance corresponding to one ¼ pixel unit. The distance of the difference may have a value corresponding to an integer, a rational number, or an irrational number.

When a smallest pixel unit capable of being indicated by the motion vector of the current block is the same as the base pixel unit, the decoder 1720 may determine motion vectors according to a predetermined distance of a difference.

However, when the smallest pixel unit capable of being indicated by the motion vector of the current block is different from the base pixel unit, the decoder 1720 may scale the pre-determined distance of the difference and then determine the motion vector candidate for the base motion vector, based on the scaled distance of the difference.

When the motion vector of the current block is capable of indicating pixels corresponding to an integer pixel unit, a ½ pixel unit, a ¼ pixel unit, and a ⅛ pixel unit, the smallest pixel unit capable of being indicated by the motion vector of the current block is ⅛ pixel unit. Also, when the base pixel unit is a ¼ pixel unit, the decoder 1720 may up-scale the distance of the difference for determining the motion vector.

According to an embodiment, the decoder 1720 may scale the distance of the difference according to a ratio of the base pixel unit to the smallest pixel unit capable of being indicated by the motion vector of the current block.

According to an embodiment, the decoder 1720 may up-scale the distance of the difference when the base pixel unit is greater than the smallest pixel unit capable of being indicated by the motion vector of the current block.

According to an embodiment, the base motion vector of the current block may be determined from a merge candidate list used in the skip mode and the merge mode. The merge candidate list may include adjacent blocks related to the current block spatially and temporally. The adjacent blocks related to the current block spatially and temporally may include a block decoded before the current block. Accordingly, the base motion vector according to an embodiment may be determined from a motion vector of a adjacent block determined from the merge candidate list.

The adjacent block spatially related to the current block may include, for example, a block located left of the current block and a block located top of the current block, but is not limited thereto. Also, the adjacent block related to the current block temporally may include, for example, a block located at a same point as the current block from among blocks included in a reference picture different from a current picture including the current block, and a block spatially adjacent to the block at the same point.

According to an embodiment, the decoder 1720 may determine motion vectors of the adjacent blocks related to the current block as the base motion vector. The decoder 1720 may determine the base motion vector in a merge candidate list by using a merge index obtained from the bitstream. The merge index may be referred to as a merge index.

The merge index according to an embodiment may maximally indicate a second candidate in the merge candidate list.

Alternatively, the decoder 1720 may modify the motion vectors of the adjacent blocks related to the current block and may determine the modified motion vectors as the base motion vector. According to an embodiment, the decoder 1720 may determine the base motion vector in a same manner as a method of determining a candidate list of motion vector predictors in an advanced motion vector prediction (AMVP) mode of the high efficiency video coding (HEVC) standard.

The merge index of the current block according to an embodiment may be encoded via a fixed length coding (FLC) method, a unary coding method, or a truncated unary coding method, and then may be included in the bitstream. For example, when the merge index is decoded via the FLC method, a cMax value may be 1.

When the base motion vector for the current block is determined, the decoder 1720 may determine the motion vector by applying the base motion vector to the merge motion vector difference.

The syntax element obtainer 1710 may obtain, from the bitstream, information indicating at least one of a distance index of a difference and a direction index of a difference, and the decoder 1720 may determine the merge motion vector difference, based on at least one of the distance index of the difference and the direction index of the difference. The motion vector of the current block may be determined from the base motion vector.

The syntax element obtainer 1710 according to an embodiment may decode the distance index of the difference via the truncated unary coding method, and at this time, a cMax value may be 7 and a cRiceParam value may be 0. The syntax element obtainer 1710 according to an embodiment may decode the direction index of the difference via the FLC method, and at this time, a cMax value may be 3 and a cRiceParam value may be 0.

The decoder 1720 according to an embodiment may scale the distance of the difference verified from the bitstream according to a ratio of the base pixel unit to the smallest pixel unit capable of being indicated by the motion vector of the current block. When the base pixel unit (for example, a ¼ pixel unit) is greater than the smallest pixel unit (for example, a ⅛ pixel unit) capable of being indicated by the motion vector of the current block, the decoder 1720 may up-scale the distance of the difference verified from the bitstream.

The scaled distance of the difference may indicate a difference by smallest pixel units. For example, when the smallest pixel unit capable of being indicated by the motion vector of the current block is a ⅛ pixel unit and the scaled distance of the difference is 2, the decoder 1720 may determine the motion vector having a difference by a pixel distance corresponding to two ⅛ pixel units from the base motion vector.

As described above, the distance of the difference pre-determined based on the base pixel unit is used to determine the motion vector of the current block based on the base motion vector determined from the merge candidate list, and because information indicating the distance of the difference based on the base pixel unit is signaled via the bitstream, the decoder 1720 of precision capable of indicating the smallest pixel unit, different from a precision of the base pixel unit, may scale the distance of the difference signaled via the bitstream, according to the smallest pixel unit.

The distance of the difference determined based on the base pixel unit and the distance of the difference scaled based on the smallest pixel unit may be the same with respect to a pixel distance.

According to an embodiment, information indicating the smallest pixel unit capable of being indicated by the motion vector of the current block may be included in the bitstream. The syntax element obtainer 1710 may obtain the information indicating the smallest pixel unit from the bitstream corresponding to at least one level from among a block, a slice, and a picture.

At least one of the distance index of the difference and the direction index of the difference for determining the motion vector of the current block may be obtained from the bitstream in a transform unit level, a coding unit level, a largest coding unit level, a slice level, or a picture level.

The syntax element obtainer 1710 according to an embodiment may obtain some bins among the distance index of the difference by performing entropy decoding using context information (context variable) and may obtain remaining bins by performing entropy decoding in a bypass mode.

By performing entropy decoding in a context adaptive binary arithmetic coding (CABAC) manner on the bitstream, each bin of a syntax element may be extracted and context information may be used for each bin. Decoding of a bypass mode may be performed, in which probability-based entropy decoding with equal probability of 0.5 is performed without using the context information. For entropy decoding of a current bin, it is determined whether the context information is used and which context information is to be used.

The syntax element obtainer 1710 according to an embodiment may obtain a first bin of the distance index of the merge motion vector difference by performing entropy decoding using the context information on the bitstream. Also, the syntax element obtainer 1710 may obtain other bins of the distance index of the merge motion vector difference by performing entropy decoding in the bypass mode on the bitstream The syntax element obtainer 1710 according to an embodiment may perform entropy decoding on the bitstream in the bypass mode to obtain a bin of two bits indicating the direction index of the difference.

The syntax element obtainer 1710 may obtain information indicating a residual motion vector from the bitstream in the transform unit level, the coding unit level, the largest coding unit level, the slice level, or the picture level.

Motion vector candidates that may be determined from the base motion vector in the MMVD mode according to an embodiment will be described below with reference to FIG. 21.

Figure 21:
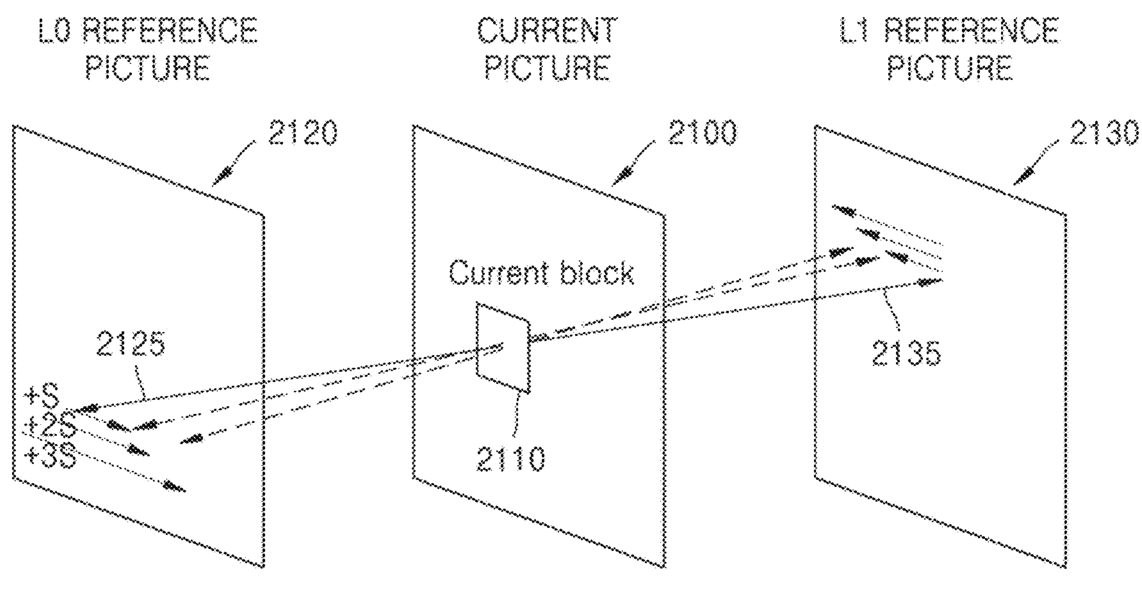
FIG. 21 illustrates locations of motion vector candidates, according to an embodiment.
Figure 21:
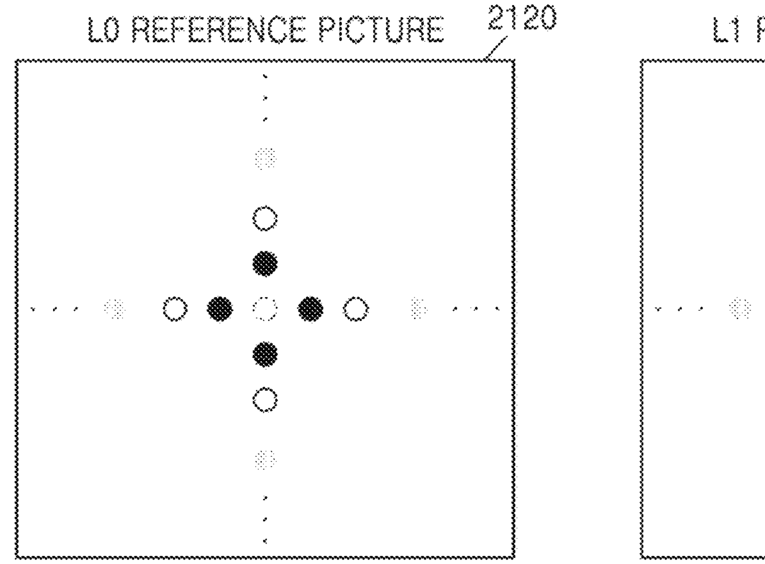
Figure 21:
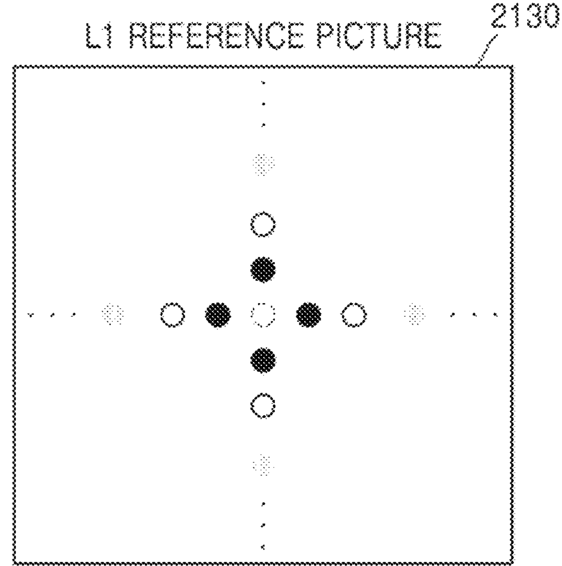

FIG. 21 illustrates positions of motion vector candidates, according to an embodiment.

The decoder 1720 according to an embodiment may determine the motion vector of the current block by applying the merge motion vector difference to the base motion vector. According to an embodiment, when a prediction direction of the current block is bi-direction, the merge motion vector difference may be included in the bitstream only for one uni-direction. For example, information indicating the merge motion vector difference may be included in the bitstream only for a uni-direction of any one of a list 0 direction and a list 1 direction.

FIG. 21 illustrates motion vectors that may be determined in the MMVD mode in bi-directional prediction.

A base motion vector 2125 in an L0 direction and a base motion vector 2135 in an L1 direction of a current block 2110 of a current picture 2100 are determined in a merge candidate list. The base motion vector 2125 in the L0 direction indicates a location of a broken line shape in an L0 reference picture 2120, and the base motion vector 2135 in the L1 direction indicates a location of a broken line shape in an L1 reference picture 2130.

However, in the MMVD mode, the motion vector difference may be applied to each of the base motion vector 2125 and the base motion vector 2135 in the L1 direction, based on the direction index of the difference and the distance index of the difference.

For example, it may be determined whether a distance between a base motion vector and a motion vector candidate is s, 2s, 3s, or the like according to the distance index of the difference. When the distance index of the difference indicates s, a motion vector candidate generated as a result of applying the motion vector difference to the base motion vector may indicate a location of a black circle among the L0 reference picture 2120 and the L1 reference picture 2130. When the distance index of the difference indicates 2s, the motion vector candidate generated as the result of applying the motion vector difference to the base motion vector may indicate a location of a white circle among the L0 reference picture 2120 and the L1 reference picture 2130.

For example, it may be determined whether a direction between the base motion vector and the motion vector candidate is + or − in x and y axis directions, according to the direction index of the difference. In particular, the direction index of the difference may indicate one of (+, 0), (−, 0), (0, +), and (0, −) in an (x,y) axis direction.

Accordingly, a motion vector indicating one location among the L0 reference picture 2120 and the L1 reference picture 2130 may be determined by combining the distance index of the difference and the direction index of the difference.

Figure 22:
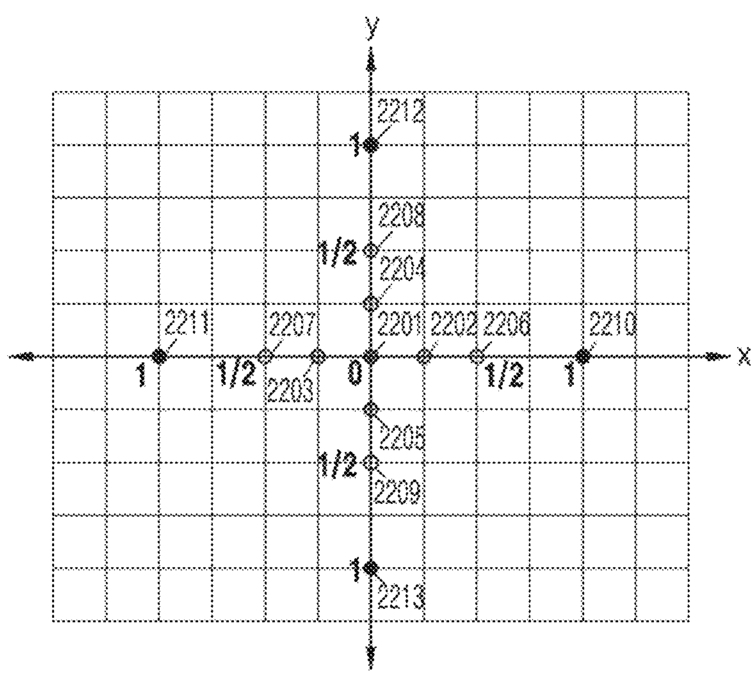
FIG. 22 is a diagram showing motion vector candidates displayed on a coordinate plane.

Hereinafter, with reference to FIG. 22, a method of determining the motion vector candidates that may be determined from the base motion vector will be described. FIG. 22 is a diagram showing the motion vector candidates displayed on a coordinate plane, and illustrates the motion vector candidates determined according to the distance of the difference pre-determined based on the base pixel unit corresponding to a ¼ pixel unit.

Referring to FIG. 22, the decoder 1720 may determine candidates located according to a predetermined shape with respect to configuring the motion vector candidates. The predetermined shape may be similar to a polygon such as a diamond or a rectangle, or a circle.

The decoder 1720 may determine candidates in a uniform distance of a difference from a point corresponding to the base motion vector as the motion vector candidates. The decoder 1720 may determine the motion vector candidates in a first distance of a difference from a pre-set point, determine the motion vector candidates in a second distance of the difference from the pre-set point, and may determine the motion vector candidates in an n-th distance of the difference from the pre-set point. The distance of the difference may be determined according to a definition of a user. Alternatively, the decoder 1720 may directly determine the distance of the difference based on information related to the current block, a temporal layer, or a group of pictures (GOP), or obtain, via the bitstream, information indicating the distance of the difference for determining the motion vector candidates.

The decoder 1720 may determine the distance of the difference for determining the motion vector candidate of the current block according to a distance of a difference determined in a high level higher than a level corresponding to the current block.

The number of motion vector candidates may be determined independently for each distance of a difference. The decoder 1720 may determine the number of motion vector candidates for each distance of a difference of the current block, according to information about the number determined in the high level higher than the level corresponding to the current block.

FIG. 22 illustrates a case in which the number of motion vector candidates in each distance of a difference is 4. Also, in FIG. 22, there are 3 distances of the difference, but the number of distances of the difference is not limited to 3.

Referring to FIG. 22, the decoder 1720 may determine motion vector candidates having a distribution of a diamond shape based on a base motion vector (x,y) 2201.

The decoder 1720 may determine motion vector candidates (x+1, y) 2202, (x−1, y) 2203, (x, y+1) 2204, and (x, y−1) 2205 in the distance of the difference of 1 from the base motion vector (x,y) 2201.

The decoder 1720 may determine motion vector candidates (x+2, y) 2206, (x−2, y) 2207, (x, y+2) 2208, and (x, y−2) 2209 in the distance of the difference of 2 from the base motion vector (x,y) 2201.

The decoder 1720 may determine motion vector candidates (x+4, y) 2210, (x−4, y) 2211, (x, y+4) 2212, and (x, y−4) 2213 in the distance of the difference of 4 from the base motion vector (x,y) 2201.

According to an embodiment, the decoder 1720 may determine the motion vector candidates located in different distances of a difference for each base motion vector. For example, from among a plurality of base motion vectors, a motion vector candidate having a distance of a difference of 1 may be determined for a first base motion vector, and a motion vector candidate having a distance of a difference of 2 may be determined for a second base motion vector. Alternatively, for example, a motion vector candidate having a distance of a difference of 1 and a motion vector candidate having a distance of a difference of 2 may be determined for the first base motion vector, and a motion vector candidate having a distance of a difference of 4 and a motion vector candidate having a distance of a difference of 8 may be determined for the second base motion vector.

When different distances of a difference are mapped to base motion vectors in an 1:1 manner, the syntax element obtainer 1710 may obtain, from the bitstream, only information indicating the base motion vector of the current block or information indicating the distance of the difference and determine the distance of the difference for specifying the motion vector of the current block and the base motion vector of the current block.

As described above, the distance of the difference for determining the motion vector candidates may be determined based on the base pixel unit, and when the smallest pixel unit capable of being indicated by the motion vector of the current block is different from the base pixel unit, the decoder 1720 may scale the pre-set distance of the difference for configuring a candidate group for each base motion vector.

When the motion vector of the current block is capable of indicating pixels corresponding to an integer pixel unit, a ½ pixel unit, a ¼ pixel unit, and a ⅛ pixel unit, the smallest pixel unit capable of being indicated by the motion vector of the current block is ⅛ pixel unit. Also, when the base pixel unit is a ¼ pixel unit, the decoder 1720 may up-scale the distance of the difference. According to an embodiment, the decoder 1720 may up-scale the distance of the difference according to a ratio of the base pixel unit to the smallest pixel unit capable of being indicated by the motion vector of the current block. When the smallest pixel unit capable of being indicated by the motion vector of the current block is an m pixel unit, the base pixel unit is an n pixel unit, and the distance of the difference is k, the decoder 1720 may up-scale the distance of the difference of k by $k \times n/m$.

The syntax element obtainer 1710 according to an embodiment may determine the prediction mode of the current block to be one of the skip mode and the merge mode. In the skip mode or the merge mode, the decoder 1720 according to an embodiment may generate a merge candidate list including adjacent blocks referred to in predicting the motion vector of the current block in the skip mode or the merge mode.

In the skip mode or the merge mode, the syntax element obtainer 1710 may obtain MMVD information indicating whether a motion vector determined from the merge candidate list of the current block and a merge motion vector difference are used. When the merge motion vector difference is used according to the MMVD information, prediction may be performed according to the MMVD mode in which the motion vector determined from the merge candidate list of the current block and the merge motion vector difference are used. When the merge motion vector difference is used according to the MMVD information, the syntax element obtainer 1710 may obtain a merge index from the bitstream. The decoder 1720 according to an embodiment may determine the base motion vector from one candidate determined based on the merge index, in the merge candidate list. The decoder 1720 may determine the merge motion vector difference by using the distance index of the merge motion vector difference and the direction index of the merge motion vector difference of the current block, and may determine the motion vector of the current block by using the base motion vector and the merge motion vector difference.

The decoder 1720 according to an embodiment may reconstruct the current block by using the motion vector of the current block. The decoder 1720 may determine a reference block in a reference picture by using the motion vector of the current block, and may determine prediction samples corresponding to the current block from among reference samples included in the reference block.

When the prediction mode of the current block according to an embodiment is the merge mode and the MMVD mode is selected, the decoder 1720 may determine the base motion vector of the current block from the merge candidate list and may determine the motion vector of the current block by using the base motion vector and the merge motion vector difference. When the prediction mode of the current block is the merge mode, the video decoding apparatus 1700 may parse transform coefficients of the current block from the bitstream and may obtain residual samples by performing inverse quantization and inverse transformation on the transform coefficients. The decoder 1720 may determine reconstructed samples of the current block by combining the prediction samples of the current block and the residual samples of the current block.

When the prediction mode of the current block according to an embodiment is the skip mode and the MMVD mode is selected, the decoder 1720 may determine the motion vector of the current block by using the merge motion vector difference and the base motion vector determined from the merge candidate list. However, because the prediction mode of the current block is the skip mode, the video decoding apparatus 1700 does not parse the transform coefficients of the current block from the bitstream and thus does not obtain the residual samples. In the skip mode, the decoder 1720 may determine the prediction samples of the current block to be the reconstructed samples of the current block without the residual samples.

Hereinafter, a video decoding method including performing inter prediction in the MMVD mode will now be described with reference to FIGS. 18 to 36.

Figure 18:
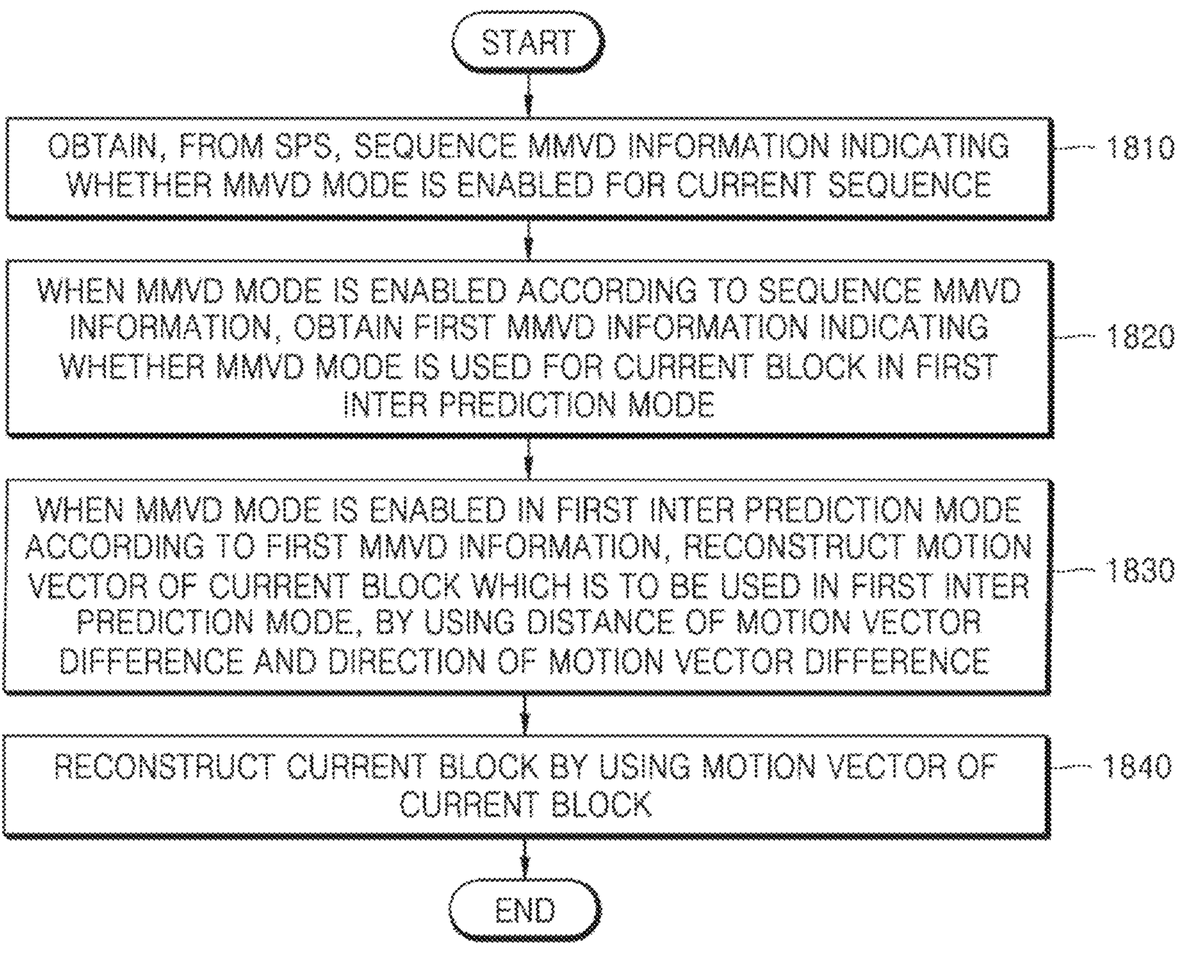
FIG. 18 is a flowchart of a video decoding method according to an embodiment.

FIG. 18 illustrates a flowchart of a video decoding method according to an embodiment.

In operation 1810, the syntax element obtainer 1710 may obtain, from a sequence parameter set, sequence MMVD information indicating whether the MMVD mode is applicable in a current sequence.

In operation 1820, when the MMVD mode is applicable according to the sequence MMVD information, the syntax element obtainer 1710 may obtain, from a bitstream, first MMVD information indicating whether the MMVD mode is used for a current block included in the current sequence in a first inter prediction mode.

In operation 1830, when the MMVD mode is applicable in the first inter prediction mode according to the first MMVD information, the decoder 1720 may reconstruct a motion vector of the current block which is to be used in the first inter prediction mode, by using a distance of a motion vector difference and a direction of the motion vector difference obtained from the bitstream.

When a merge motion vector difference is used for the current block according to MMVD information, the syntax element obtainer 1710 may obtain a merge index from the bitstream. The merge index indicates one candidate in a merge candidate list. The syntax element obtainer 1710 may determine a base motion vector from the one candidate determined based on the merge index, in the merge candidate list.

The decoder 1720 may determine whether the MMVD mode is selected for the current block based on the obtained MMVD information in a skip mode or a merge mode. When the MMVD mode is selected for the current block, i.e., when the motion vector determined from the merge candidate list of the current block and the merge motion vector difference are used, the syntax element obtainer 1710 may obtain the merge index from the bitstream.

The merge index is information of 1 bit. Also, the merge index may be obtained by using one piece of context information for a first bin of the merge index. The syntax element obtainer 1710 may perform entropy decoding using context information to obtain the merge index in the skip mode or the merge mode.

The maximum number of candidates for which selection is allowed according to the merge index when the MMVD mode is selected in the skip mode or the merge mode may be smaller than the maximum number of candidates included in the merge candidate list. For example, because the merge index is a flag of 1 bit, the merge index may indicate one candidate from among maximum two candidates in the merge candidate list.

The syntax element obtainer 1710 may obtain two bins indicating a direction index of the merge motion vector difference, by performing entropy decoding in a bypass mode on the bitstream. The syntax element obtainer 1710 may obtain a first bin indicating the distance index of the merge motion vector difference by performing entropy decoding using the context information on the bitstream, and may obtain other bins indicating the distance index of the merge motion vector difference by performing entropy decoding in the bypass mode.

In operation 1840, the decoder 1720 may reconstruct the current block by using the motion vector of the current block.

The decoder 1720 may determine the merge motion vector difference of the current block by using the distance index of the merge motion vector difference of the current block and the direction index of the merge motion vector difference, and may determine the motion vector of the current block by using the base motion vector and the merge motion vector difference.

The decoder 1720 may determine a reference block in a reference picture by using the motion vector of the current block, and may determine prediction samples corresponding to the current block from the prediction samples included in the reference block. The decoder 1720 may add the prediction samples of the current block and residual samples of the current block so as to determine reconstructed samples of the current block in a prediction mode other than the skip mode. When the residual samples are not available as in the skip mode, reconstructed samples of the current block may be determined only from the prediction samples of the current block.

In a general motion vector prediction mode (AMVP or advanced temporal motion vector prediction (ATMVP)) that is neither skip mode nor the merge mode, the video decoding apparatus 1700 obtains a motion vector predictor index and a motion vector difference. The video decoding apparatus 1700 may determine a motion vector predictor indicated by the motion vector predictor index in a motion vector predictor list, and determine a motion vector by combining the motion vector predictor and motion vector difference information.

Compared to the general motion vector prediction mode, the skip mode and the merge mode do not use the motion vector difference. However, when the MMVD mode is selected in the skip mode or the merge mode, the merge motion vector difference is used. Compared to the general motion vector prediction mode, the merge motion vector difference in the MMVD mode has expression brevity compared to the motion vector difference.

For example, information required to represent a general motion vector difference in an L0 prediction direction or an L1 prediction direction includes information abs_mvd_greater0_flag indicating whether an absolute value of the motion vector difference is greater than 0, information abs_mvd_greaterL_flag indicating whether the absolute value of the motion vector difference is greater than 1, information abs_mvd_minus2 indicating a value obtained by subtracting 2 from the absolute value of the motion vector difference, and information mvd_sign_flag indicating a sign of the motion vector difference.

On the other hand, information required to represent the merge motion vector difference in the L0 prediction direction or the L1 prediction direction is only information of a direction of a difference and a distance index of the difference. Accordingly, because the merge motion vector difference may be represented by using only the information of the direction of the difference and the distance index of the difference, an amount of bits required to signal the merge motion vector difference may be significantly decreased, compared to an amount of bits required to signal the general motion vector difference.

Figure 36:
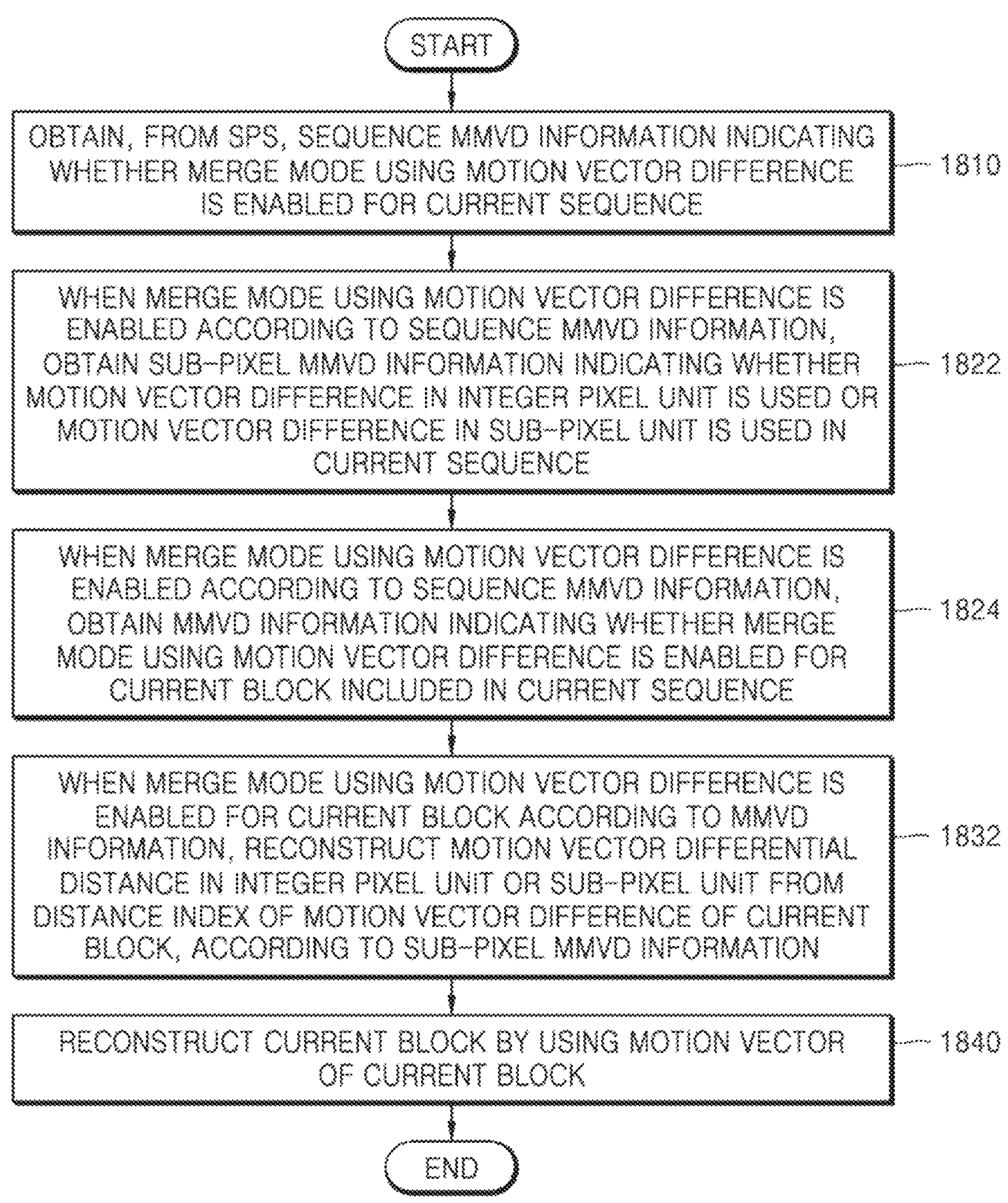
FIG. 36 illustrates a flowchart of a video decoding method according to another embodiment.

FIG. 36 illustrates a flowchart of a video decoding method according to another embodiment.

Operation 1810 is equal to that described above with reference to FIG. 18.

Operation 1822 and operation 1824 correspond to particular operations of operation 1820 of FIG. 18. In operation 1822, when an MMVD mode is applicable according to sequence MMVD information, the syntax element obtainer 1710 may obtain sub-pixel MMVD information indicating whether a motion vector difference in an integer pixel unit is used or a motion vector difference in a sub-pixel unit is used in a current sequence. When the MMVD mode is not applicable according to the sequence MMVD information, both the motion vector difference in the integer pixel unit and the motion vector difference in the sub-pixel unit may not be applicable in the current sequence and a current block.

In operation 1824, when the MMVD mode is applicable according to the sequence MMVD information, the syntax element obtainer 1710 may obtain MMVD information indicating whether the MMVD mode is used for the current block included in the current sequence. That is, the MMVD information indicates whether the MMVD mode is applied when the current block is in a skip mode or a merge mode.

The syntax element obtainer 1710 may perform entropy decoding using context information so as to obtain the MMVD information in the skip mode or the merge mode. When the MMVD information is obtained, operation 1832 is performed.

Operation 1832 is a particular operation of operation 1830 of FIG. 18.

In operation 1832, when the MMVD mode is enabled for the current block according to the MMVD information, the decoder 1720 may determine, according to the sub-pixel MMVD information, whether the motion vector difference in the integer pixel unit is used or the motion vector difference in the sub-pixel unit is used in the current sequence, and may reconstruct a distance of a motion vector difference in an integer pixel unit or a sub-pixel unit from a distance index of the motion vector difference of the current block obtained from a bitstream.

When the MMVD mode is used for the current block according to the MMVD information, and the motion vector difference in the integer pixel unit is used according to the sub-pixel MMVD information, the decoder 1720 may reconstruct the distance of the motion vector difference in the integer pixel unit from the distance index of the motion vector difference of the current block.

Similarly, when the MMVD mode is used for the current block according to the MMVD information, and the motion vector difference in the sub-pixel unit is used according to the sub-pixel MMVD information, the decoder 1720 may reconstruct the distance of the motion vector difference in the sub-pixel unit from the distance index of the motion vector difference of the current block.

When the reconstructed distance of the motion vector difference is in the integer pixel unit, the decoder 1720 may round an x component value and a y component value of a base motion vector of the current block to the integer pixel unit, and may reconstruct the motion vector in the integer pixel unit by using the x component value and the y component value of the base motion vector which are rounded to the integer pixel unit.

When the reconstructed distance of the motion vector difference is in the sub-pixel unit, the decoder 1720 may reconstruct a motion vector in the sub-pixel unit by using the distance of the motion vector difference in the sub-pixel unit, and an x component value and a y component value of a base motion vector which are rounded to the sub-pixel unit.

Therefore, when MMVD is applied in the current sequence, based on the sequence MMVD information obtained from a sequence parameter set (SPS), the video decoding apparatus 1700 may additionally obtain, from the bitstream, the sub-pixel MMVD information and the MMVD information. However, when MMVD is not applied in the current sequence, based on the sequence MMVD information, the video decoding apparatus 1700 does not need to additionally parse, from the bitstream, both the sub-pixel MMVD information and the MMVD information. Because information indicating whether to apply MMVD is obtained by stages according to syntax levels such as the SPS, a coding unit syntax, and the like, a load of the video decoding apparatus 1700 to decode a syntax element related to whether to apply the MMVD may be decreased.

The present VVC standard allows a resolution of a motion vector in a ¼ pixel unit, a 1 pixel unit, or a 4 pixel unit. In this regard, precision of a motion vector difference (MVD) is to be equal to precision of a motion vector predictor or a resolution of a motion vector. In this regard, when precision of an integer pixel unit is used, precision of the motion vector may be rounded to the integer pixel unit, such that encoding efficiency may be increased. However, rounding in a resolution of a 1 pixel unit is performed for a resolution of a 4 pixel unit. By doing so, an interpolation procedure of a sub-pixel unit may be decreased, and accuracy of the motion vector predictor may not be lost. When rounding is performed with respect to 4 pixels, accuracy of the motion vector predictor may deteriorate. Therefore, rounding in a 1 pixel unit may be performed on a motion vector predictor whose resolution is determined to be equal to or greater than 1 pixel.

An algorithm by which a motion vector is stored only in a particular pixel unit and then is reconstructed via a shift operation when necessary. In this case, no matter how a pixel unit to be rounded according to a resolution of the motion vector is small, minimum rounding information has to be a resolution of a storage unit.

Hereinafter, a video encoding apparatus performing inter prediction by selecting a MMVD mode in a skip mode or a merge mode will now be described with reference to FIG. 19.

Figure 19:
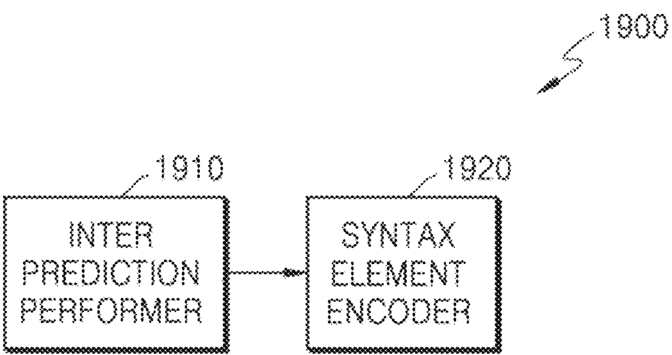
FIG. 19 is a block diagram of a video encoding apparatus according to an embodiment.

FIG. 19 is a block diagram of a video encoding apparatus according to an embodiment.

Referring to FIG. 19, a video encoding apparatus 1900 according to an embodiment may include an inter prediction performer 1910, and a syntax element encoder 1920.

The video encoding apparatus 1900 may encode motion information determined by performing inter prediction and may output the encoded motion information in the form of a bitstream. The inter prediction performer 1910 may determine various inter prediction information, and the syntax element encoder 1920 may encode the inter prediction information in the form of syntax elements and may output a bitstream in the form of a syntax that is a group of the syntax elements for each coding unit or each block.

The video encoding apparatus 1900 according to an embodiment may include a central processor (not shown) for controlling the inter prediction performer 1910 and the syntax element encoder 1920. Alternatively, the inter prediction performer 1910 and the syntax element encoder 1920 may operate by their own processors (not shown), and the processors may systematically operate with each other to operate the video encoding apparatus 1900. Alternatively, the inter prediction performer 1910 and the syntax element encoder 1920 may be controlled according to control by an external processor (not shown) of the video encoding apparatus 1900.

The video encoding apparatus 1900 may include one or more data storages (not shown) storing input/output data of the inter prediction performer 1910 and the syntax element encoder 1920. The video encoding apparatus 1900 may include a memory controller (not shown) for controlling data input and output of the data storage.

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment may perform a basic image encoding operation in a manner that not only a separate processor but also an image encoding processing module included in a central processing apparatus or a graphic processing apparatus perform the basic image encoding operation.

The inter prediction performer 1910 according to an embodiment may determine a motion vector of a current block by performing inter prediction on the current block.

The inter prediction performer 1910 according to an embodiment may generate a merge candidate list including adjacent blocks referred to in prediction encoding the motion vector of the current block when inter prediction is performed on the current block in one of a skip mode and a merge mode.

The syntax element encoder 1920 according to an embodiment may determine whether to use a base motion vector determined in the merge candidate list of the current block and a merge motion vector difference in a skip mode or a merge mode. When the merge motion vector difference is used, the syntax element encoder 1920 may generate a merge index, and may perform entropy encoding on a bit string of the merge index. The merge index indicates the base motion vector in the merge candidate list.

The syntax element encoder 1920 may generate a distance index of the merge motion vector difference and a direction index of the merge motion vector difference corresponding to a difference between the base motion vector and a motion vector of the current block. The syntax element encoder 1920 may perform entropy encoding on a bit string of the distance index of the merge motion vector difference, and may perform entropy encoding on the direction index of the merge motion vector difference.

According to an embodiment, the MMVD mode may be applied to various tools that are available in an inter prediction mode. Accordingly, the video encoding apparatus 1900 may encode information indicating whether the MMVD mode is applied to each tool of the inter prediction mode.

For example, in a first scheme, only information indicating whether the MMVD mode is applied to each tool may be encoded.

As another example, in a second scheme, information indicating whether the MMVD mode is applied to all tools may be first encoded, and if applicable, information indicating whether the MMVD mode is applied to each tool may be encoded. When the MMVD mode is not applied to all tools, it is not necessary to encode information indicating whether the MMVD mode is applied to each tool.

In the first scheme, even when the MMVD mode is not applied to all tools, the video encoding apparatus 1900 has to encode a flag for determining that the MMVD mode is not applied to each of various tools.

However, according to the second scheme, when the MMVD mode is not enabled for all tools, the video encoding apparatus 1900 may encode only a flag indicating that it is not applied to all tools, and may not need to additionally encode a flag indicating whether to apply the MMVD mode to each tool, such that encoding efficiency may be increased.

According to the second scheme, the syntax element encoder 1920 may first encode sequence MMVD information indicating whether the MMVD mode is enabled for a current sequence. When the MMVD mode is applicable in the current sequence, the syntax element encoder 1920 may determine whether to encode a motion vector difference according to the MMVD mode in a first inter prediction mode, and may determine whether to encode a motion vector difference according to the MMVD mode in a second inter prediction mode. Accordingly, the syntax element encoder 1920 may additionally encode first MMVD information indicating whether the MMVD mode is applied in the first inter prediction mode and second MMVD information indicating whether the MMVD mode is applied in the second inter prediction mode for the current block included in the current sequence. However, when the MMVD mode is not applicable, the syntax element encoder 1920 according to an embodiment may encode only the sequence MMVD information and may not encode the first MMVD information and the second MMVD information.

As a particular example of the second scheme, the syntax element encoder 1920 may encode the sequence MMVD information indicating whether the MMVD mode is applicable in the current sequence. When the MMVD mode is applicable, the syntax element encoder 1920 according to an embodiment may encode sequence sub-pixel MMVD information indicating whether a motion vector difference in an integer pixel unit is used or a motion vector difference in a sub-pixel unit is used in the current sequence. When the MMVD mode is applicable, the syntax element encoder 1920 according to an embodiment may encode MMVD information indicating whether the MMVD mode is used for the current block included in the current sequence.

Hereinafter, an embodiment in which the video encoding apparatus 1900 encodes the sequence MMVD information, the sequence sub-pixel MMVD information, and the MMVD information by stages according to the second scheme will now be described with reference to FIGS. 20 and 37.

Figure 20:
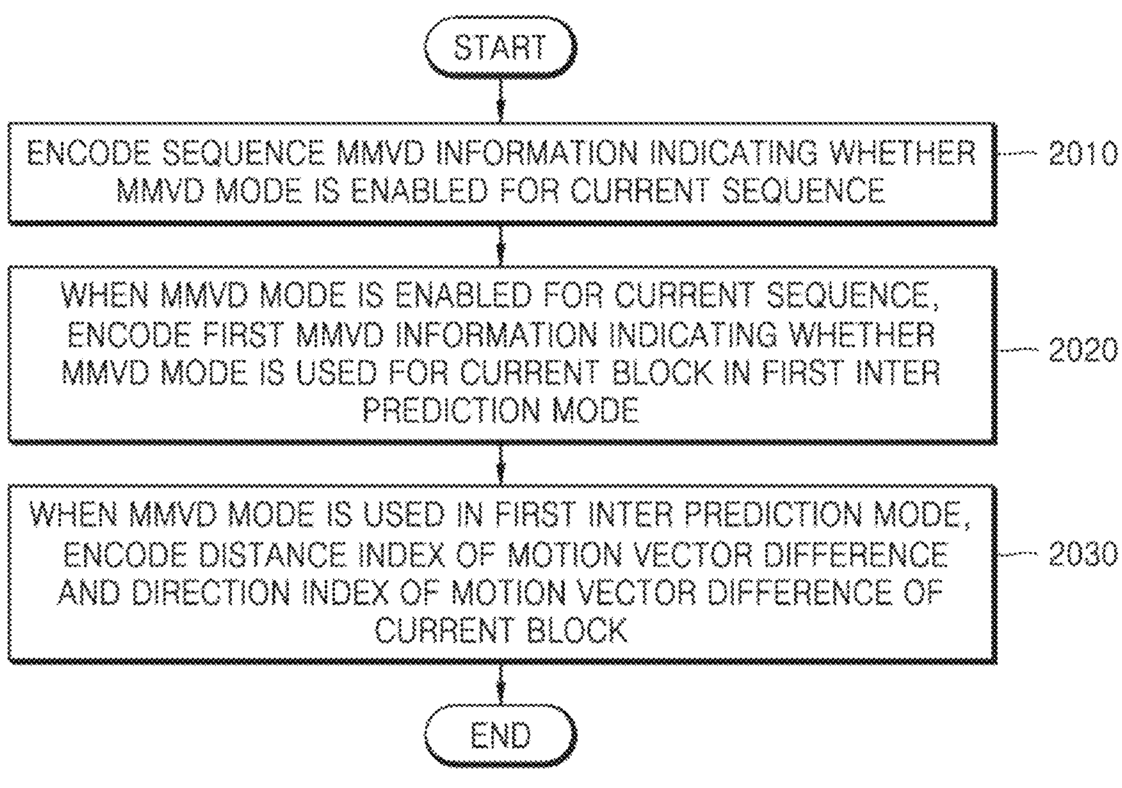
FIG. 20 is a flowchart of a video encoding method according to an embodiment.

FIG. 20 illustrates a flowchart of a video encoding method according to an embodiment.

In operation 2010, the syntax element encoder 1920 may encode the sequence MMVD information indicating whether the MMVD mode is applicable in a current sequence.

In operation 2020, when the MMVD mode is applicable in the current sequence, the syntax element encoder 1920 may encode first MMVD information indicating whether the MMVD mode is used for a current block in a first inter prediction mode.

In operation 2030, when the MMVD mode is applied in the first inter prediction mode, the syntax element encoder 1920 may encode a distance index of a motion vector difference and a direction index of the motion vector difference of the current block.

The inter prediction performer 1910 may generate a merge candidate list including adjacent blocks referred to in predicting a motion vector of the current block when inter prediction is performed on the current block in one of a skip mode and a merge mode. The syntax element encoder 1920 may generate MMVD information indicating whether a base motion vector determined from the merge candidate list of the current block and a merge motion vector difference are used.

When the merge motion vector difference is used, the syntax element encoder 1920 may generate a merge index indicating one base motion vector in the merge candidate list. The syntax element encoder 1920 may perform entropy encoding on a bit string of the merge index by using one piece of context information.

The syntax element encoder 1920 may generate a distance index of the merge motion vector difference and a direction index of the merge motion vector difference corresponding to a difference between the base motion vector and the motion vector of the current block.

The inter prediction performer 1910 according to an embodiment may determine the motion vector of the current block, which indicates a reference block in a reference picture.

The inter prediction performer 1910 according to an embodiment may determine the prediction mode of the motion vector of the current block to be one of the skip mode and the merge mode. The syntax element encoder 1920 may generate skip mode information indicating whether the prediction mode of the current block is the skip mode and merge mode information indicating whether the prediction mode is the merge mode.

When the prediction mode of the current block is the skip mode or the merge mode, the syntax element encoder 1920 may determine whether the motion vector of the current block is predicted in the MMVD mode using the merge motion vector difference and the base motion vector determined from the merge candidate list of the current block. The syntax element encoder 1920 may generate the MMVD information indicating whether the motion vector is predicted in the MMVD mode.

When motion information is predicted according to the MMVD mode, the syntax element encoder 1920 according to an embodiment may determine the merge index indicating the base motion vector in the merge candidate list. The syntax element encoder 1920 may perform entropy encoding applying one piece of context information on the merge index to encode the merge index indicating one candidate in the merge candidate list.

According to an embodiment, the number of candidates the merge index can indicate in the merge candidate list is maximally 2, and thus, the merge index may be information of 1 bit.

The syntax element encoder 1920 may determine the merge motion vector difference between the motion vector of the current block and the base motion vector, and may generate the distance index of the merge motion vector difference of the current block and the direction index of the merge motion vector difference.

When the prediction mode of the current block according to an embodiment is the merge mode and the MMVD mode is selected, the syntax element encoder 1920 may generate the merge index indicating the base motion vector of the current block from the merge candidate list, and may generate information of the distance of the difference and information of the direction of the difference for indicating the merge motion vector difference between the motion vector of the current block and the base motion vector.

When the prediction mode of the current block is the merge mode, the video encoding apparatus 1900 may determine samples of the reference block indicated by the motion vector of the current block as the prediction samples of the current block. The video encoding apparatus 1900 may determine the residual samples that are difference between original samples and prediction samples of the current block. The video encoding apparatus 1900 may encode the transform coefficients generated by performing transformation and quantization on the residual samples of the current block.

According to an embodiment, when the prediction mode of the current block is the skip mode, the current block is encoded only with the prediction samples of the current block, and thus the video encoding apparatus 1900 does not encode the residual samples of the current block. Even when the prediction mode of the current block according to an embodiment is the skip mode and the MMVD mode is selected, the syntax element encoder 1920 may encode the MMVD information, the merge index, information of the distance of the difference, and information of the direction of the difference, without encoding the residual samples.

When the motion vector is encoded in the MMVD mode, the syntax element encoder 1920 may perform entropy encoding by applying one piece of context information to the merge index. The merge index indicates one candidate in the merge candidate list. The merge index according to an embodiment is information of 1 bit, and thus may be obtained by using one piece of context information for a first bin.

The syntax element encoder 1920 may perform entropy encoding on the distance index of the merge motion vector difference of the current block and the direction index of the merge motion vector difference.

The syntax element encoder 1920 according to an embodiment may perform entropy encoding on two bins indicating the direction index of the merge motion vector difference respectively via the bypass mode. The syntax element encoder 1920 may perform entropy encoding on a first bin indicating the distance index of the merge motion vector difference by using the context information, and may perform entropy encoding on other bins indicating the distance index of the merge motion vector difference respectively in the bypass mode.

FIG. 23 illustrates values and meanings of a merge index, distance indices of a merge difference, and al direction indices of the merge difference, according to an embodiment.

The direction index of the merge difference indicates a distance index of a merge motion vector difference. The direction index of the merge difference indicates a direction index of the merge motion vector difference.

The video decoding apparatus 1700 may determine a motion vector of a current block based on the merge index, the direction index of the merge difference, and the direction index of the merge difference.

Table 2600 of FIG. 23 illustrates the merge index according to an embodiment and a motion vector candidate corresponding thereto. A merge candidate list according to an embodiment includes four motion vector candidates ($1^{st}$, $2^{nd}$, $3^{rd}$, and $4^{th}$ MV candidates) and the merge index may be displayed in an index (0, 1, 2, or 3) indicating one of them.

In a MMVD mode, one motion vector candidate indicated by the merge index among the merge candidate list may be determined to be a base motion vector.

In Table 2610 of FIG. 23, the direction index of the merge difference according to an embodiment is an integer among 0 to 7, and each index may be binarized according to a truncated unary coding method. The direction index of the merge difference may indicate one of $2^N$, wherein N is 0 to 7. A distance of the merge difference is determined based on a base pixel unit, and when the base pixel unit is ¼, a distance of a merge motion vector difference corresponding to the direction index of the merge difference 0 may denote a ¼ pixel distance and a distance of a merge motion vector difference corresponding to the direction index of the merge difference 1 may denote a ½ pixel distance. A distance of a merge motion vector difference corresponding to the direction index of the merge difference 7 may denote a 32 pixel distance.

As described above, when a smallest pixel unit capable of being indicated by the motion vector of the current block is smaller than the base pixel unit, the distance of the merge motion vector difference may be scaled according to a ratio of the smallest pixel unit to the base pixel unit. For example, when the base pixel unit is ¼ pixel unit and the smallest pixel unit is ⅛ pixel unit, and when an index indicating the distance of the merge motion vector difference obtained from a bitstream is 0, a distance of a merge motion vector difference 1 corresponding to the index 0 may be up-scaled to 2.

Also, in Table 2620, a direction index of a merge motion vector difference of a bin string 00 denotes a motion vector candidate changed along a + direction in an X axis based on the base motion vector, and a direction of a merge motion vector difference of a bin string 11 denotes a motion vector candidate changed along a—direction in a Y axis based on the base motion vector.

The merge index, the direction index of the merge difference, and the direction index of the merge difference of FIG. 23 are only examples and indices available in the MMVD mode proposed in the disclosure are not limited thereto.

For example, the number of candidates that can be selected from the merge candidate list in the MMVD mode may be limited to 2, and the merge index may be an index of 1 bit.

Figure 24:
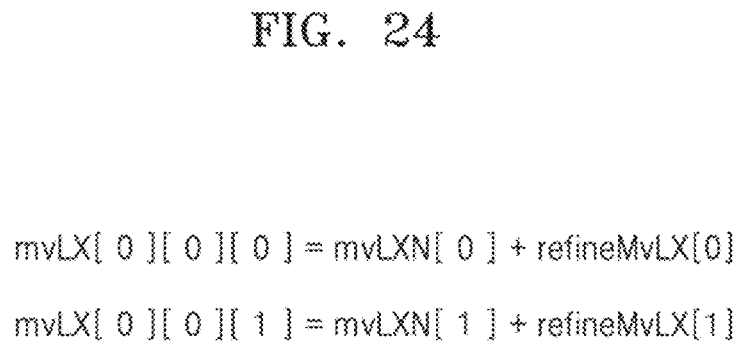

FIG. 24 illustrates equations for obtaining a motion vector by using a base motion vector and a merge motion vector difference, according to an embodiment.

mvLX[x][y][n] denotes a motion vector of a current block. x, y denotes x, y coordinates of the current block, and n denotes one of a horizontal direction component and a vertical direction component of a motion vector mvLX. mvLX[x][y][0] denotes the horizontal direction component of the motion vector mvLX and mvLX[x][y][1] denotes the vertical direction component of the motion vector mvLX.

mxLXN[m] denotes a base motion vector indicated by a merge index in the merge candidate list. m denotes one of a horizontal direction component and a vertical direction component of a base motion vector mvLXN. mvLXN[0] denotes the horizontal direction component of the base motion vector mvLXN and mvLXN[1] denotes the vertical direction component of the base motion vector mvLXN.

refineMxLX[1] denotes a merge motion vector difference. 1 denotes one of a horizontal direction component and a vertical direction component of a merge motion vector difference refineMxLX. refineMxLX[0] denotes the horizontal direction component of the merge motion vector difference refineMxLX and refineMxLX[1] denotes the vertical direction component of the merge motion vector difference refineMxLX.

In mvLX, mxLXN, and refineMxLX, LX denotes one of an L0 prediction direction and an L1 prediction direction. Accordingly, mvL0, mxL0N, and refineMxL0 denote the motion vector, the base motion vector, and the merge motion vector difference in the L0 prediction direction, and mvL1, mxL1N, and refineMxL1 denote the motion vector, the base motion vector, and the merge motion vector difference in the L1 prediction direction.

The video decoding apparatus 1700 according to an embodiment obtains the merge index from a bitstream, and determines the horizontal direction component mxLXN[0] of the base motion vector indicated by the merge index from the merge candidate list and the vertical direction component mxLXN[1] of the base motion vector.

The video decoding apparatus 1700 according to an embodiment obtains a direction index of a merge difference and a distance index of a merge difference from the bitstream, and determines the horizontal direction component refineMxLX[0] of the merge motion vector difference and the vertical direction component refineMxLX[1] of the merge motion vector difference by using the direction index of the merge difference and the distance index of the merge difference.

The video decoding apparatus 1700 according to an embodiment may obtain the horizontal direction component mvLX[0][0][0] of the motion vector of the current block by adding the horizontal direction component mxLXN[0] of the base motion vector and the horizontal direction component refineMxLX[0] of the merge motion vector difference, and may obtain the vertical direction component mvLX[0][0][1] of the motion vector of the current block by adding the vertical direction component mxLXN[1] of the base motion vector and the vertical direction component refineMxLX[1] of the merge motion vector difference.

Figure 37:
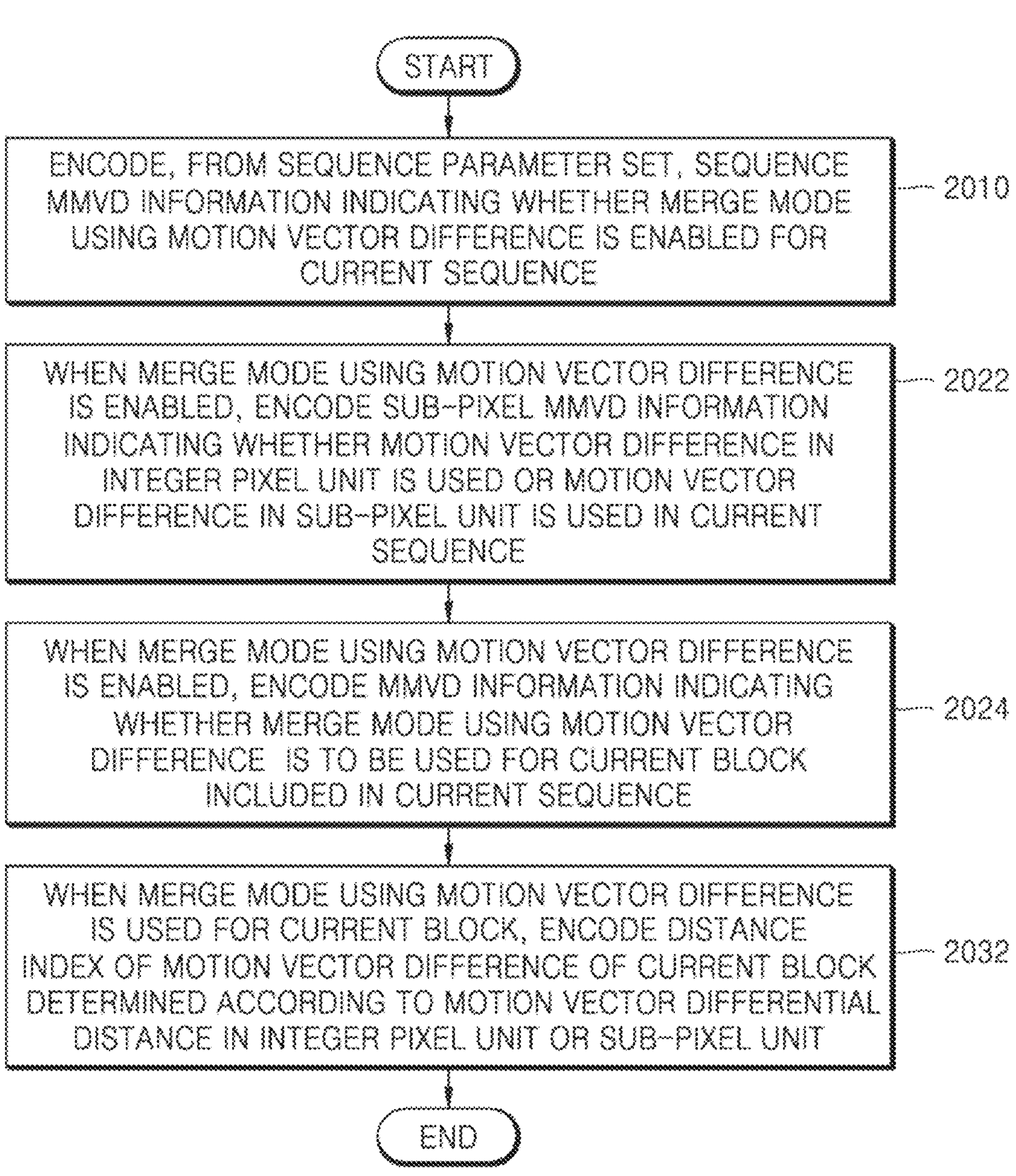
FIG. 37 illustrates a flowchart of a video encoding method according to another embodiment.

FIG. 37 illustrates a flowchart of a video encoding method according to another embodiment.

Operation 2010 is equal to that described above with reference to operation 2010 of FIG. 20.

Operations 2022 and 2024 correspond to particular operations of operation 2020 of FIG. 20.

In operation 2022, the inter prediction performer 1910 may determine whether to apply an MMVD mode in a current sequence. Accordingly, the syntax element encoder 1920 may encode sequence MMVD information indicating whether the MMVD mode is applicable in the current sequence.

In operation 2022, when the MMVD mode is applicable, the inter prediction performer 1910 may determine whether a motion vector difference in an integer pixel unit is used or a motion vector difference in a sub-pixel unit is used in the current sequence. Accordingly, when the MMVD mode is applicable, the syntax element encoder 1920 may encode sub-pixel MMVD information indicating whether the motion vector difference in the integer pixel unit is used or the motion vector difference in the sub-pixel unit is used in the current sequence.

In operation 2024, when the MMVD mode is applicable, the inter prediction performer 1910 may determine whether the MMVD mode is used for a current block included in the current sequence. Accordingly, when the MMVD mode is applicable, the syntax element encoder 1920 may encode MMVD information indicating whether the MMVD mode is used for the current block included in the current sequence.

Operation 2032 is a particular operation of operation 2030 of FIG. 20. In operation 2032, when the MMVD mode is used for the current block, the syntax element encoder 1920 may encode a distance index of a motion vector difference of the current block which is determined according to a distance of a motion vector difference in an integer pixel unit or a sub-pixel unit.

When the MMVD mode is used for the current block and the motion vector difference in the integer pixel unit is used, the syntax element encoder 1920 may determine and encode the distance index of the motion vector difference of the current block, based on the distance of the motion vector difference in the integer pixel unit.

When the MMVD mode is used for the current block and the motion vector difference in the sub-pixel unit is used, the syntax element encoder 1920 may determine and encode the distance index of the motion vector difference of the current block, based on the distance of the motion vector difference in the sub-pixel unit.

When the MMVD mode is not applicable, the syntax element encoder 1920 may not encode the sub-pixel MMVD information and the MMVD information.

When the distance of the motion vector difference is encoded in the integer pixel unit, the syntax element encoder 1920 may round an x component value and a y component value of a base motion vector of the current block in the integer pixel unit, and may determine the distance of the motion vector difference in the integer pixel unit by using the x component value and the y component value of the base motion vector which are rounded to the integer pixel unit. Accordingly, the syntax element encoder 1920 may encode the distance index corresponding to the distance of the motion vector difference in the integer pixel unit.

When the distance of the motion vector difference is encoded in the sub-pixel unit, the syntax element encoder 1920 may round an x component value and a y component value of a base motion vector of the current block in the sub-pixel unit, and may determine the distance of the motion vector difference in the sub-pixel unit by using the x component value and the y component value of the base motion vector which are rounded to the sub-pixel unit. Accordingly, the syntax element encoder 1920 may encode the distance index corresponding to the distance of the motion vector difference in the sub-pixel unit.

Therefore, when MMVD is applied in the current sequence, the video encoding apparatus 1900 may encode not only the sequence MMVD information but also additionally encode the sub-pixel MMVD information and the MMVD information. However, when MMVD is not applied in the current sequence, the video decoding apparatus 1700 may encode only the sequence MMVD information and may not need to additionally encode both the sub-pixel MMVD information and the MMVD information. Because information indicating whether to apply MMVD is encoded by stages according to syntax levels such as a SPS, a coding unit syntax, and the like, a load of the video encoding apparatus 1900 to encode a syntax element related to whether to apply the MMVD may be decreased.

The video decoding apparatus 1700 and the video encoding apparatus 1900 according to an embodiment may signal a distance index of a motion vector difference, instead of a size of a motion vector, in the MMVD mode. Also, instead of sign information indicating a direction of the motion vector, a direction index of a merge motion vector difference may be signaled in the MMVD mode.

The distance index of the motion vector difference may be represented based on precision of a motion vector which is used in a video codec embedded in the video decoding apparatus 1700 and the video encoding apparatus 1900. For example, in a versatile video coding (VVC) codec, a 1/16 pixel unit is internally used as an MV. However, precision indicating a motion vector is represented as ¼. Therefore, when a distance index of the MMVD mode is 1, variation of a motion vector is expressed with precision of ¼. When a distance index of the MMVD mode is 2, variation of a motion vector is expressed with precision of ½. A plurality of motion vector precisions may be expressed using distance indices, and a direction of a motion vector may be expressed as a direction index of a merge motion vector difference.

The merge motion vector difference may be added to a motion vector predictor corresponding to a base motion vector which is selected in a merge candidate list. Because a distance index expresses precision of a motion vector, a motion vector predictor has to be rounded with same precision such that precision of a final motion vector may match with precision of the distance index.

Predictor (value rounded with information of distance index)+merge motion vector difference (distance index*preset precision)*direction index Precision of a merge motion vector difference may be applied to an inter prediction mode used by a current motion vector. A motion vector precision concept according to a distance index of a merge motion vector difference may be applied to a motion vector predictor of an inter prediction mode including a skip mode, a merge mode, an affine skip mode, an affine merge mode, an inter/intra combination mode, a generalized B mode, a triangular partition mode, an AMVP mode, an adaptive motion vector resolution (AMVR) mode, an affine AMVP mode, or the like which are available in a current video codec. Also, the motion vector precision concept according to the distance index of the merge motion vector difference may be applied to a motion vector difference component (including a first mvd component, a second mvd component, . . . , an $N^{th}$ mvd component) in each inter prediction mode. Therefore, various indices used in each inter prediction mode may be interpreted and used as motion vector precision corresponding thereto.

Hereinafter, with reference to FIGS. 25 and 26, a method of matching a distance of a merge difference with precision of a motion vector or a motion vector predictor will now be described.

Figure 25:
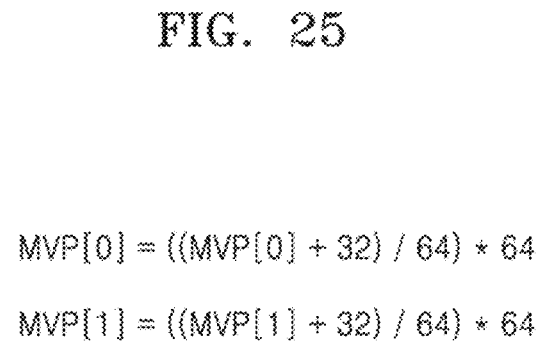

FIG. 25 illustrates equations for adjusting precision of a motion vector predictor or a base motion vector when precision of a distance index of a merge difference is 64 according to an embodiment. FIG. 26 illustrates equations for adjusting precision of a motion vector predictor or a base motion vector when precision of a distance index of a merge difference is 16 according to an embodiment.

An MMVD mode refers to a scheme of expressing a motion vector difference as a log exponent. For example, precision of a motion vector or a pixel location may be selected to be ¼, ½, 1, 2, 4, 8, 16, or 32. When a motion vector difference is expressed in an integer pixel unit in the MMVD mode, a motion vector predictor is also set in an integer pixel unit, such that precision of the motion vector difference and precision of the motion vector predictor may be set to be equal in the MMVD mode. By allowing the precision of the motion vector difference and the precision of the motion vector predictor to be equal, an interpolation filtering process for motion compensation may be skipped, and by doing so, a data bus bandwidth for accessing an external memory is decreased, such that encoding/decoding efficiency may be increased.

Figure 26:
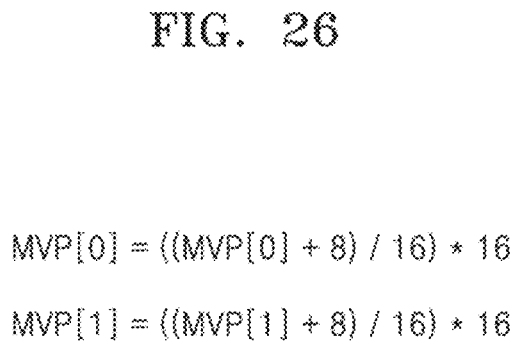

For a particular example, precision of a motion vector in FIGS. 25 and 26 is 1/16. When the precision of the motion vector is 1/16 and a distance of a motion vector difference is 64, the distance of the motion vector difference may be 4 pixels in an integer pixel unit.

In FIG. 25, to round x and y components of actual MVP (a motion vector predictor or a base motion vector) in a 4 pixel unit according to the distance of the motion vector difference, the x component and the y component of MVP may be rounded off to 64. MVP[0] indicates the x component of MVP, and MVP[1] indicates the y component of MVP.

In FIG. 26, when MVP is always rounded to an integer pixel unit, because the precision of the motion vector is 1/16, the x component and the y component of MVP may be rounded off to 16.

A flag representing information indicating whether to apply the MMVD mode used in a skip mode or a merge mode, and information indicating whether to apply the MMVD mode used in other prediction methods may be used in high-level syntax.

Because the MMVD mode is a method for transmitting a motion vector, the MMVD mode may be used in all inter prediction technologies transmitting a motion vector difference and intra prediction technologies (e.g., a current picture referencing (CRP) technology) using a motion vector. Enable flags for indicating whether the MMVD mode is applicable in respective prediction technologies may be included in high-level syntax.

As another example, to represent a flag of the MMVD mode for other prediction technologies such as an MMVD mode to be applied to an affine control point, an MMVD mode to be applied to a sub-block mode, an MMVD mode to be applied to a triangular partition prediction technique, an MMVD mode to be applied to an intra/inter combination prediction mode, or the like, an MMVD flag in the skip mode and an MMVD flag in the merge mode may be used.

That is, all prediction techniques using the MMVD mode in high-level syntax may be simultaneously controlled by one representative MMVD enable flag. When an MMVD enable flag is 1, the MMVD mode can be used in all prediction techniques, and when the MMVD enable flag is 0, the MMVD mode cannot be used in all prediction techniques.

As another example, one representative flag may be signaled, and particular flags may be conditionally signaled. When there is one tool to which the MMVD mode is used, the video encoding apparatus 1900 may first transmit mmvd_enalble_flag that is a representative flag in high-level syntax. When mmvd_enalble_flag is 1, the video decoding apparatus 1700 may sequentially parse flags indicating whether the MMVD mode is applied in other inter prediction techniques and then may determine whether the MMVD mode is applied to each of other inter prediction techniques.

For example, in a case where the MMVD mode is applied to an affine technique, when an MMVD enable flag that is a representative flag is 1, it may be interpreted that the MMVD mode to be applied to an affine control point (CP) has been used.

As another example, when it is confirmed that the MMVD enable flag that is the representative flag is 1, it may mean that the MMVD mode has been used in a certain inter prediction technique. In addition, the video decoding apparatus 1700 may parse flags of the MMVD mode for respective particular inter prediction techniques, thereby determining whether the MMVD mode has been used in each inter prediction technique. Such syntaxes for respective techniques may have a parsing relation that is dependent on representative mmvd enable flag, and parsing relations between syntaxes for respective techniques may be parallel.

The MMVD mode includes two modes that are the MMVD mode of a skip mode and the MMVD mode of a merge mode. The video decoding apparatus 1700 and the video encoding apparatus 1900 according to an embodiment may determine whether it is the skip mode, by signaling a skip mode flag of a current block, and then may determine whether it is both the skip mode and the MMVD mode, by signaling an MMVD flag. Also, when it is not the skip mode, the video decoding apparatus 1700 and the video encoding apparatus 1900 may determine whether it is the merge mode, by signaling a merge mode flag, and then may determine whether it is both the merge mode and the MMVD mode, by signaling the MMVD flag. The video decoding apparatus 1700 may indirectly identify existence or non-existence of residual, according to which flag from among the skip mode flag and the merge mode flag the MMVD flag is signaled thereafter. That is, when the MMVD flag is signaled after the skip mode flag, residual does not exist, but, when the MMVD flag is signaled after the merge mode flag, residual may exist.

In a different example, hereinafter, the MMVD mode may be used independently from the skip mode and the merge mode. An embodiment will now be described, in which, when the video decoding apparatus 1700 and the video encoding apparatus 1900 according to an embodiment use an independent MMVD flag, separate information indicating whether to use residual is signaled.

The video encoding apparatus 1900 according to an embodiment may generate, after an MMVD flag, and transmit a syntax element about whether to use residual. For example, when the MMVD flag is 1, a flag (e.g., no_residue_flag) for determining whether or not to transmit residual of a current block may be separately transmitted thereafter. When no_residue_flag is 1, the video decoding apparatus 1700 may determine that the MMVD flag is 1 in the skip mode, and may perform decoding without residual. When no_residue_flag is 0, the video decoding apparatus 1700 may determine that the MMVD flag is 1 in the merge mode, may additionally parse residual, and then may perform decoding.

As another example, whether residual of respective color components that are Y, Cb, Cr components exist as in an advanced motion vector prediction (AMVP) mode of the HEVC standard is checked through cbf, and residual may be parsed according to a result of the checking. For example, whether residuals with respect to respective components that are Y, Cb, Cr components exist may be determined by signaling cbf of a coding unit (cu_cbf), cbf of a transform unit of a Y component (tu_cbf_luma), cbf of a transform unit of a Cb component (tu_cbf cb), cbf of a transform unit of a Cr component (tu_cbf cr), and the like. As another example, a flag indicating whether residual exists in all of Y, Cb, Cr components may be signaled.

As another example, the MMVD mode may not be allowed for the skip mode but may be allowed only for the merge mode. Because motion information is predicted in a normal merge mode in a same manner as the skip mode, it is possible to assume that residual always exists in the merge mode. That is, in the HEVC standard, it is assumed that root_cbf is always 1 and thus residual exists in at least one component from among Y, Cb, Cr components. After root_cbf, flags indicating whether residual exists may be respectively signaled for components (Y, Cb, Cr). However, when the MMVD mode is allowed only in the merge mode, even when residual does not exist in the MMVD mode, a flag for indicating whether residual exist may be signaled for each of Y, Cb, Cr. In this case, although the MMVD mode is of the merge mode, when residual does not exist in a current block, root_cbf may be signaled to determine existence or non-existence of residual by using one root_cbf.

Also, in the current VVC standard, a mode in which intra prediction and inter prediction are combined to generate prediction data, or a triangular partition prediction mode in which prediction is performed by allowing a partition connecting vertexes of a diagonal line of a block may be allowed only for the merge mode. Similar to the method proposed above, although the MMVD mode is of the merge mode, when residual does not exist in a current block, root_cbf may be signaled to determine existence or non-existence of residual by using one root_cbf.

FIG. 27 illustrates reference table for determining binarization of a plurality of pieces of merge-related information according to an embodiment.

For example, binarization of syntax element mmvd_merge_flag indicating whether it is predicted in an MMVD mode is fixed-length binarization (FL), and in this regard, cMax parameter value is 1. Binarization of mmvd_cand_flag corresponding to a merge index is also FL, and in this regard, cMax parameter value may be 1.

Binarization of syntax element mmvd_distance_idx corresponding to a distance index of a merge motion vector difference is truncated Rice binarization (TR), and in this regard, cMax parameter value may be 7, and cRiceParam value may be 0. Binarization of syntax element mmvd_direction_idx corresponding to a direction index of the merge motion vector difference is FL, and in this regard, cMax parameter value may be 3.

Hereinafter, with reference to FIGS. 28 to 33, various binarizations for a plurality of pieces of MMVD-related information will now be described.

FIG. 28 illustrates comparison table of bin strings of 8 distance indices (mmvd) of a merge difference according to various binarizations.

A distance index (mmvd) of a merge difference may be mapped to a value indicating a particular distance of a motion vector difference in an MMVD mode. For example, indices 0, 1, 2, 3, 4, 5, 6, and 7 may be respectively mapped to 4, 8, 16, 32, 64, 128, 256, and 512 of distances of a motion vector difference. As another example, indices 0, 1, 2, 3, 4, 5, 6, and 7 may be respectively mapped to 1, 2, 4, 8, 16, 32, 64, and 128 of distances of a motion vector difference.

Comparison table of FIG. 28 shows bin strings corresponding to distance indices according to binarization 1 and binarization 2 when the number of distance indices of a merge motion vector difference is from 0 to 7, i.e., 8.

Binarization 1 is a truncated unary coding scheme in which a length of a bin string corresponding to an index becomes short as the index becomes smaller. This scheme is useful binarization, assuming that, as an index becomes small, a distance of a motion vector difference corresponding thereto most frequently occurs. However, it is not true that a distance of a motion vector difference corresponding to a first index of 0 according to a characteristic and a resolution of an image most frequently occurs.

Even when a first index does not correspond to a distance of a motion vector difference that most frequently occurs, it is true that a small index corresponds to a distance of a motion vector difference that most frequently occurs. Based on the fact described above, according to binarization 2, the video encoding apparatus 1900 allocates a bin string of 2 bits to distance indices of 0, 1, and 2, and allocates a bin string of a smaller number of bits to distance indices of 3, 4, 5, 6, and 7, compared to binarization 1. Therefore, compared to binarization 1, according to binarization 2, an effect in which a probability that a distance index of a motion vector difference occurs and the number of bits of a bin string corresponding thereto are thoroughly and evenly corrected may be expected.

In an additional embodiment, the video encoding apparatus 1900 may determine a bin string corresponding to a distance index, according to an actual occurrence probability of a distance index of a motion vector difference in a real natural image. Variable length coding (VLC) coding by which, when an occurrence probability of a particular distance index of a motion vector difference is equal to or greater than 50%, a bin string of 1 bit is allocated to a distance index corresponding to the distance of the difference may be used. However, when an occurrence probability of a distance of a motion vector difference is overall smaller than 50%, a bin string corresponding to a distance index of a motion vector difference may be determined, according to binarization 2.

The video decoding apparatus 1700 may perform inverse binarization on a distance index of a motion vector difference according to binarization selected by the video encoding apparatus 1900. That is, the video decoding apparatus 1700 may parse, from a bitstream, a bin string of the distance index of the motion vector difference, and may determine the distance index of the motion vector difference corresponding to the bin string, according to binarization selected by the video encoding apparatus 1900.

The video encoding apparatus 1900 according to an embodiment may determine a distance index of a motion vector difference, according to k-th order exp-golomb binarization.

Figure 29:
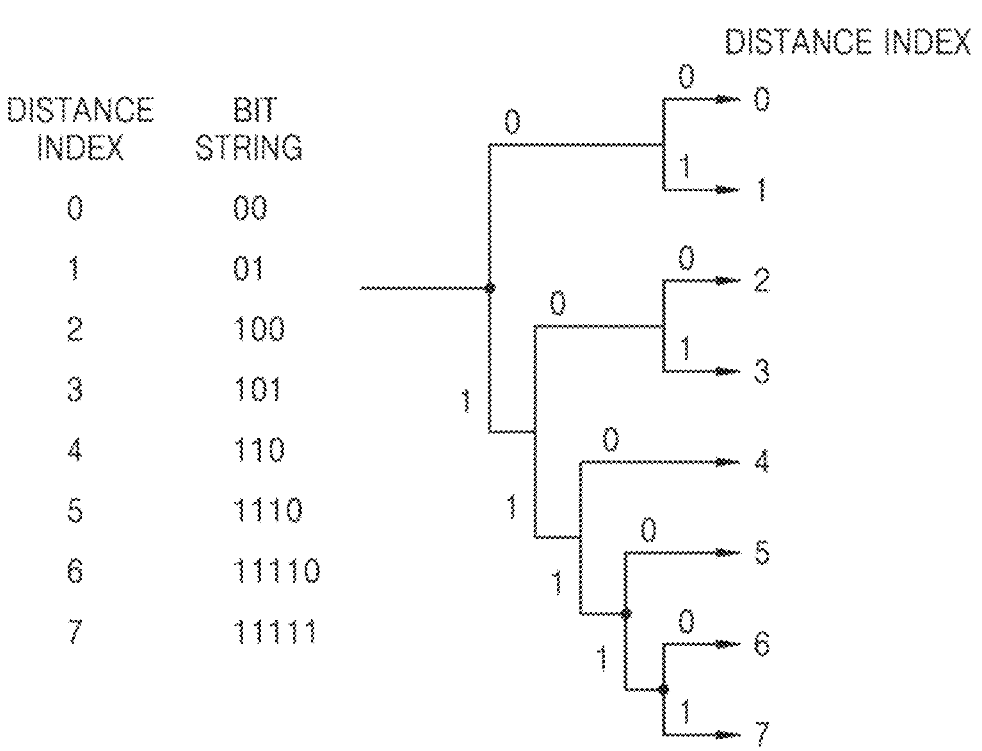
FIG. 29 illustrates an embodiment of k-th order exp-golomb binarization.

FIG. 29 illustrates an embodiment of k-th order exp-golomb binarization.

k-th order exp-golomb binarization refers to a scheme for varying probability-based bit expression according to an exponent of k. Compared to binarization 2, k-th order exp-golomb binarization may further even a length of a bin string according to an occurrence probability of a distance of a motion vector difference.

As illustrated in FIG. 29, it may be defined that a length of a bit string corresponding to distance indices of 0 and 1 is 2, a length of a bit string corresponding to distance indices of 2, 3, and 4 is 3, a length of a bit string corresponding to a distance index of 5 is 4, and a length of a bit string corresponding to distance indices of 6 and 7 is 5. When k-exponent is changed, bin strings allocated to respective distance indices may be changed.

In another embodiment, a bin string of a distance index of a motion vector difference of MMVD may be determined according to a truncated rice (TR) binarization process. For example, a variable cMax may be set to 7 and cRiceParam may be set to 7, which are required in the TR binarization process, or cMax may be set to 7 and cRiceParam may be set to 1.

In another embodiment, in a current sequence, a current picture, a current slice, a current tile, or a current largest coding unit, i.e., in each data level, according to an occurrence probability of the distance index of the motion vector difference, cRiceParam of the TR binarization process may be variably set. As cRiceParam becomes large, it is possible to allocate bits with a uniform probability, such that cRiceParam may be separately set in a corresponding level and signaled. cRiceParam information used in each data level may be signaled through header information of a corresponding data level.

In a more specific example, binarization may be variably changed based on an occurrence probability of a distance index of an MMVD motion vector difference in each data level. Also, binarization may not be limited to the TR binarization process but may be changed based binarization table of a preset VLC scheme or FLC scheme according to various occurrence probabilities.

As another example, coding efficiency may be increased by variably changing a maximum value of a distance index of an MMVD motion vector which is used in every sequence, every picture, every slice, every tile, or every CTU. For example, when the TR binarization process is used, cMax value may be changed. To use 6 distance indices, cMax value may be changed to 5. Number information with respect to cMax may be included in header information of a current data level. Also, cMax may be variably changed according to an occurrence probability of a distance index in a corresponding data level.

In another embodiment, regardless of binarization being used when a distance index of a motion vector difference of an MMVD mode is binarized, entropy encoding to which a context model is applied may be performed on a first bit of a bin string corresponding to the distance index. It is because, when symbols are grouped according to probabilities in binarization where a symbol and a bin string are matched, a first bit of a bin string represents primary classification by which each symbol group is identified. Therefore, when a context model is applied to a first bit of a bin string, further increased entropy encoding efficiency may be expected.

According to binarization, a context model may be applied to a second bit. In addition, when an occurrence probability of a plurality of particular distance indices is high, entropy encoding efficiency may be increased by applying binarization using context. For example, when an occurrence probability of distance indices of 0 and 1 is high in binarization 1 and binarization 2 described above, entropy coding efficiency may be increased by applying binarization using context to a first bit and a second bit.

For example, in a case where binarization using context is used, when a first bit of a bin string is 0, a distance index corresponding thereto may be 0 or 1, and when the first bit of the bin string is 1, others excluding 0 and 1 may be distance indices.

In another example, only when the first bit is 1, a context model may be applied to a second bit immediately thereafter. It is because the second bit may be classified with a particular probability in a second group (a group in which the first bit is 1). Therefore, in a case where the first bit is 1, when the context model is applied to the second bit, entropy coding efficiency may be further increased.

FIG. 30 illustrates comparison table of a bin string of 6 distance indices of a merge difference according to various binarizations.

Similar to FIG. 28, it may be defined that a length of a bit string corresponding to distance indices of 0, 1, and 2 is 2, a length of a bit string corresponding to a distance index of 3 is 3, and a length of a bit string corresponding to distance indices of 4 and 5 is 4.

FIG. 31 illustrates bin strings that are generated by varying binarization according to groups of distance indices of a merge difference according to an embodiment.

FIG. 31 illustrates bin strings according to binarization 1 and binarization 2 when the number of distance indices of a motion vector difference of an MMVD mode is N. A distance index may be mapped to a particular distance value of a motion vector. For example, the distance index may be mapped to cases where sizes of a distance of a motion vector difference are 4, 8, 16, 32, 64, 128, 256, and 512. As another example, the distance index may be mapped to 1, 2, 4, 8, 16, 32, 64, and 128 that are sizes of the distance of the motion vector difference.

According to binarization 1, truncated unary coding (T-unary coding) may be used to express a distance index.

On the contrary thereto, to increase entropy encoding efficiency, in binarizations 2 and 3, one syntax element is added to every separate distance index. The syntax element is a flag used in grouping corresponding distance indices so as to perform coding with minimum bits by separately grouping most probable distance indices.

A distance index group refers to a group of distance indices having a high selection probability and includes indices that are most frequently selected from a given distance index list. Therefore, the flag may be determined based on flags accumulated by a distance index group of blocks that are already encoded in a current frame or a slice. In another example, a flag of a current block may be determined by using a corresponding flag of an adjacent block encoded in the MMVD mode.

Information about which distance index in a distance index group is to be used may be signaled through high-level syntax, and a distance index selected based on the information may be used in a picture, a tile, a slice, and the like that are lower than high-level syntax.

According to binarization 2, when it is assumed that first distance indices 0 and 1 are most probable candidates, a distance index group 0 including distance indices 0 and 1 may be determined. A group 1 including other distance indices may be determined. A group flag of 0 may be allocated to the group 0, and a group flag of 1 may be allocated to the group 1. In general, the number of indices included in the group 1 may be determined by subtracting the number of indices included in the group 0 from the maximum number of distance indices. For example, a number obtained by subtracting 2 that is the number of indices of the group 0 from N+1 that is the maximum number of distance indices may be the number of indices of the group 1.

A context model may be applied to a group flag. Because selectable distance indices are included in the group 0, entropy encoding efficiency may be improved by using the context model.

Indices included in the group 0 may be encoded using FLC, and indices included in the group 1 may be arranged from the smallest and then may be encoded using T-unary coding.

According to binarization 3, a group 0 including distance indices of 0, 1, 2, and 3 is determined, assuming that first distance indices of 0, 1, 2, and 3 are most probable candidates. A group 1 including other distance indices is determined. In general, the number of indices included in the group 1 may be determined by subtracting the number of indices included in the group 0 from the maximum number of distance indices.

A context model may be applied to a group flag. Indices included in the group 0 may be encoded using FLC, and indices included in the group 1 may be arranged from the smallest and then may be encoded using T-unary coding.

In binarizations 2 and 3 described with reference to FIG. 31, the distance indices included in the group 0 are not always encoded using FLC and the distance indices included in the group 1 are not always encoded using T-unary coding. Some indices included in the group 0 may be encoded using FLC, and other indices may be encoded using T-unary coding. Similarly, some indices included in the group 1 may be encoded using FLC, and other indices may be encoded using T-unary coding.

Hereinafter, with reference to FIGS. 32 and 33, binarization in which codeword is differently allocated based on precision of a distance of a motion vector difference.

FIG. 32 illustrates codewords of cases of 8 distance indices (mmvd) of a merge difference according to an embodiment. FIG. 33 illustrates codewords of cases of 6 distance indices (mmvd) of a merge difference according to an embodiment.

A distance offset of a motion vector difference may only be a number expressed as powers of 2 (2^n, where n is an integer). According to whether the distance offset refers to precision in a sub-pixel unit or precision in an integer pixel unit, codeword with respect to a distance index may be allocated. For example, referring to FIG. 32, a total number of distances of a motion vector difference may be 8, and values thereof may be ¼, ½, 1, 2, 4, 8, 16, and 32. Distance offsets of ¼ and ½ in sub-pixel units may be determined to be one group, and other distance offsets may be identified as another group, such that codeword with respect to a distance index may be allocated to each group by using different binarizations. According to each precision group, codeword of a distance index may be determined by using FLC or may be determined by using VLC including T-unary coding. FIG. 32 illustrates codewords for respective distance indices in an embodiment in which 8 distance offsets exist, and FIG. 33 illustrates codewords for respective distance indices in an embodiment in which 6 distance offsets exist.

Binarizations as in FIGS. 32 and 33 may be effective in a case where a probability that a distance offset of actual sub-pixel precision occurs is higher than a probability that a distance offset of precision in an integer pixel unit occurs. In particular, a probability of 0 in a precision flag is increased to improve entropy encoding efficiency, such that a bit amount may be decreased.

In codeword expression methods according to FIGS. 32 and 33, a precision flag and an index in each precision may be respectively expressed as syntax elements. Different binarizations may be applied in same syntax element, according to bits.

Hereinafter, an embodiment will now be described, in which the video decoding apparatus 1700 and the video encoding apparatus 1900 apply a triangular partition prediction mode and an intra/inter combination prediction mode.

According to the triangular partition prediction mode, a current block may be split into two triangular partition shapes along a diagonal line connecting opposite vertexes of a square block, and prediction may be performed on each of the triangular partitions. According to this prediction technique, an area where prediction blocks of the two triangular partitions contact is filled with a prediction value obtained by performing filtering on the prediction blocks of the two triangular partitions, such that a new square prediction block is generated.

Figure 34:
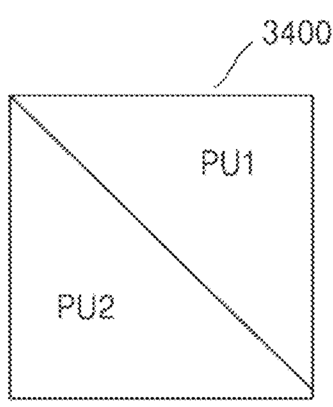
FIG. 34 illustrates triangular partitions that are available in a triangular partition prediction mode according to an embodiment.
Figure 34:
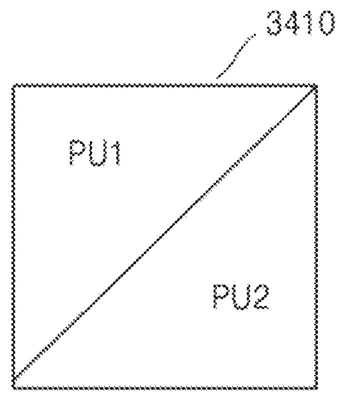

FIG. 34 illustrates triangular partitions that are available in a triangular partition prediction mode according to an embodiment.

Triangular partitions PU1 and PU2 may be determined by connecting a top-left vertex and a bottom-right vertex of a current block 3400 which face each other. Triangular partitions PU1 and PU2 may be determined by connecting a top-right vertex and a bottom-left vertex of a current block 3410 which face each other.

The current blocks 3400 and 3410 may be coding units.

Different motion vectors may be determined for triangular partitions according to prediction using two triangular partitions, and information about a motion vector may be signaled between the video encoding apparatus 1900 and the video decoding apparatus 1700.

Figure 35:
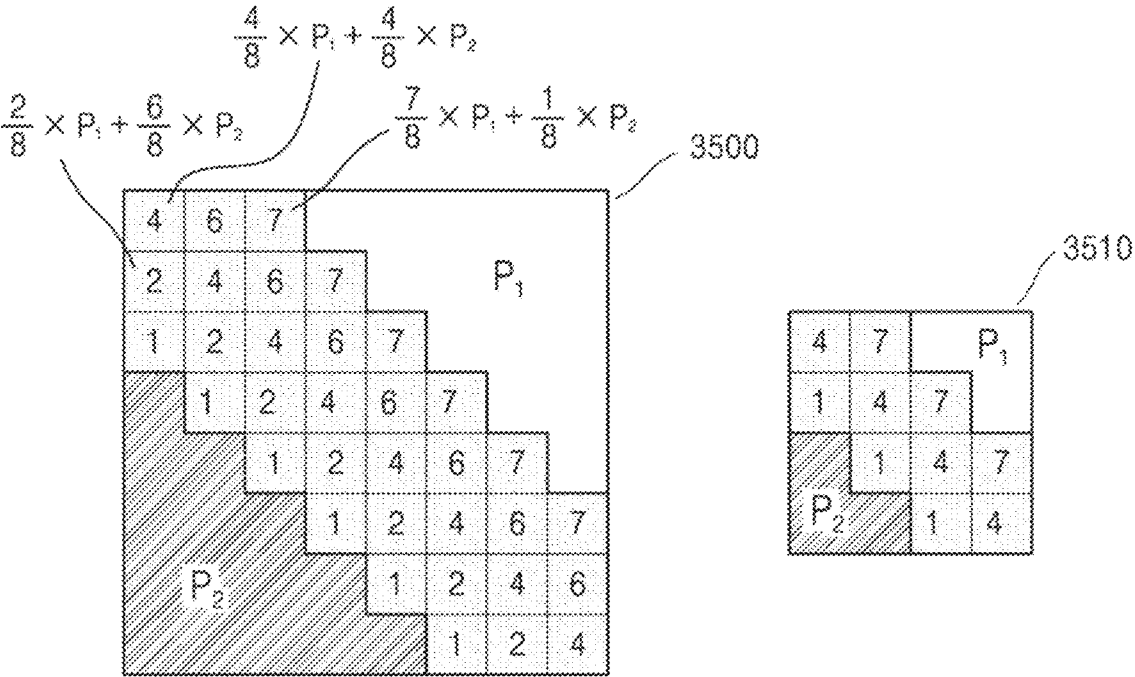
FIG. 35 illustrates a prediction block determined by using triangular partitions in a triangular partition prediction mode according to an embodiment.

FIG. 35 illustrates a prediction block determined by using triangular partitions in a triangular partition prediction mode according to an embodiment.

A size of a prediction block 3500 may be 8×8, and triangular partition prediction blocks may be generated in a triangular partition mode. By performing filtering on prediction values P1 and P2 of the triangular partition prediction blocks, a final prediction value of an intermediate area where the triangular partition prediction blocks contact each other may be determined. A filtering weight may be determined in inverse proportion to a distance from a prediction block area to a triangular partition prediction block.

For example, N that is a number marked on every pixel of the intermediate area of the prediction block 3500 indicates a filtering weight. When N is 7, a filtering weight of ⅞ may be allocated to P1 (⅞*P1) that is a prediction value of a close prediction block from among the triangular partition prediction blocks, a filtering weight of 8−7=1 may be allocated to P2 (⅛*P2) that is a prediction value of a distant prediction block, and then a weighted sum of results thereof may be determined to be a final prediction value (⅞*P1+⅛*P2). When N is 6, a filtering weight of 6/8 may be allocated to P1 (6/8*P1) that is a prediction value of a close prediction block from among the triangular partition prediction blocks, a filtering weight of 8−6=2 may be allocated to P2 (2/8*P2) that is a prediction value of a distant prediction block, and then a weighted sum of results thereof may be determined to be a final prediction value (6/8*P1+2/8*P2).

In a case where a size of a prediction block 3510 is 4*4, when N is 7, a filtering weight of ⅞ may be allocated to P1 (⅞*P1) that is a prediction value of a close prediction block from among triangular partition prediction blocks, a filtering weight of 8−7=1 may be allocated to P2 (⅛*P2) that is a prediction value of a distant prediction block, and then a weighted sum of results thereof may be determined to be a final prediction value (⅞*P1+⅛*P2).

The triangular partition mode according to an embodiment may not be used for a coding unit having a small size, i.e., a case in which multiplication of a width and a height of the coding unit is smaller than 64. This is because a split effect of a coding unit is decreased when a small block is split into triangular partitions.

Also, when a triangular partition does not cover an object in a very large coding unit, a splitting method of a coding unit of quadtree or ternary tree may be further efficient. Because overhead of a flag which occurs in the triangular partition mode is a load, and calculation of triangular partition prediction increases complexity of an encoder, the triangular partition mode may be inefficient for a coding unit having a particular large size.

Therefore, the video decoding apparatus 1700 and the video encoding apparatus 1900 according to an embodiment may determine whether to perform the triangular partition mode according to conditions below. Here, MAX_CU_SIZE indicates a maximum size of a coding unit.

(width*height<64||width>=MAX_CU_SIZE||height>=MAX_CU_SIZE) Condition 1:

That is, when multiplication of a size and a width of a current block is smaller than 64, the size of the current block is greater than a maximum size of a coding unit, or the width of the current block is greater than the maximum size of the coding unit, the video decoding apparatus 1700 and the video encoding apparatus 1900 according to an embodiment may determine that it is unavailable to apply the triangular partition prediction mode to the current block.

According to Condition 1, application of the triangular partition mode is prevented with respect to an area for which predicted efficiency is low, such that complexity of an encoder may be decreased, signaling of an unnecessary mode flag may be prevented, and thus encoding efficiency may be improved.

As in Condition 2 below, threshold values of a height and a width of a coding unit may be modified to MAX_CU_SIZE/2.

(width*height<64||width>=MAX_CU_SIZE/2||height>=MAX_CU_SIZE/2) Condition 2:

The video decoding apparatus 1700 and the video encoding apparatus 1900 according to an embodiment may determine a prediction block through an intra/inter combination mode.

The intra/inter combination mode (or a multi-hypothesis mode) refers to a technology by which a current block is predicted in each of an intra prediction mode and an inter prediction mode so as to generate respective prediction blocks, and two prediction blocks are weight-averaged to generate a new prediction block.

Syntax elements respectively required for the intra prediction mode and the inter prediction mode are transmitted to the video decoding apparatus 1700 to perform intra prediction and inter prediction.

The video encoding apparatus 1900 may transmit, in the form of a merge index, a syntax element related to the inter prediction mode, and the video decoding apparatus 1700 may reconstruct a motion vector and a reference picture.

A syntax element related to the intra prediction mode may include intra prediction direction information indicating one of 4 modes (DC, planar, horizontal, and vertical modes).

The intra/inter combination mode according to an embodiment may not be used for a coding unit having a small size, i.e., a case in which multiplication of a width and a height of the coding unit is smaller than 64. This is because a load of calculations occurring in a combination calculation of intra prediction and inter prediction is greater than a split effect of a coding unit.

Therefore, the video decoding apparatus 1700 and the video encoding apparatus 1900 according to an embodiment may determine whether to perform the triangular partition mode according to conditions below. Here, MAX_CU_SIZE indicates a maximum size of a coding unit.

(width*height<64||width>=MAX_CU_SIZE||height>=MAX_CU_SIZE) Condition 1:

That is, when multiplication of a size and a width of a current block is smaller than 64, the size of the current block is greater than a maximum size of a coding unit, or the width of the current block is greater than the maximum size of the coding unit, the video decoding apparatus 1700 and the video encoding apparatus 1900 according to an embodiment may determine that it is unavailable to apply the intra/inter combination mode to the current block.

According to Condition 1, application of the triangular partition mode is prevented with respect to an area for which predicted efficiency is low, such that complexity of an encoder may be decreased, signaling of an unnecessary mode flag may be prevented, and thus encoding efficiency may be improved.

As in Condition 2 below, threshold values of a height and a width of a coding unit may be modified to MAX_CU_SIZE/2.

(width*height<64||width>=MAX_CU_SIZE/2||height>=MAX_CU_SIZE/2) Condition 2:

Also, when the triangular partition prediction mode is enabled, the video decoding apparatus 1700 according to an embodiment may determine whether an intra/inter combination prediction mode is enabled.

The syntax element obtainer 1710 according to an embodiment may obtain, from a bitstream, sequence MMVD information indicating whether the triangular partition prediction mode is enabled to the current block. Also, the syntax element obtainer 1710 may obtain, from the bitstream, second information indicating whether the intra/inter combination prediction mode is enabled to the current block.

When the triangular partition prediction mode is enabled to the current block according to the sequence MMVD information, the decoder 1720 according to an embodiment may determine whether to apply the triangular partition prediction mode to the current block, based on a size and a width of the current block. When multiplication of the size and the width of the current block is smaller than 64, the size of the current block is greater than a maximum size of a coding unit, or the width of the current block is greater than the maximum size of the coding unit, it may be determined that it is unavailable to apply the triangular partition prediction mode to the current block.

When the triangular partition prediction mode is enabled for the current block according to the sequence MMVD information, and the intra/inter combination prediction mode is enabled for the current block according to the second information, the decoder 1720 according to an embodiment may determine whether to apply the intra/inter combination prediction mode to the current block, based on the size and the width of the current block. When multiplication of the size and the width of the current block is smaller than 64, the size of the current block is greater than the maximum size of the coding unit, or the width of the current block is greater than the maximum size of the coding unit, it may be determined that it is unavailable to apply the intra/inter combination prediction mode to the current block.

In particular, when the triangular partition prediction mode is enabled, the intra/inter combination prediction mode is enabled, multiplication of the size and the width of the current block is equal to or greater than 64, the size of the current block is equal to or smaller than the maximum size of the coding unit, or the width of the current block is equal to or smaller than the maximum size of the coding unit, the decoder 1720 may apply the intra/inter combination prediction mode to the current block.

Similarly, when the triangular partition prediction mode is enabled, the video encoding apparatus 1900 according to an embodiment may determine whether the intra/inter combination prediction mode is enabled.

When the triangular partition prediction mode is enabled for a current block, the inter prediction performer 1910 according to an embodiment may determine whether to apply the triangular partition prediction mode to the current block, based on a size and a width of the current block. When multiplication of the size and the width of the current block is smaller than 64, the size of the current block is greater than a maximum size of a coding unit, or the width of the current block is greater than the maximum size of the coding unit, it may be determined that it is unavailable to apply the triangular partition prediction mode to the current block.

When the triangular partition prediction mode is enabled for the current block, and the intra/inter combination prediction mode is enabled for the current block according to the second information, the inter prediction performer 1910 according to an embodiment may determine whether to apply the intra/inter combination prediction mode to the current block, based on the size and the width of the current block. When multiplication of the size and the width of the current block is smaller than 64, the size of the current block is greater than the maximum size of the coding unit, or the width of the current block is greater than the maximum size of the coding unit, it may be determined that it is unavailable to apply the intra/inter combination prediction mode to the current block.

The syntax element encoder 1920 according to an embodiment may encode sequence MMVD information indicating whether the triangular partition prediction mode is enabled for the current block. Also, the syntax element encoder 1920 may encode second information indicating whether the intra/inter combination prediction mode is enabled for the current block.

In particular, when the triangular partition prediction mode is enabled, the intra/inter combination prediction mode is enabled, multiplication of the size and the width of the current block is equal to or greater than 64, the size of the current block is equal to or smaller than the maximum size of the coding unit, or the width of the current block is equal to or smaller than the maximum size of the coding unit, the inter prediction performer 1910 may apply the intra/inter combination prediction mode to the current block.

Meanwhile, the embodiments of the disclosure may be written as programs that are executable on a computer, and the programs may be stored in a medium.

The medium may continuously store the computer-executable programs or may temporarily store the computer-executable programs for execution or downloading. Also, the medium may be any one of various recording media or storage media in which a single piece or plurality of pieces of hardware are combined, and the medium is not limited to those directly connected to a certain computer system, but may be distributed over a network. Examples of the medium include magnetic media such as a hard disk, a floppy disk, and a magnetic tape, optical recording media such as compact disc-read only memory (CD-ROM) and a digital versatile disc (DVD), magneto-optical media such as floptical disk, read only memory (ROM), random access memory (RAM), a flash memory, etc., which are configured to store program instructions. Also, other examples of the medium include recording media and storage media managed by application stores distributing applications or by websites, servers, and the like supplying or distributing other various types of software.

While one or more embodiments of the disclosure are described in detail with reference to exemplary embodiments above, it will be understood by one of ordinary skill in the art that the disclosure is not limited to the embodiments, and various changes in form and details may be made therein without departing from the spirit and scope of the disclosure.

The invention claimed is:

1. A video decoding method comprising:

obtaining, from a sequence parameter set (SPS), sequence merge mode with a motion vector difference (MMVD) information indicating whether an MMVD mode is enabled for a current sequence;

when the MMVD mode is enabled for the current sequence according to the sequence MMVD information, obtaining, from a bitstream, MMVD information indicating whether the MMVD mode is used in an inter prediction mode for a current block comprised in the current sequence;

when the MMVD mode is used for the current block in the inter prediction mode according to the MMVD information, obtaining a first bin of a distance index of a merge motion vector difference by performing entropy decoding using context information on the bitstream, and obtaining other bins of the distance index of the merge motion vector difference by performing entropy decoding in a bypass mode on the bitstream;

obtaining the distance index of the merge motion vector difference corresponding to the first bin and the other bins of the distance index of the merge motion vector difference;

obtaining bins indicating a direction index of the merge motion vector difference by performing entropy decoding on the bitstream in the bypass mode;

obtaining the direction index of the merge motion vector difference corresponding to the bins indicating the direction index of the merge motion vector difference;

reconstructing a motion vector of the current block based on the merge motion vector difference determined using the distance index of the merge motion vector difference and the direction index of the merge motion vector difference; and reconstructing the current block by using the motion vector of the current block, wherein, one bit of the direction index of the merge motion vector difference indicates one of an x-axis direction and a y-axis direction, and another bit of the direction index of the merge motion vector difference indicates a positive or negative sign of the x-axis direction or the positive or negative sign of the y-axis direction.

2. A video decoding apparatus comprising:

a syntax element obtainer configured to obtain, from a sequence parameter set (SPS), sequence merge mode with a motion vector difference (MMVD) information indicating whether an MMVD mode is enabled for a current sequence, and when the MMVD mode is enabled for the current sequence according to the sequence MMVD information, obtain, from a bitstream, MMVD information indicating whether the MMVD mode is applied in an inter prediction mode for a current block comprised in the current sequence; and a decoder configured to, when the MMVD mode is used for the current block in the inter prediction mode according to the MMVD information, obtain a first bin of a distance index of a merge motion vector difference by performing entropy decoding using context information on the bitstream, and obtain other bins of the distance index of the merge motion vector difference by performing entropy decoding in a bypass mode on the bitstream, obtain the distance index of the merge motion vector difference corresponding to the first bin and the other bins of the distance index of the merge motion vector difference, obtain bins indicating a direction index of the merge motion vector difference by performing entropy decoding on the bitstream in the bypass mode, and obtain the direction index of the merge motion vector difference corresponding to the bins indicating the direction index of the merge motion vector difference, and reconstruct a motion vector of the current block based on the merge motion vector difference determined using the distance index of the merge motion vector difference and the direction index of the merge motion vector difference, and reconstruct the current block by using the motion vector of the current block, wherein, one bit of the direction index of the merge motion vector difference indicates one of an x-axis direction and an y-axis direction, and another bit of the direction index of the merge motion vector difference indicates a positive or negative sign of the x-axis direction or the positive or negative sign of the y-axis direction.

3. A video encoding method comprising:

encoding, into a sequence parameter set (SPS), sequence merge mode with a motion vector difference (MMVD) information indicating whether an MMVD mode is enabled for a current sequence;

when the MMVD mode is enabled for the current sequence, encoding MMVD information indicating whether the MMVD mode is used for a current block comprised in the current sequence in an inter prediction mode; and when the MMVD mode is used for the current block in the inter prediction mode, obtaining bins of a distance index of a merge motion vector difference, performing entropy encoding using context information on a first bin among the bins of the distance index of the merge motion vector difference into a bitstream and performing entropy encoding in a bypass mode on other bins among the bins of the distance index of the merge motion vector difference into the bitstream, obtaining bins of a direction index of the merge motion vector difference, and performing entropy encoding in the bypass mode on the bins indicating the direction index of the merge motion vector difference of the current block into the bitstream, wherein, one bit of the direction index of the merge motion vector difference indicates one of an x-axis direction and an y-axis direction, and another bit of the direction index of the merge motion vector difference indicates a positive or negative sign of the x-axis direction or the positive or negative sign of the y-axis direction.

4. A method of transmitting a bitstream generated by encoding a video, the method comprising:

encoding, into a sequence parameter set (SPS), sequence merge mode with a motion vector difference (MMVD) information indicating whether an MMVD mode is enabled for a current sequence;

when the MMVD mode is enabled for the current sequence, encoding the MMVD information indicating whether the MMVD mode is used for a current block comprised in the current sequence in an inter prediction mode;

when the MMVD mode is used for the current block in the inter prediction mode, obtaining bins of a distance index of a merge motion vector difference, performing entropy encoding using context information on a first bin among the bins of the distance index of the merge motion vector difference into information about the distance index of the merge motion vector difference, and performing entropy encoding in a bypass mode on other bins among the bins of the distance index of the merge motion vector difference into the information about the distance index of the merge motion vector difference, obtaining bins of a direction index of the merge motion vector difference, and performing entropy encoding in the bypass mode on the bins indicating the direction index of the merge motion vector difference of the current block into the information about the direction index of the merge motion vector difference; and transmitting the bitstream including the information about the distance index of the merge motion vector difference and the information about the direction index of the merge motion vector difference, wherein, one bit of the direction index of the merge motion vector difference indicates one of an x-axis direction and an y-axis direction, and another bit of the direction index of the merge motion vector difference indicates a positive or negative sign of the x-axis direction or the positive or negative sign of the y-axis direction.

* * * * *